United States Patent
Cherian et al.

(10) Patent No.: US 11,627,526 B2
(45) Date of Patent: Apr. 11, 2023

(54) COORDINATED DEVICE-TO-DEVICE COMMUNICATIONS

(71) Applicant: QUALCOMM Incorporated, San Diego, CA (US)

(72) Inventors: George Cherian, San Diego, CA (US); Alfred Asterjadhi, San Diego, CA (US); Abhishek Pramod Patil, San Diego, CA (US); Lochan Verma, Danville, CA (US); Sai Yiu Duncan Ho, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 8 days.

(21) Appl. No.: 16/951,873

(22) Filed: Nov. 18, 2020

(65) Prior Publication Data
US 2021/0168712 A1    Jun. 3, 2021

Related U.S. Application Data

(60) Provisional application No. 62/942,292, filed on Dec. 2, 2019.

(51) Int. Cl.
*H04W 52/02* (2009.01)
*H04W 72/14* (2009.01)
(Continued)

(52) U.S. Cl.
CPC ... *H04W 52/0216* (2013.01); *H04W 72/0446* (2013.01); *H04W 72/0453* (2013.01);
(Continued)

(58) Field of Classification Search
CPC ......... H04W 52/0216; H04W 72/0446; H04W 72/0453; H04W 72/14
See application file for complete search history.

(56) References Cited

U.S. PATENT DOCUMENTS

| | | | |
|---|---|---|---|
| 8,885,507 B2 | 11/2014 | Chen et al. | |
| 2014/0328262 A1* | 11/2014 | Sampath | H04L 5/0094 370/329 |

(Continued)

FOREIGN PATENT DOCUMENTS

| | | |
|---|---|---|
| WO | WO-2016176841 A1 | 11/2016 |
| WO | WO-2017035727 A1 | 3/2017 |

OTHER PUBLICATIONS

CATT: "Considerations on D2D Discovery Resource Allocation", 3GPP TSG RAN WG2 Meeting #84, 3GPP Draft; R2-134062 Considerations on D2D Discovery Resource Allocation, 3rd Generation Partnership Project (3GPP), Mobile Competence Centre; 650, Route Des Lucioles; F-06921 Sophia-Antipolis Cedex, vol. RAN WG2, No. Ljubljana, Slovenia; Oct. 11, 2013-Oct. 15, 2013, Nov. 13, 2013 (Nov. 13, 2013), pp. 1-4, XP050736866, Retrieved from the Internet: URL: http://www.3gpp.org/ftp/Meetings_3GPP_SYNC/RAN/RAN2/Docs/ [retrieved on Nov. 13, 2013].

(Continued)

*Primary Examiner* — Mohammad S Anwar
(74) *Attorney, Agent, or Firm* — Kevin Donnelly

(57) ABSTRACT

Various aspects of the techniques, methods and devices described in this disclosure relate generally to achieving coexistence between WLAN and P2P networks, and specifically, to coordinated D2D communications. Some aspects particularly involve extending the capabilities of TWT elements transmitted by APs to support periodic reserved access windows during which D2D-enabled wireless devices are permitted to transmit direct wireless communications. Some other aspects relate to sharing time and frequency resources via CAP TDMA or CAP OFDMA techniques, and specifically, to allocating at least some of the time and frequency resources specifically for D2D communications. Some other aspects relate to periodic coordinated access windows during which APs are scheduled to contend but during which D2D devices are not permitted to contend, and specifically, to scheduling a reserved access window within a periodic coordinated access window during which D2D devices may transmit direct communications to other D2D devices despite the permissions associated with the periodic coordinated access windows.

25 Claims, 24 Drawing Sheets

(51) Int. Cl.
| | |
|---|---|
| H04W 72/04 | (2009.01) |
| H04W 76/11 | (2018.01) |
| H04W 84/12 | (2009.01) |
| H04W 72/0453 | (2023.01) |
| H04W 72/0446 | (2023.01) |

(52) U.S. Cl.
  CPC ............ *H04W 72/14* (2013.01); *H04W 76/11* (2018.02); *H04W 84/12* (2013.01)

(56) References Cited

U.S. PATENT DOCUMENTS

| | | | | |
|---|---|---|---|---|
| 2014/0328313 | A1* | 11/2014 | Merlin | H04B 7/26 370/330 |
| 2015/0117369 | A1* | 4/2015 | Merlin | H04W 74/0816 370/329 |
| 2017/0346673 | A1* | 11/2017 | Kneckt | H04W 48/16 |
| 2019/0306685 | A1* | 10/2019 | Cariou | H04W 72/0446 |

OTHER PUBLICATIONS

Ericsson: "Discovery Resource Allocation", 3GPP TSG-RAN WG1 Meeting #78, 3GPP Draft; R1-143368 Discovery Resource Allocation, 3rd Generation Partnership Project (3GPP), Mobile Competence Centre; 650, Route Des Lucioles; F-06921 Sophia-Antipolis Cedex; France, vol. RAN WG1, No. Dresden, Germany; Aug. 18, 2014-Aug. 22, 2014, Aug. 17, 2014 (Aug. 17, 2014), 5 Pages, XP050788842, Retrieved from the Internet: URL: SYNC/RAN1/Docs/[retrieved on Aug. 17, 2014] section 3, section 4; figure 4.
Huawei, et al., "D2D Synchronization Procedure", 3GPP TSG RAN WG1 Meeting #79, 3GPP Draft; R1-145092, 3rd Generation Partnership Project (3GPP), Mobile Competence Centre; 650, Route Des Lucioles; F-06921 Sophia-Antipolis Cedex; France, vol. RAN WG1, No. San Francisco, USA; Nov. 17, 2014-Nov. 21, 2014, Nov. 17, 2014 (Nov. 17, 2014), pp. 1-4, XP050876126, Retrieved from the Internet: URL: http://www.3gpp.org/ftp/Meetings_3GPP_SYNC/RAN1/Docs/ [retrieved on Nov. 17, 2014] section 4; figure 3.
International Search Report and Written Opinion—PCT/US2020/061196—ISA/EPO—dated Feb. 5, 2021.
Wang C-C., et al., (MEDIATEK), "The Co-Existence of 11ax Network and Ad Hoc/STA-2-STA Network", IEEE 802.11-16/1237r1, Sep. 12, 2016, pp. 1-18.

* cited by examiner

COORDINATED DEVICE-TO-DEVICE COMMUNICATIONS

PRIORITY INFORMATION

The present Application for Patent claims priority under 35 U.S.C. § 119 to U.S. Provisional Patent Application No. 62/942,292 by Cherian et al., filed 2 Dec. 2019 and entitled "COORDINATED DEVICE-TO-DEVICE COMMUNICATIONS," which is assigned to the assignee hereof and hereby expressly incorporated by reference herein.

TECHNICAL FIELD

This disclosure relates generally to wireless communication, and more specifically, to coordinating device-to-device communications.

DESCRIPTION OF THE RELATED TECHNOLOGY

A wireless local area network (WLAN) may be formed by one or more wireless access points (APs) that provide a shared wireless communication medium for use by a number of client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In addition to participating in a WLAN, STAs may also participate in a peer-to-peer (P2P), ad hoc or mesh network. In such instances, STAs can communicate directly with each other via P2P wireless links without the use of an intermediary AP. In some deployments, regular infrastructure traffic to and from an AP and an associated set of STAs may interfere with P2P traffic among the STAs, or vice versa. Techniques for achieving coexistence are desired.

SUMMARY

The systems, methods and devices of this disclosure each have several innovative aspects, no single one of which is solely responsible for the desirable attributes disclosed herein.

The described subject matter relates generally to achieving coexistence between WLAN and P2P or ad hoc networks, and particularly, to coordinated device-to-device (D2D) communications. One innovative aspect of the subject matter described in this disclosure can be implemented as a method of wireless communication. The method may be performed by a wireless communication device, operating in or as a first wireless access point, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes transmitting a first wireless packet to at least a first set of wireless stations in a first basic service set (BSS) controlled by the first wireless access point, each wireless station in the first set of wireless stations being configured for direct wireless communications with other wireless stations, the first wireless packet including an indication of periodic reserved access windows indicating to the first set of wireless stations that they are permitted to transmit direct wireless communications to other wireless stations in the first set of wireless stations on one or more wireless channels during the periodic reserved access windows. The method further includes refraining from transmitting wireless communications during the periodic reserved access windows.

Another innovative aspect of the subject matter described in this disclosure can be implemented as a method of wireless communication. The method may be performed by a wireless communication device, operating in or as a first wireless station, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes receiving a first wireless packet from a first wireless access point that controls a first BSS including a first set of wireless stations that includes the first wireless station, the first wireless station being configured for direct wireless communications with other wireless stations, the first wireless packet including an indication of periodic reserved access windows indicating to the first wireless station that it is permitted to transmit direct wireless communications to one or more other wireless stations in the first set of wireless stations on one or more wireless channels during the periodic reserved access windows. The method further includes transmitting a second wireless packet directly to another wireless station during at least one of the periodic reserved access windows.

Another innovative aspect of the subject matter described in this disclosure can be implemented as a method of wireless communication. The method may be performed by a wireless communication device, operating in or as a first wireless access point, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes obtaining a transmission opportunity for wireless communication via one or more wireless channels. The method also includes selecting one or more other wireless access points to participate in the transmission opportunity. The method also includes allocating a respective set of time and frequency resources of a plurality of sets of time and frequency resources of the transmission opportunity to each of the first wireless access point and the selected wireless access points. The method also includes allocating a first subset of time and frequency resources, of the set of time and frequency resources allocated to the first wireless access point, to a first set of wireless stations in a BSS controlled by the first wireless access point for direct wireless communications with other wireless stations. The method also includes transmitting a first wireless packet to the one or more selected wireless access points that includes, for each of the selected wireless access points, an indication of the set of time and frequency resources allocated to the respective wireless access point. The method additionally includes transmitting a second wireless packet to the first set of wireless stations that includes an indication of the first subset of time and frequency resources. The method further includes refraining from transmitting wireless communications in the first subset of time and frequency resources.

Another innovative aspect of the subject matter described in this disclosure can be implemented as a method of wireless communication. The method may be performed by a wireless communication device, operating in or as a first wireless access point, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes receiving a first wireless packet from a second wireless access point that indicates that a plurality of time and frequency resources of a transmission opportunity owned by the second wireless access point can be shared by the second wireless access point. The method also includes transmitting a second wireless packet to the second wireless access point indicating a desire to participate in the transmission opportunity. The method also includes receiving a third wireless packet from the second wireless access point that includes an indication of a first set of time and frequency resources of the plurality of time and frequency resources allocated to the first wireless access point and usable by the first wireless access point to transmit data to, or receive data from, a first set of wireless stations in a first BSS controlled by the first wireless access point during the transmission opportunity. The method also includes allocating a first subset of time and frequency resources, of the first set of time and frequency resources allocated to the first wireless access point, to the first set of wireless stations for direct wireless communications with other wireless stations. The method additionally includes transmitting a fourth wireless packet to the first set of wireless stations that includes an indication of the first subset of time and frequency resources. The method further includes refraining from transmitting wireless communications in the first subset of time and frequency resources.

Another innovative aspect of the subject matter described in this disclosure can be implemented as a method of wireless communication. The method may be performed by a wireless communication device, operating in or as a first wireless station, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes receiving a first wireless packet from a first wireless access point that controls a first BSS including a first set of wireless stations that includes the first wireless station, the first set of wireless stations being configured for direct wireless communications with other wireless stations, the first wireless packet including an indication of a first subset of time and frequency resources of a first set of time and frequency resources allocated to the first BSS of a plurality of sets of time and frequency resources of a transmission opportunity owned by the first wireless access point or a second wireless access point, the first subset of time and frequency resources being allocated for use by the first set of wireless stations for direct wireless communications with other wireless stations. The method further includes transmitting a second wireless packet directly to another wireless station using the first subset of time and frequency resources.

Another innovative aspect of the subject matter described in this disclosure can be implemented as a method of wireless communication. The method may be performed by a wireless communication device, operating in or as a first wireless access point, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes exchanging one or more first wireless packets with a first set of wireless access points that includes the first wireless access point to coordinate a schedule of periodic coordinated access windows during which the first set of wireless access points are scheduled to contend for access to one or more wireless channels. The method also includes transmitting a second wireless packet that includes a first indication of the periodic coordinated access windows. The method also includes determining that a first set of wireless stations in a first BSS controlled by the first wireless access point is operating a neighbor awareness networking (NAN) network, each wireless station in the first set of wireless stations being configured for direct wireless communications with other wireless stations in the NAN network, the first set of wireless stations not being permitted to contend for access to the one or more wireless channels during the periodic coordinated access windows. The method additionally includes transmitting a third wireless packet to the first set of wireless stations that includes a second indication of a reserved access window within one or more of the periodic coordinated access windows, the second indication indicating that the first set of wireless stations are permitted to transmit direct wireless communications to other wireless stations in the NAN network on the one or more wireless channels despite the first indication. The method further includes refraining from transmitting wireless communications during the reserved access windows.

Another innovative aspect of the subject matter described in this disclosure can be implemented as a method of wireless communication. The method may be performed by a wireless communication device, operating in or as a first wireless station, that includes at least one modem, at least one processor communicatively coupled with the at least one modem, and at least one memory communicatively coupled with the at least one processor and storing processor-readable code that, when executed by the at least one processor in conjunction with the at least one modem, is configured to perform the method. The method includes forming or joining a neighbor awareness networking (NAN) network including a first set of wireless stations that includes the first wireless station, each wireless station in the first set of wireless stations being configured for direct wireless communications with other wireless stations in the NAN network. The method also includes receiving a first wireless packet from a first wireless access point that controls a first BSS that includes the first set of wireless stations, the first wireless packet including a first indication of periodic coordinated access windows during which wireless access points, including the first wireless access point, are scheduled to contend for access to one or more wireless channels, and during which wireless stations, including the first set of wireless stations, are not permitted to contend for access to the one or more wireless channels. The method additionally includes receiving a second wireless packet from the first wireless access point that includes a second indication of a reserved access window within one or more of the periodic coordinated access windows, the second indication indicating that the first set of wireless stations are permitted to transmit direct wireless communications to other wireless stations in the NAN network on the one or more wireless channels despite the first indication. The method further includes transmitting a third wireless packet directly to another wireless station during at least one of the reserved access windows.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
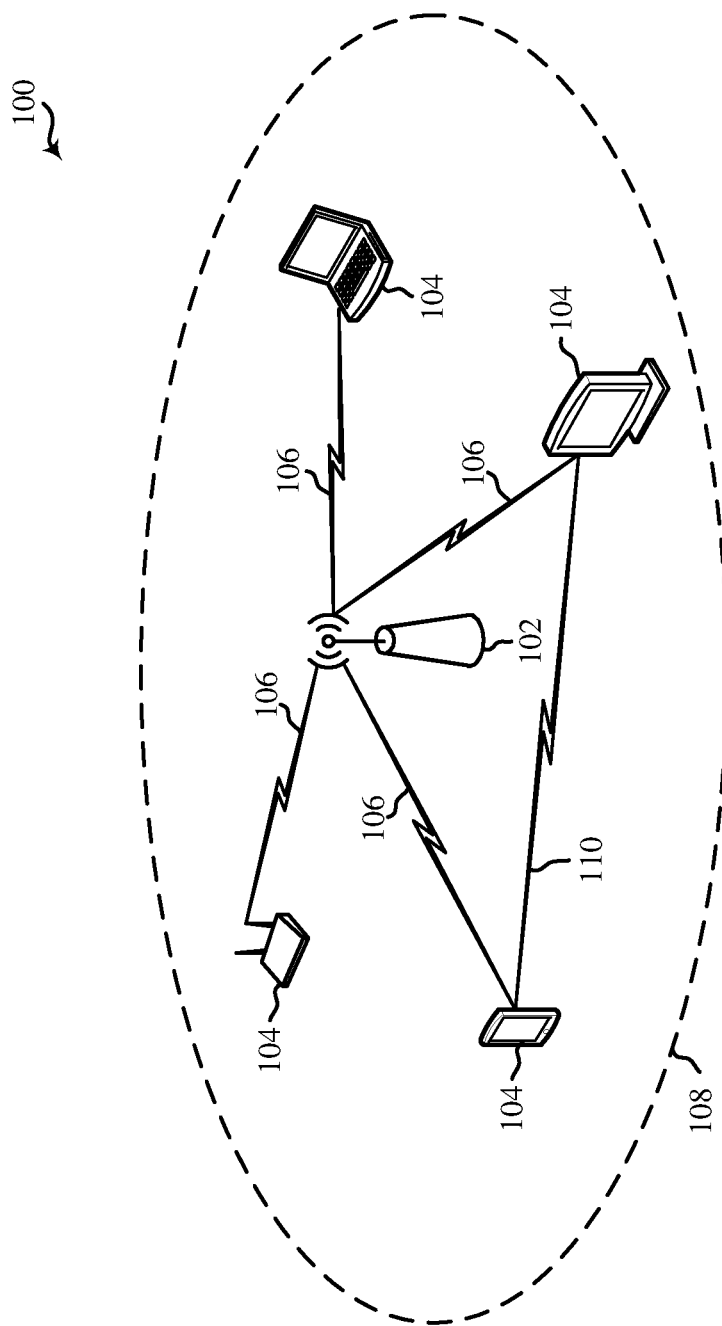
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects of the techniques, methods and devices disclosed herein relate generally to achieving coexistence between WLAN and peer-to-peer (P2P) or ad hoc networks, and specifically, to coordinated device-to-device (D2D) communications. Some aspects particularly involve extending the capabilities of target wake time (TWT) elements transmitted by wireless access points to support periodic reserved access windows during which D2D-enabled wireless devices are permitted to transmit direct wireless communications to other D2D-enabled wireless devices.

Some other aspects relate to sharing time and frequency resources of a wireless medium, and more particularly, coordinated access point (CAP) time-division-multiple-access (TDMA) or CAP orthogonal-frequency-division-multiple-access (OFDMA) techniques for sharing the time and frequency resources of a transmission opportunity. According to such techniques, a wireless access point that wins contention and gains access to the wireless medium for the duration of a TXOP may share its time and frequency resources with other coordinated access points. The coordinated access points may then specifically allocate at least some of the time and frequency resources in their respective time and frequency resources specifically for D2D communications.

In some other aspects, a D2D-enabled wireless device may form or join a P2P network that also includes a first set of other D2D-enabled wireless devices. The D2D-enabled wireless device may receive a first indication from a wireless access point that indicates periodic coordinated access windows during which wireless access points are scheduled to contend for access and during which the set of D2D-enables wireless devices are not permitted to contend for access. The D2D-enabled wireless device may also receive a second indication of a reserved access window within one or more of the periodic coordinated access windows during which at least some of the set of D2D-enabled wireless devices are permitted to transmit direct wireless communications to other D2D-enabled wireless devices network despite the permissions associated with the first indication.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds ($\mu$s)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
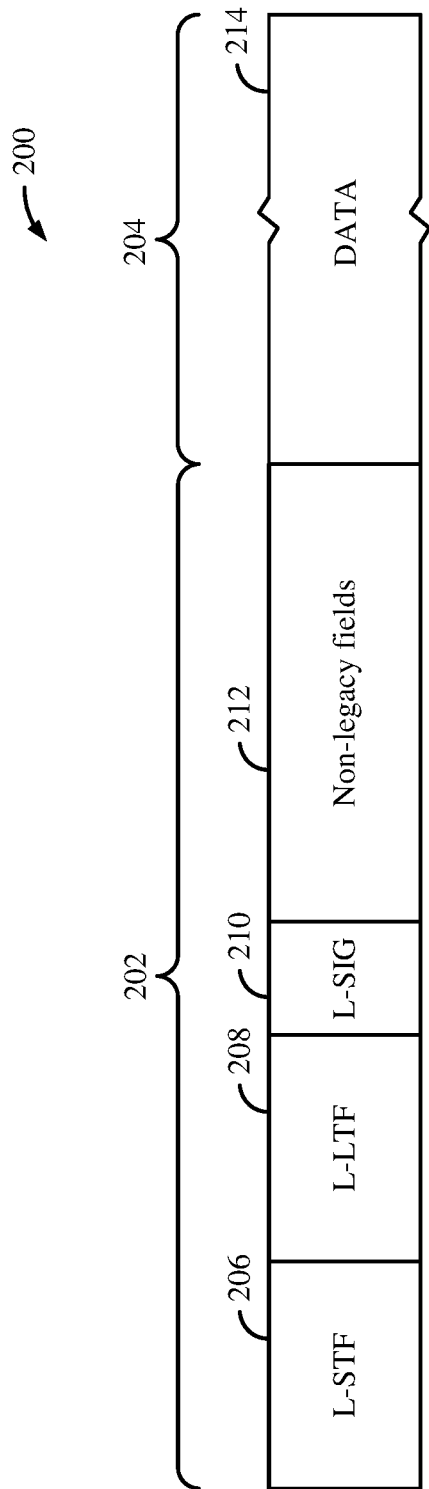
FIG. 2A shows an example protocol data unit (PDU) usable for communications between an access point (AP) and a number of stations (STAs).

FIG. 2A shows an example protocol data unit (PDU) 200 usable for wireless communication between an AP and a number of STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
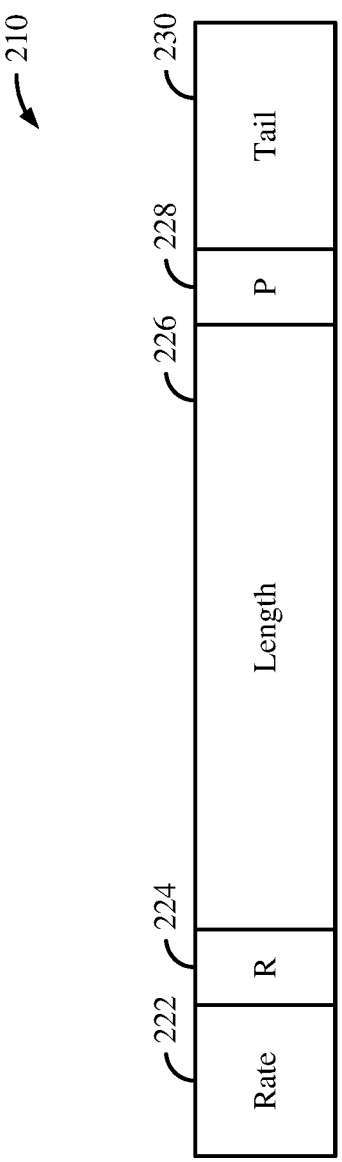
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
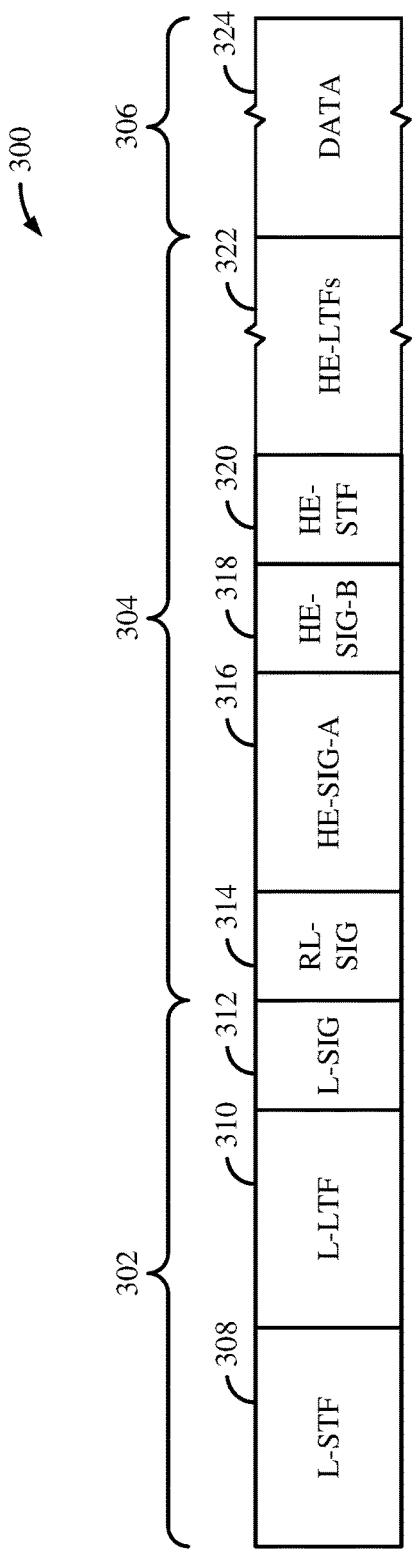
FIG. 3A shows another example PDU usable for communications between an AP and a number of STAs.

FIG. 3A shows another example PDU 300 usable for wireless communication between an AP and a number of STAs. The PDU 300 may be used for MU-OFDMA or MU-MIMO transmissions. The PDU 300 includes a PHY preamble including a legacy portion 302 and a non-legacy portion 304. The PDU 300 may further include a PHY payload 306 after the preamble, for example, in the form of a PSDU including a DATA field 324. The legacy portion 302 of the preamble includes L-STF 308, L-LTF 310, and L-SIG 312. The non-legacy portion 304 of the preamble and the DATA field 374 may be formatted as a High Efficiency (HE) WLAN preamble and frame, respectively, in accordance with the IEEE 802.11ax amendment to the IEEE 802.11 wireless communication protocol standard. The non-legacy portion 304 includes a repeated legacy signal field (RL-SIG) 314, a first HE signal field (HE-SIG-A) 316, a second HE signal field (HE-SIG-B) 318 encoded separately from HE-SIG-A 316, an HE short training field (HE-STF) 320 and a number of HE long training fields (HE-LTFs) 322. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, HE-SIG-B 318 may be unique to each 20 MHz channel and may target specific STAs 104.

RL-SIG 314 may indicate to HE-compatible STAs 104 that the PPDU is an HE PPDU. An AP 102 may use HE-SIG-A 316 to identify and inform multiple STAs 104 that the AP has scheduled UL or DL resources for them. HE-SIG-A 316 may be decoded by each HE-compatible STA 104 served by the AP 102. HE-SIG-A 316 includes information usable by each identified STA 104 to decode an associated HE-SIG-B 318. For example, HE-SIG-A 316 may indicate the frame format, including locations and lengths of HE-SIG-Bs 318, available channel bandwidths, modulation and coding schemes (MCSs), among other possibilities. HE-SIG-A 316 also may include HE WLAN signaling information usable by STAs 104 other than the number of identified STAs 104.

HE-SIG-B 318 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 318 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 324.

Figure 3B:
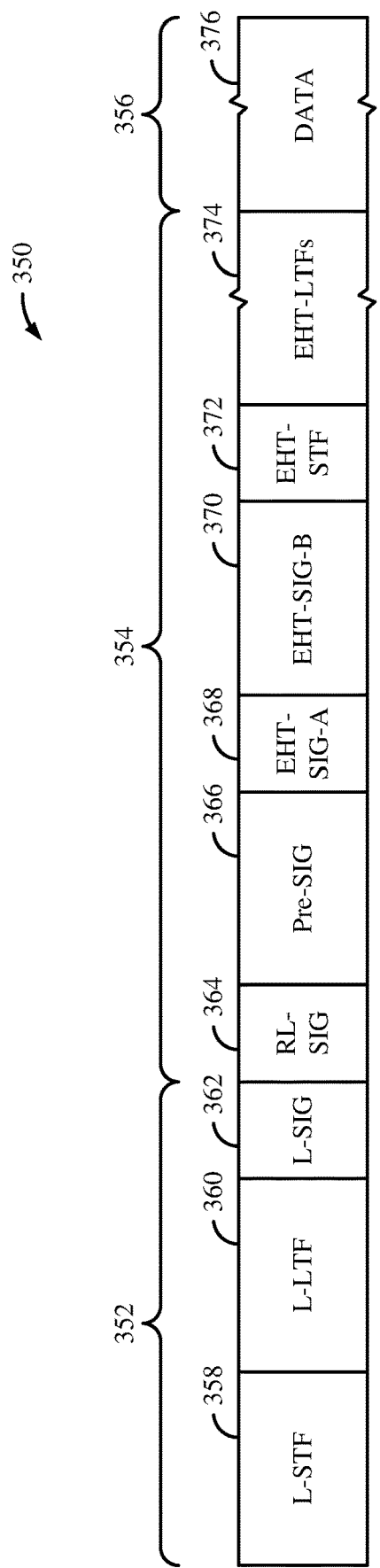
FIG. 3B shows another example PDU usable for communications between an AP and a number of STAs.

FIG. 3B shows an example PPDU 350 usable for wireless communication between an AP and a number of STAs according to some implementations. The PPDU 350 may be used for SU, MU-OFDMA or MU-MIMO transmissions. The PPDU 350 includes a PHY preamble including a legacy portion 352 and a non-legacy portion 354. The PPDU 350 may further include a PHY payload 356 after the preamble, for example, in the form of a PSDU including a DATA field 376. The legacy portion 352 includes L-STF 358, L-LTF 360, and L-SIG 362. The non-legacy portion 354 of the preamble and the DATA field 376 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The non-legacy portion 354 of the preamble includes a second signal field (referred to herein as "Pre-SIG") 366, a third signal field (referred to herein as "EHT-SIG-A" although it may be structured as, and carry version-dependent information for, other wireless communication protocol versions beyond EHT) 368, and a fourth signal field (referred to herein as "EHT-SIG-B" although it may be structured as, and carry version-dependent information for, other wireless communication protocol versions beyond EHT) 370. The non-legacy portion 354 further includes an additional short training field (referred to herein as "EHT-STF" although it may be structured as, and carry version-dependent information for, other wireless communication protocol versions beyond EHT) 372 and a number of additional long training fields (referred to herein as "EHT-LTFs" although they may be structured as, and carry version-dependent information for, other wireless communication protocol versions beyond EHT) 374. Like L-STF 358, L-LTF 360, and L-SIG 362, the information in Pre-SIG 366 and EHT-SIG-A 368 may be duplicated and transmitted in each of the component 20 MHz channels in instances involving the use of a bonded channel. In some implementations, EHT-SIG-A 368 may additionally or alternatively carry information in one or more non-primary 20 MHz channels that is different than the information carried in the primary 20 MHz channel. EHT-SIG-B 370 may be unique to each 20 MHz channel and, as described above, may target specific STAs 104. The non-legacy portion 354 of the preamble may or may not include a repeated legacy signal field (RL-SIG) 364 after L-SIG 362 and before Pre-SIG 366.

EHT-SIG-A 368 may include one or more jointly encoded symbols and may be encoded in a different block from the block in which Pre-SIG 366 is encoded. EHT-SIG-A 368 may be used by an AP to identify and inform multiple STAs 104 that the AP has scheduled UL or DL resources. EHT-SIG-A 368 may be decoded by each compatible STA 104 served by the AP 102. EHT-SIG-A 368 includes information usable by the identified STAs 104 to decode an associated EHT-SIG-B 370. EHT-SIG-A 368 may generally be used by a receiving device to interpret bits in EHT-SIG-B 370 or DATA field 376. For example, EHT-SIG-A 368 may indicate the locations and lengths of EHT-SIG-Bs 370 in the various component channels, available channel bandwidths, and modulation and coding schemes (MCSs), among other possibilities. EHT-SIG-A 368 may further include a cyclic redundancy check (CRC) (for example, four bits) and a tail (for example, 6 bits) that may be used for binary convolutional code (BCC).

EHT-SIG-B 370 may include multiple symbols that may be encoded in a different block from the block in which EHT-SIG-A 368 is encoded. In some other implementations, EHT-SIG-A 368 may be jointly encoded with some or all of EHT-SIG-B 370. For example, EHT-SIG-A 368 may be jointly encoded with a first portion of EHT-SIG-B 370 that includes information common to all users served by the PPDU 350. EHT-SIG-B 370 may carry STA-specific scheduling information such as, for example, per-user MCS values and per-user RU allocation information. EHT-SIG-B 370 may generally be used by a receiving device to interpret bits in the DATA field 376. In the context of DL MU-OFDMA, such information enables the respective STAs 104 to identify and decode corresponding RUs in the associated DATA field 376. Each EHT-SIG-B 370 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

Pre-SIG 366, and RL-SIG 364 if present, may indicate to EHT- or later version-compliant STAs 104 that the PPDU 350 is an EHT PPDU or a PPDU conforming to another non-legacy wireless communication protocol version. For example, Pre-SIG 366 may be used by a receiving device to interpret bits in one or more of EHT-SIG-A 368, EHT-SIG-B 370 or the DATA field 376. In some implementations, Pre-SIG 366 may include a reserved bit that indicates whether the PPDU 350 is, for example, compliant with EHT or a later version (for example, after IEEE 802.11ax) of the IEEE 802.11 family of wireless communication protocol standards or other standards. In some implementations, Pre-SIG 366 includes a version field that includes at least one bit indicating the particular wireless communication protocol version to which the PPDU 350 conforms.

Access to the shared wireless medium is generally governed by a distributed coordination function (DCF). With a DCF, there is generally no centralized master device allocating time and frequency resources of the shared wireless medium. On the contrary, before a wireless communication device, such as an AP 102 or a STA 104, is permitted to transmit data, it must wait for a particular time and then contend for access to the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV is reset each time a valid frame is received that is not addressed to the wireless communication device. The NAV effectively serves as a time duration that must elapse before the wireless communication device may contend for access even in the absence of a detected symbol or even if the detected energy is below the relevant threshold.

As described above, the DCF is implemented through the use of time intervals. These time intervals include the time slot time (or "time slot interval") and the inter-frame space (IFS). The time slot time is the basic unit of timing and may be determined based on one or more of a transmit-receive turnaround time, a channel sensing time, a propagation delay and a MAC processing time. Measurements for channel sensing are performed for each time slot. All transmissions may begin at time slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the time slot time. The values for the time slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates a backoff timer, which represents a duration of time that the device must sense the medium to be idle before it is permitted to transmit. The backoff timer is decremented by one time slot each time the medium is sensed to be idle during a corresponding time slot interval. If the channel remains idle until the backoff timer expires, the wireless communication device becomes the holder (or "owner") of a transmit opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the contention window (CW). If, when the backoff timer expires, the wireless communication device transmits the PPDU, but the medium is still busy, there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4:
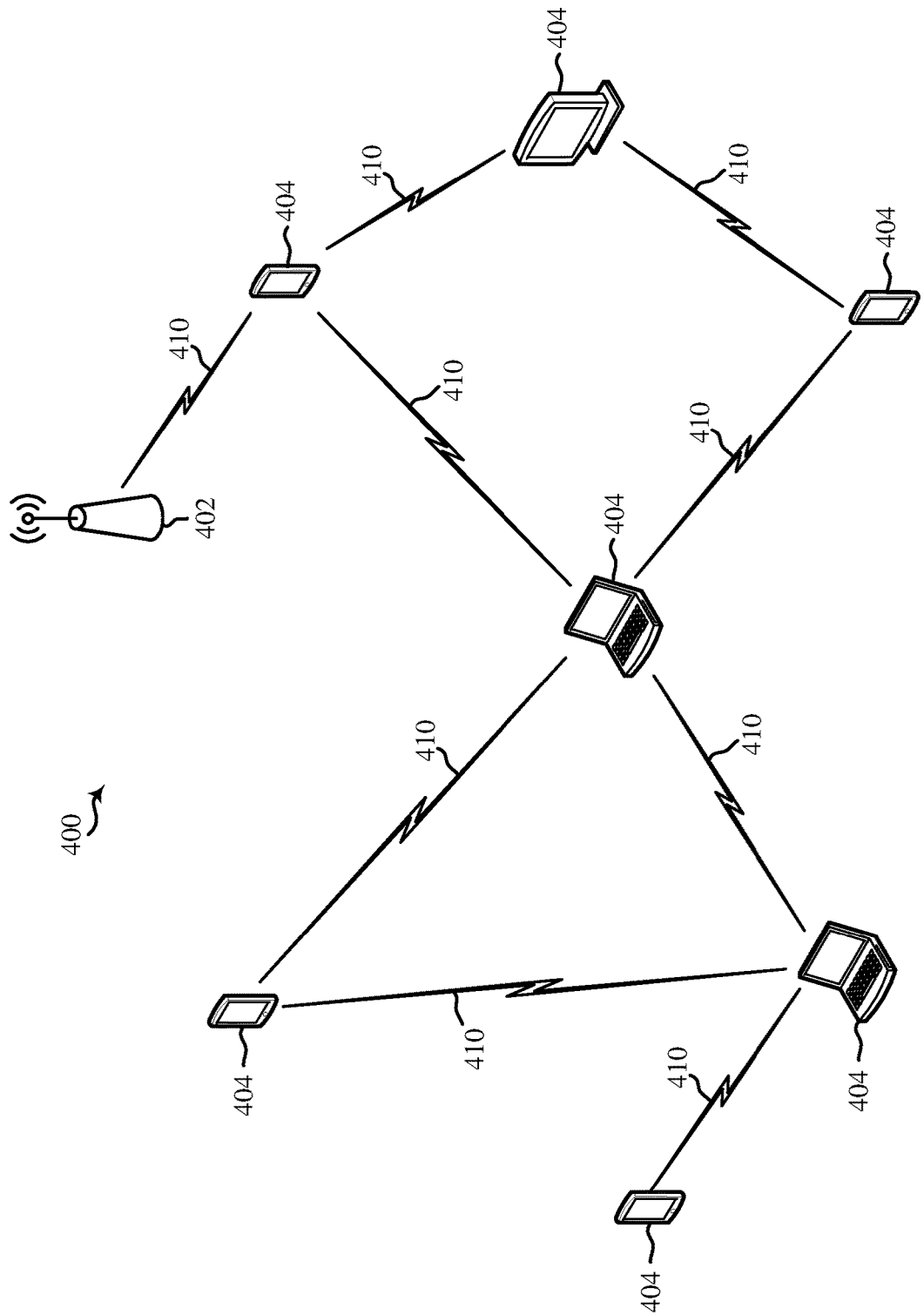
FIG. 4 shows a pictorial diagram of another example wireless communication network.

FIG. 4 shows a pictorial diagram of another example wireless communication network 400. According to some aspects, the wireless communication network 400 can be an example of a WLAN. For example, the wireless network 400 can be a network implementing at least one of the IEEE 802.11 family of standards. The wireless network 400 may include multiple STAs 404. As described above, each of the STAs 404 also may be referred to as a mobile station (MS), a mobile device, a mobile handset, a wireless handset, an access terminal (AT), a user equipment (UE), a subscriber station (SS), or a subscriber unit, among other possibilities. The STAs 404 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

The wireless network 400 is an example of a peer-to-peer (P2P), ad hoc or mesh network. STAs 404 can communicate directly with each other via P2P wireless links 410 (without the use of an intermediary AP). In some implementations, the wireless network 400 is an example of a neighbor awareness networking (NAN) network. NAN networks operate in accordance with the Wi-Fi Alliance (WFA) Neighbor Awareness Networking (also referred to as NAN) standard specification. NAN-compliant STAs 404 (hereinafter also simply "NAN devices 404") transmit and receive NAN communications (for example, in the form of Wi-Fi packets including frames conforming to an IEEE 802.11 wireless communication protocol standard such as that defined by the IEEE 802.11-2016 specification or amendments thereof including, but not limited to, 802.11ay, 802.11ax, 802.11az, 802.11ba and 802.11be) to and from one another via wireless P2P links 410 (hereinafter also referred to as "NAN links") using a data packet routing protocol, such as Hybrid Wireless Mesh Protocol (HWMP), for path selection.

A NAN network generally refers to a collection of NAN devices that share a common set of NAN parameters including: the time period between consecutive discovery windows, the time duration of the discovery windows, the NAN beacon interval, and the NAN discovery channel(s). A NAN ID is an identifier signifying a specific set of NAN parameters for use within the NAN network. NAN networks are dynamically self-organized and self-configured. NAN devices 404 in the network automatically establish an ad-hoc network with other NAN devices 404 such that network connectivity can be maintained. Each NAN device 404 is configured to relay data for the NAN network such that various NAN devices 404 may cooperate in the distribution of data within the network. As a result, a message can be transmitted from a source NAN device to a destination NAN device by being propagated along a path, hopping from one NAN device to the next until the destination is reached.

Each NAN device 404 is configured to transmit two types of beacons: NAN discovery beacons and NAN synchronization beacons. When a NAN device 404 is turned on, or otherwise when NAN-functionality is enabled, the NAN device periodically transmits NAN discovery beacons (for example, every 100 TUs, every 128 TUs or another suitable period) and NAN synchronization beacons (for example, every 512 TUs or another suitable period). Discovery beacons are management frames, transmitted between discovery windows, used to facilitate the discovery of NAN clusters. A NAN cluster is a collection of NAN devices within a NAN network that are synchronized to the same clock and discovery window schedule using a time synchronization function (TSF). To join NAN clusters, NAN devices 404 passively scan for discovery beacons from other NAN devices. When two NAN devices 404 come within a transmission range of one another, they will discover each other based on such discovery beacons. Respective master preference values determine which of the NAN devices 404 will become the master device. If a NAN cluster is not discovered, a NAN device 404 may start a new NAN cluster. When a NAN device 404 starts a NAN cluster, it assumes the master role and broadcasts a discovery beacon. Additionally, a NAN device may choose to participate in more than one NAN cluster within a NAN network.

The links between the NAN devices 404 in a NAN cluster are associated with discovery windows—the times and channel on which the NAN devices converge. At the beginning of each discovery window, one or more NAN devices 404 may transmit a NAN synchronization beacon, which is a management frame used to synchronize the timing of the NAN devices within the NAN cluster to that of the master device. The NAN devices 404 may then transmit multicast or unicast NAN service discovery frames directly to other NAN devices within the service discovery threshold and in the same NAN cluster during the discovery window. The service discovery frames indicate services supported by the respective NAN devices 404.

In some instances, NAN devices 404 may exchange service discovery frames to ascertain whether both devices support ranging operations. NAN devices 404 may perform such ranging operations ("ranging") during the discovery windows. The ranging may involve an exchange of fine timing measurement (FTM) frames (such as those defined in IEEE 802.11-REVmc). For example, a first NAN device 404 may transmit unicast FTM requests to multiple peer NAN devices 404. The peer NAN devices 404 may then transmit responses to the first NAN device 404. The first NAN device 404 may then exchange a number of FTM frames with each of the peer NAN devices 404. The first NAN device 404 may then determine a range between itself and each of the peer devices 404 based on the FTM frames and transmit a range indication to each of the peer NAN devices 404. For example, the range indication may include a distance value or an indication as to whether a peer NAN device 404 is within a service discovery threshold (for example, 3 meters (m)) of the first NAN device 404. NAN links between NAN devices within the same NAN cluster may persist over multiple discovery windows as long as the NAN devices remain within the service discovery thresholds of one another and synchronized to the anchor master of the NAN cluster.

Some NAN devices 404 also may be configured for wireless communication with other networks such as with a Wi-Fi WLAN or a wireless (for example, cellular) wide area network (WWAN), which may, in turn, provide access to external networks including the Internet. For example, a NAN device 404 may be configured to associate and communicate, via a Wi-Fi or cellular link 212, with an AP or base station 202 of a WLAN or WWAN network, respectively. In such instances, the NAN device 404 may include software-enabled access point (SoftAP) functionality enabling the STA to operate as a Wi-Fi hotspot to provide other NAN devices 404 with access to the external networks via the associated WLAN or WWAN backhaul. Such a NAN device 404 (referred to as a NAN concurrent device) is capable of operating in both a NAN network as well as another type of wireless network, such as a Wi-Fi BSS. In some such implementations, a NAN device 404 may, in a service discovery frame, advertise an ability to provide such access point services to other NAN devices 404.

There are two general NAN service discovery messages: publish messages and subscribe messages. Generally, publishing is a mechanism for an application on a NAN device to make selected information about the capabilities and services of the NAN device available to other NAN devices, while subscribing is a mechanism for an application on a NAN device to gather selected types of information about the capabilities and services of other NAN devices. A NAN device may generate and transmit a subscribe message when requesting other NAN devices operating within the same NAN cluster to provide a specific service. For example, in an active subscriber mode, a subscribe function executing within the NAN device may transmit a NAN service discovery frame to actively seek the availability of specific services. A publish function executing within a publishing NAN device capable of providing a requested service may, for example, transmit a publish message to reply to the subscribing NAN device responsive to the satisfaction of criteria specified in the subscribe message. The publish message may include a range parameter indicating the service discovery threshold, which represents the maximum distance at which a subscribing NAN device can avail itself of the services of the publishing NAN device. A NAN also may use a publish message in an unsolicited manner, for example, a publishing NAN device may generate and transmit a publish message to make its services discoverable for other NAN devices operating within the same NAN cluster. In a passive subscriber mode, the subscribe function does not initiate the transfer of any subscribe message, rather, the subscribe function looks for matches in received publish messages to determine the availability of desired services.

Subsequent to a discovery window is a transmission opportunity period. This period includes numerous resource blocks. A NAN device link (NDL) refers to the negotiated resource blocks between NAN devices used for NAN operations. An NDL can include more than one "hop." The number of hops depends on the number of devices between the device providing the service and the device consuming or subscribing to the service. An example of an NDL that includes two hops includes three NAN devices: the provider, the subscriber and a proxy to relay the information between the provider and the subscriber. In such a configuration, the first hop refers to the communication of information between the provider and the proxy, and the second hop refers to the communication of the information between the proxy and the subscriber. An NDL may refer to a subset of NAN devices capable of one-hop service discovery, but an NDL also may be capable of service discovery and subscription over multiple hops (a multi-hop NDL).

There are two general NDL types: paged NDL (P-NDL) and synchronized NDL (S-NDL). Each common resource block (CRB) of a P-NDL includes a paging window (PW) followed by a transmission window (TxW). All NAN devices participating in a P-NDL operate in a state to receive frames during the paging window. Generally, the participating NAN devices wake up during the paging window to listen on the paging channel to determine whether there is any traffic buffered for the respective devices. For example, a NAN device that has pending data for transmission to another NAN device may transmit a traffic announcement message to the other NAN device during the paging window to inform the other NAN device of the buffered data. If there is data available, the NAN device remains awake during the transmission window to exchange the data. If there is no data to send, the NAN device may transition back to a sleep state during the transmission window to conserve power. A NAN device transmits a paging message to its NDL peer during a paging window if it has buffered data available for the peer. The paging message includes, for example, the MAC addresses or identifiers of the destination devices for which data is available. A NAN device that is listed as a recipient in a received paging message transmits a trigger frame to the transmitting device and remains awake during the subsequent transmission window to receive the data. The NDL transmitter device transmits the buffered data during the transmission window to the recipient devices from whom it received a trigger frame. A NAN device that establishes an S-NDL with a peer NAN device may transmit data frames to the peer from the beginning of each S-NDL CRB without transmitting a paging message in advance.

Figure 5:
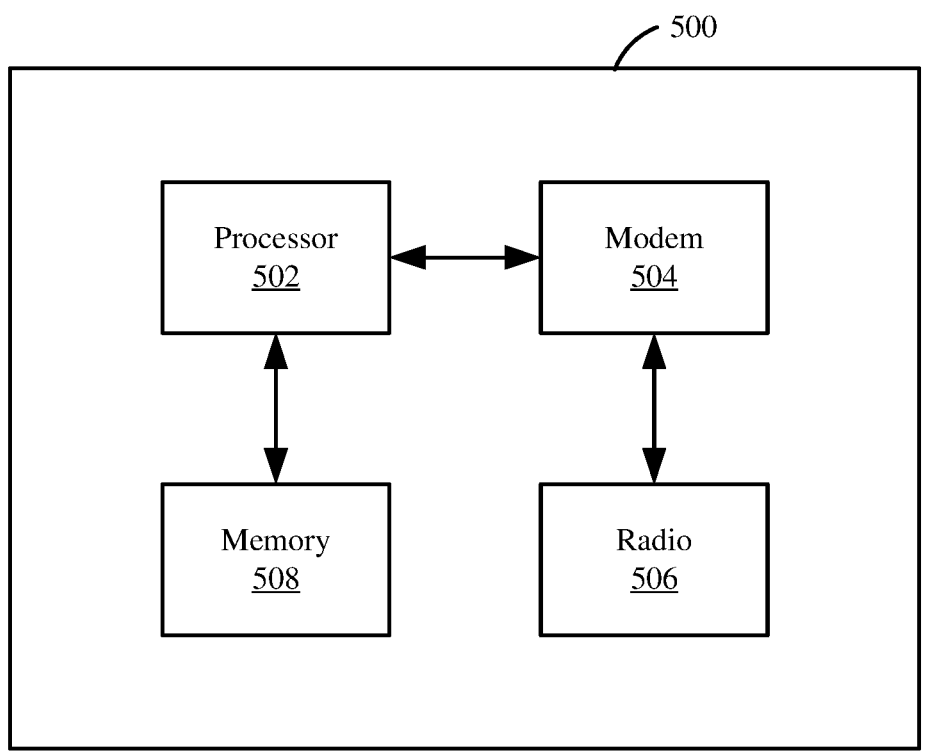
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more processors, processing blocks or processing elements 504 (collectively "the processor 504") coupled with the modem 502. In some implementations, the wireless communication device 500 additionally includes one or more radios 506 (collectively "the radio 506") coupled with the modem 502. In some implementations, the wireless communication device 500 further includes one or more memory blocks or elements 508 (collectively "the memory 508") coupled with the processor 504 or the modem 502.

The modem 502 can include an intelligent hardware block or device such as, for example, an application-specific integrated circuit (ASIC) among other possibilities. The modem 502 is generally configured to implement a PHY layer, and in some implementations, also a portion of a MAC layer (for example, a hardware portion of the MAC layer). For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC) circuitry, a coder, a decoder, a multiplexer and a demultiplexer. For example, while in a transmission mode, data obtained from the processor 506 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 504, for example, by detecting the presence of the signal and estimating the initial timing and frequency offsets. The DSP circuitry is further configured to digitally condition the signal, for example, using channel (narrow-band) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
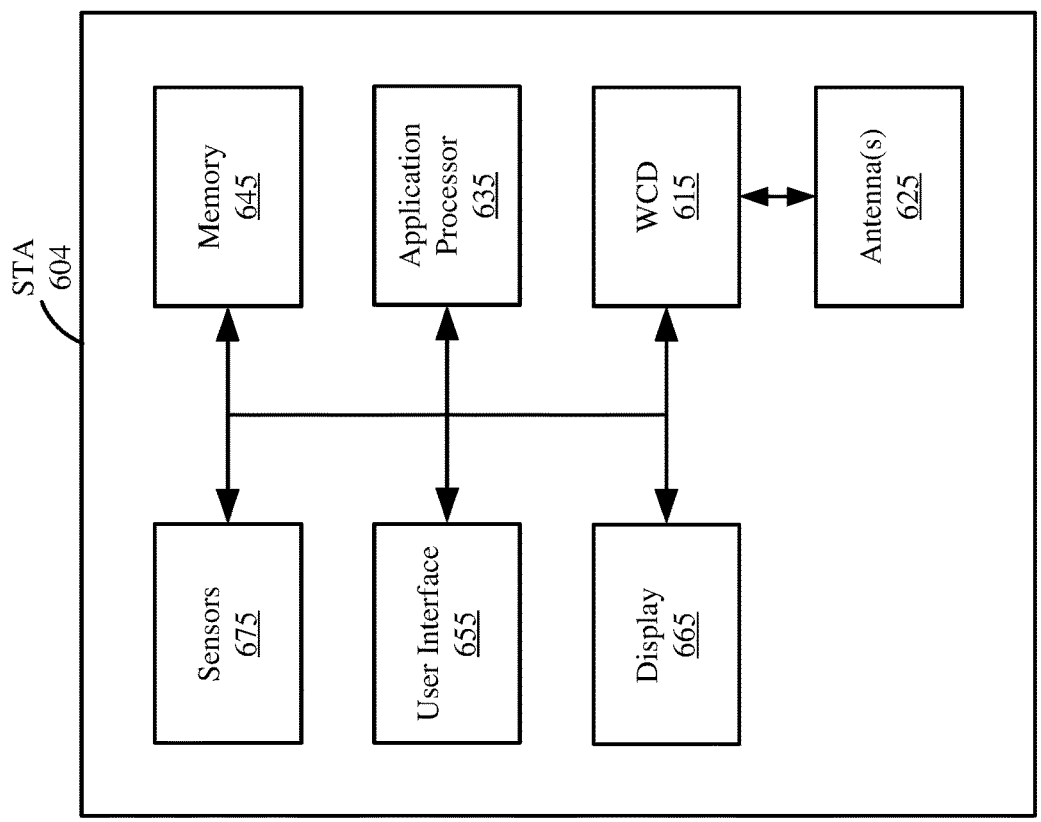
FIG. 6B shows a block diagram of an example station (STA).
Figure 6A:
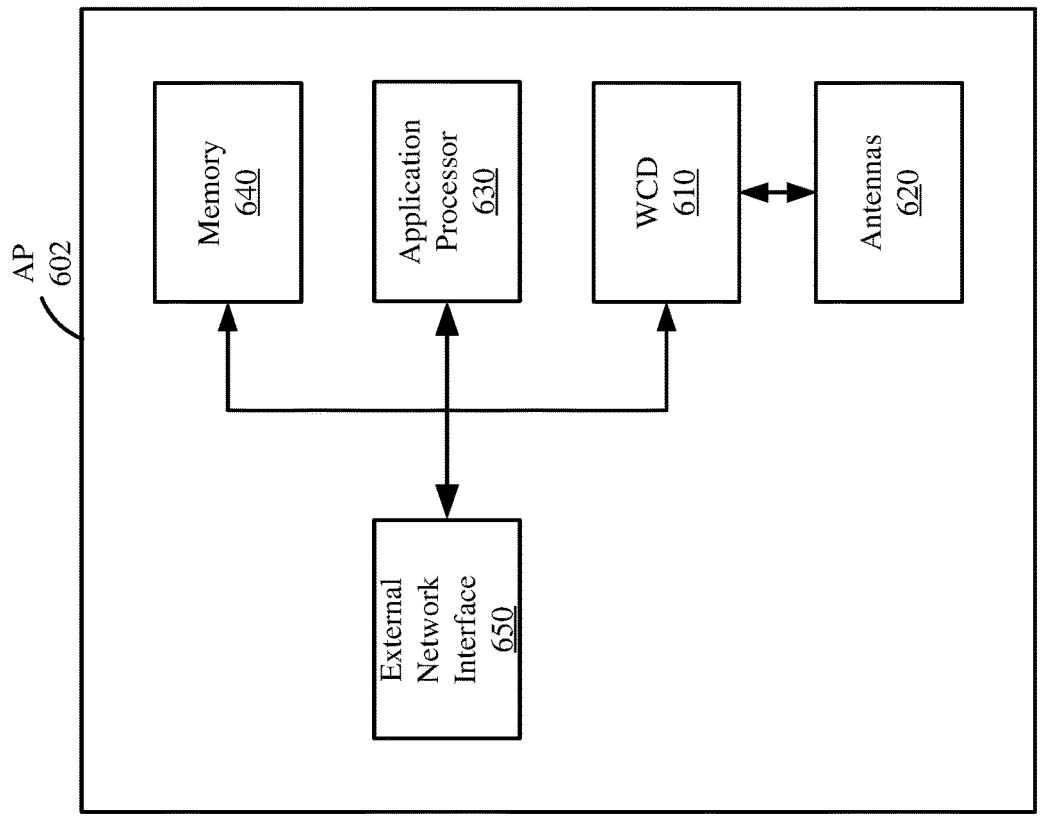
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 5000 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

In addition to participating in a WLAN, STAs may also participate in a peer-to-peer (P2P), ad hoc or mesh network. In such instances, STAs can communicate directly with each other via P2P wireless links without the use of an intermediary AP. In some deployments, regular infrastructure traffic to and from an AP and an associated set of STAs may interfere with P2P traffic among the STAs, or vice versa. Techniques for achieving coexistence are desired.

Recent wireless communication protocols, including IEEE 802.11be, may support scheduled access techniques in addition to, or as an alternative to, conventional DCF and EDCA techniques, enabling multiple APs and STAs to share and communicate over a wireless medium. Such wireless communication protocols may additionally or alternatively support the use of time and frequency resource sharing within a transmission opportunity.

Various aspects of the techniques, methods and devices disclosed herein relate generally to achieving coexistence between WLAN and peer-to-peer (P2P) or ad hoc networks, and specifically, to coordinated device-to-device (D2D) communications. Some aspects (described with reference to FIGS. 7-9, 18 and 19) particularly involve extending the capabilities of target wake time (TWT) elements transmitted by wireless access points to support periodic reserved access windows during which D2D-enabled wireless devices are permitted to transmit direct wireless communications to other D2D-enabled wireless devices.

Some other aspects (described with reference to FIGS. 10-14 and 20-22) relate to sharing time and frequency resources of a wireless medium, and more particularly, coordinated access point (CAP) time-division-multiple-access (TDMA) or CAP orthogonal-frequency-division-multiple-access (OFDMA) techniques for sharing the time and frequency resources of a transmission opportunity. According to such techniques, a wireless access point that wins contention and gains access to the wireless medium for the duration of a TXOP may share its time and frequency resources with other coordinated access points. The coordinated access points may then specifically allocate at least some of the time and frequency resources in their respective time and frequency resources specifically for D2D communications.

In some other aspects (described with reference to FIGS. 15-17, 23 and 24), a D2D-enabled wireless device may form or join a P2P network that also includes a first set of other D2D-enabled wireless devices. The D2D-enabled wireless device may receive a first indication from a wireless access point that indicates periodic coordinated access windows during which wireless access points are scheduled to contend for access and during which the set of D2D-enables wireless devices are not permitted to contend for access. The D2D-enabled wireless device may also receive a second indication of a reserved access window within one or more of the periodic coordinated access windows during which at least some of the set of D2D-enabled wireless devices are permitted to transmit direct wireless communications to other D2D-enabled wireless devices network despite the permissions associated with the first indication.

Figure 7:
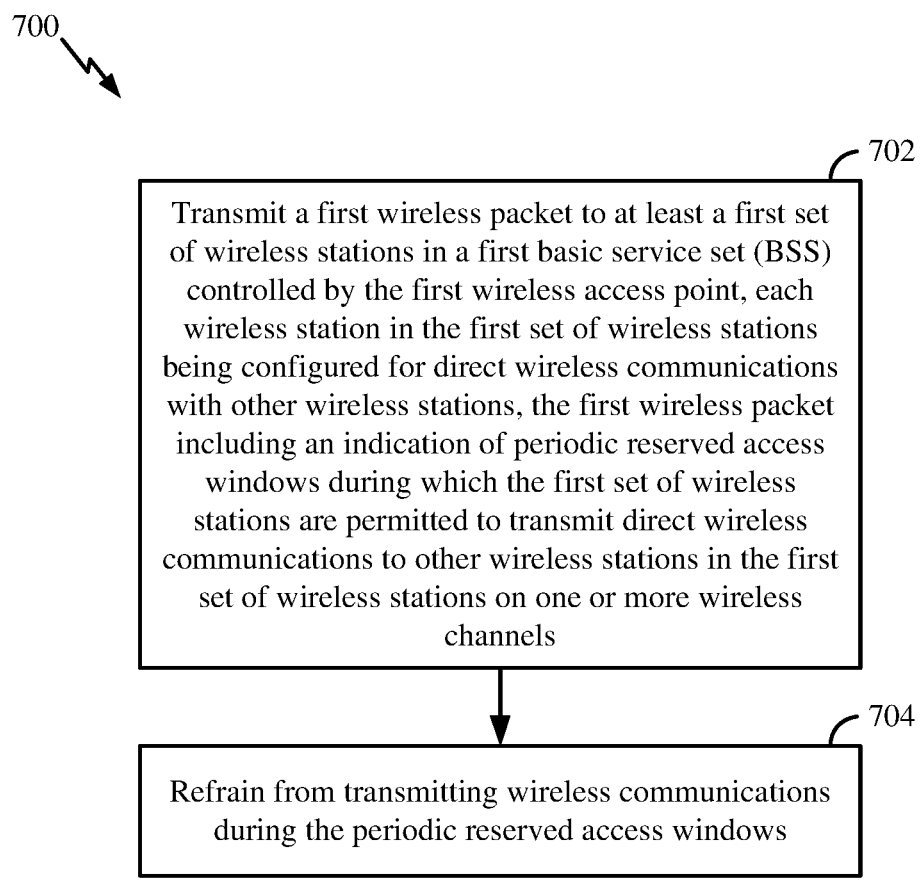
FIG. 7 shows a flowchart illustrating an example process for wireless communication that supports coordinated device-to-device (D2D) communications according to some implementations.

FIG. 7 shows a flowchart illustrating an example process 700 for wireless communication that supports coordinated D2D communications according to some implementations. The operations of the process 700 may be implemented by a wireless access point or its components as described herein. For example, the process 700 may be performed by a wireless communication device such as the wireless communication device 500 described above with reference to FIG. 5. In some implementations, the process 700 may be performed by a wireless access point, such as one of the APs 102 and 602 described above with reference to FIGS. 1 and 6A, respectively.

In block 702, the wireless communication device (hereinafter referred to as the first wireless access point with respect to FIG. 7) transmits a first wireless packet to at least a first set of wireless stations in a first BSS controlled by the first wireless access point. Each wireless station in the first set of wireless stations is also configured for D2D communications (also referred to generally herein as direct wireless communications) with other wireless stations. In some implementations, the first wireless packet includes an indication of periodic reserved access windows. The indication of the periodic reserved access windows indicates to the first set of wireless stations that they are permitted to transmit direct wireless communications to other wireless stations in the first set of wireless stations on one or more wireless channels. In some implementations, in block 704, the first wireless access point refrains from transmitting wireless communications during the periodic reserved access windows.

Figure 8:
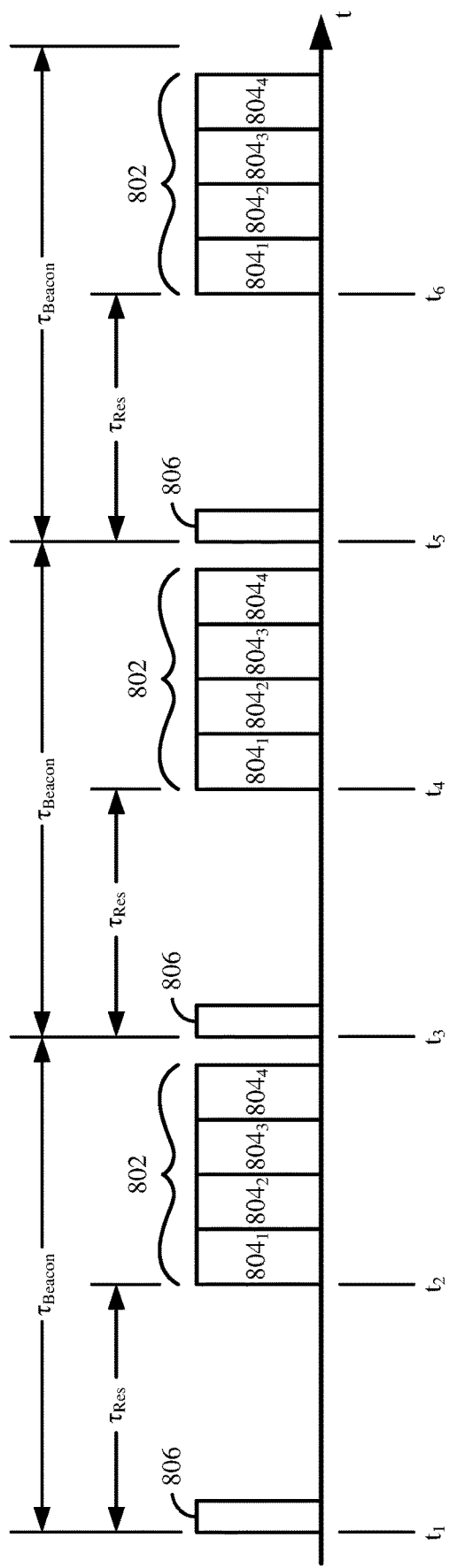
FIG. 8 shows a timing diagram illustrating example periodic reserved access windows that support coordinated D2D communications according to some implementations.

FIG. 8 shows a timing diagram illustrating example periodic reserved access windows 802 that support coordinated D2D communications according to some implementations. For example, the periodic reserved access windows 802 are examples of the periodic reserved access windows described with reference to the process 700. The periodic reserved access windows 802 recur according to a time interval $\tau_{Res}$ that may be synchronized with the transmissions of beacon frames 806 by the first wireless access point according to a beacon interval $\tau_{Beacon}$.

In some implementations, the first set of wireless stations are not permitted to transmit direct wireless data communications to other wireless stations outside of periodic reserved access windows 802 (but they may be able to transmit other direct non-data wireless communications in, for example, discovery windows outside of the reserved access windows). In some implementations, the indication of the periodic reserved access windows 802 indicates to the first set of wireless stations that they are permitted to transmit direct wireless communications to other wireless stations outside of the first set of wireless stations (for example, in other BSSs managed by other wireless access points) during at least a portion of one or more of the periodic reserved access windows 802. In some implementations, the indication of the periodic reserved access windows 802 indicates to other wireless stations in other BSSs that they are permitted to transmit direct wireless communications to other wireless stations, which may include the first set of wireless stations, on the one or more wireless channels during at least a portion of one or more of the reserved access windows 802.

In some implementations, the first wireless access point transmits a wireless packet such as the first wireless packet periodically. For example, each of the first wireless packet and the other periodic wireless packets may include a beacon frame such as one of the beacon frames 806. In some such implementations, each of the beacon frames includes one or more target wake time (TWT) information elements (IEs). Each TWT IE includes an indication of a schedule of wake periods for one or more wireless stations in the first BSS. For example, each TWT IE may be an individual TWT addressed to a single wireless station, or a broadcast TWT addressed to a set of wireless stations such as the first set of wireless stations. During each wake period, the wireless station or set of wireless stations identified in the respective TWT are to be awake to receive wireless communications from the first wireless access point. The identified wireless stations may also contend for access to the wireless medium during the respective wake periods in some implementations. In some implementations, at least one of the TWT IEs includes the indication of the periodic reserved access windows 802. For example, the indication of the periodic reserved access windows 802 may include an indication that each of the wake periods in the respective schedule of wake periods is a reserved access window 802. In some other implementations, the first wireless packet may be another type of frame, for example, another management frame such as a probe response frame that includes the indication of the periodic reserved access windows 802.

In some implementations, the process 700 further includes exchanging one or more wireless packets with one or more other wireless access points to coordinate a schedule of the periodic reserved access windows 802. For example, the exchange of the one or more wireless packets may include transmitting beacons and receiving beacons from the other wireless access points that each include timing information for coordinating the schedule of the periodic reserved access windows 802.

In some implementations, the TWT IE indicating the periodic reserved access windows 802 includes one or more other parameters for the periodic reserved access windows 802. In some implementations, the one or more other parameters include a time slot schedule defining a series of time slots in the periodic reserved access windows 802. For example, FIG. 8 shows an implementation in which each of the reserved access windows 802 is divided into a number of time slots 804. In some implementations, each of the time slots 804 may be separated from each other time slot 804 by an interframe space (IFS), for example, a short interframe space (SIFS). In the illustrated example, each of the reserved access windows 802 includes four time slots $804_1$-$804_4$, although the number of time slots may be more or less than four, and may be adjusted or distributed differently in different reserved access windows. In some such implementations, the process 700 further includes allocating each of one or more of the time slots 804 to a respective subset of the first set of wireless stations (for example, two or more wireless stations) for the direct wireless communications. For example, each subset of wireless stations in the first set of wireless stations may not be permitted to transmit direct wireless communications in another time slot allocated to a different subset of wireless stations in the first set of wireless stations.

In some implementations, during at least one of the time slots 804, at least some of the first set of wireless stations may be permitted to transmit or receive direct wireless communications to or from other wireless stations associated with other BSSs controlled by other access points. In some such implementations, the first wireless access point and other wireless access points may not restrict direct wireless communications to any individual BSS in at least one of the time slots 804. Additionally or alternatively, the first wireless access point and the other wireless access points may exchange one or more wireless packets to further coordinate a time slot schedule for the time slots 804 within at least one of the reserved access windows 802. In some such implementations, the exchange includes transmitting, to at least one of the wireless access points, identifiers of one or more wireless stations in the first set of wireless stations. The exchange further includes receiving, from the wireless access point, identifiers of one or more wireless stations associated with the wireless access point that are configured for direct wireless communications with other wireless stations. The two wireless access points may coordinate which wireless stations of the first set of wireless stations are permitted to transmit direct wireless communications to wireless stations associated with the other wireless access point during one or more time slots 804 allocated to the other wireless access point. Similarly, the coordination may include determining which wireless stations of the set of wireless stations associated with the other wireless access point are permitted to transmit direct wireless communications to wireless stations in the first set of wireless stations during one or more time slots 804 allocated to the first set of wireless stations.

In some implementations, for example, simplex implementations, wireless stations that receive direct wireless communications from other wireless stations in a respective time slot 804 are permitted to transmit an acknowledgment during a next time slot 804 in the respective reserved access window that acknowledges a direct wireless communication transmitted in the respective time slot 804.

In some implementations, the one or more other parameters identified in the indication of the periodic reserved access window 802 may further include a frame type for direct wireless communication permitted to be transmitted during the periodic reserved access windows 802 or any other control information for controlling direct wireless communication during the reserved access windows 802.

In some implementations, the process 700 further includes transmitting a trigger frame to the first set of wireless stations at a beginning of a reserved access window 802 that triggers or initiates direct wireless communications by the wireless stations in the first set of wireless stations. For example, the trigger frame may indicate to the first set of wireless stations that they are permitted to contend for access during respective slots within the reserved access window 802. In some other implementations, the process 700 may further include transmitting a reverse direction grant (RDG) to one or more of the wireless stations in the first set of wireless stations to initiate the direct wireless communications with other wireless stations.

As described above, in some implementations, for example, to reduce congestion caused by direct wireless communications outside of the reserved access windows 802, the first wireless access point may instruct the first set of wireless stations to not transmit direct wireless communications (except for direct wireless communications during discovery windows) outside of the periodic reserved access windows 802. In some such implementations, the first wireless packet or another wireless packet may include one or more quiet elements. Each quiet element may indicate to any wireless stations within range, including the first set of wireless stations, that they are not permitted to transmit on the one or more wireless channels during quiet periods associated with the quiet elements. For example, each quiet element may include multiple fields including an element identification (ID), a length, a quiet count, a quiet period, a quiet duration and a quiet offset as, for example, defined in the IEEE 802.11 specification. Additionally or alternatively, to reduce congestion caused by direct wireless communications outside of the reserved access windows 802, the first wireless access point may include an indication in the first wireless packet to the first set of wireless stations to follow one or more multi-user (MU) enhanced distributed channel access (EDCA) parameters outside of the periodic reserved access windows 802.

In some implementations, the first set of wireless stations may be enabled for NAN operation and the direct wireless communications may include NAN communications. In some such implementations, the first wireless access point may permit only the wireless stations in the NAN network to access the one or more wireless channels in the periodic reserved access windows 802. For example, the indication of the periodic reserved access windows 802 transmitted in block 702 may include an indication of a NAN cluster ID identifying the wireless stations that are allocated access to the one or more wireless channels during the reserved access windows 802. In some implementations, the first set of wireless stations may not be permitted to transmit direct wireless communications to other wireless stations outside of the periodic reserved access windows 802 except for direct wireless communications in NAN discovery windows (that is, direct wireless data communications are not permitted outside of the periodic reserved access windows 802). The first set of wireless stations may operate a NAN network alone or in combination with other NAN-enabled wireless stations, which may be associated with other BSSs controlled by other wireless access points.

In some such implementations, the process 700 may further include receiving, from at least one wireless station in the first set of wireless stations, a wireless packet including an action frame that indicates one or more parameters associated with the NAN network including a timing of a periodic NAN discovery window. In some other implementations, the process 700 may further include scanning one or more NAN discovery channels and determining that the first set of wireless stations is operating a NAN network. The first wireless access point may then identify one or more parameters associated with the NAN network including a timing of a NAN discovery window.

In some such implementations, the first wireless access point may transmit a wireless packet to each of one or more other wireless access points that includes an indication of the one or more parameters associated with the NAN network. The first wireless access point and the other wireless access points may then schedule the periodic reserved access windows 802 based on the one or more parameters associated with the NAN network including the timing of the NAN discovery window. In some such implementations, the scheduling of the periodic reserved access windows 802 includes synchronizing the periodic reserved access windows with the periodic NAN discovery windows.

Figure 9:
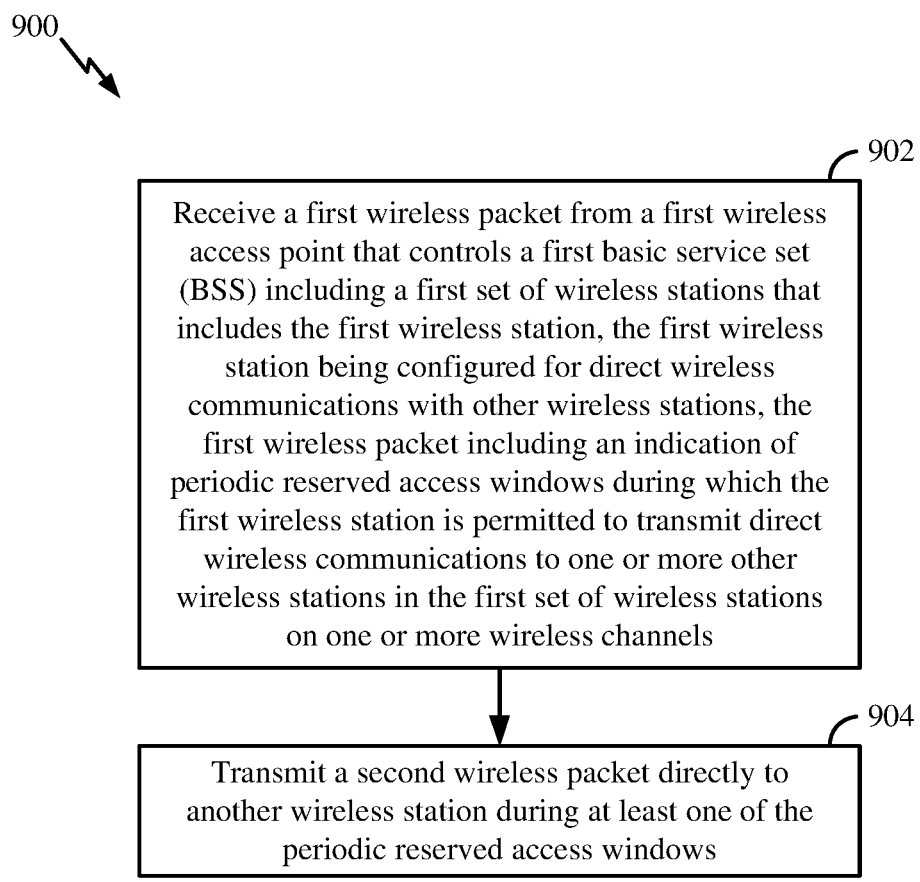
FIG. 9 shows a flowchart illustrating an example process for wireless communication that supports coordinated D2D communications according to some implementations.

FIG. 9 shows a flowchart illustrating an example process 900 for wireless communication that supports coordinated D2D communications according to some implementations. The operations of the process 900 may be implemented by a wireless station or its components as described herein. For example, the process 900 may be performed by a wireless communication device such as the wireless communication device 500 described above with reference to FIG. 5. In some implementations, the process 900 may be performed by a wireless communication device operating as or within a wireless station, such as one of the STAs 104 and 604 described above with reference to FIGS. 1 and 6B, respectively.

In block 902, the wireless communication device (hereinafter referred to as the first wireless station with respect to FIG. 9) receives a first wireless packet from a first wireless access point that controls a first BSS including a first set of wireless stations that includes the first wireless station. The first wireless station is also configured for direct (D2D) wireless communications with other wireless stations. The first wireless packet includes an indication of periodic reserved access windows 802 during which the first wireless station is permitted to transmit direct wireless communications to one or more other wireless stations in the first set of wireless stations on one or more wireless channels. In block 904, the first wireless station transmits a second wireless packet directly to another wireless station during at least one of the periodic reserved access windows 802.

As described above with reference to the process 700 of FIG. 7, in some implementations, the first set of wireless stations, including the first wireless station, are not permitted to transmit direct wireless data communications to other wireless stations outside of the periodic reserved access windows 802 (but they may be able to transmit other direct non-data wireless communications in, for example, discovery windows outside of the reserved access windows 802). In some implementations, the indication of the periodic reserved access windows 802 indicates to the first set of wireless stations that they are permitted to transmit direct wireless communications to other wireless stations outside of the first set of wireless stations (for example, in other BSSs managed by other wireless access points) during at least a portion of one or more of the periodic reserved access windows 802. In some implementations, the indication of the periodic reserved access windows 802 indicates to other wireless stations in other BSSs that they are permitted to transmit direct wireless communications to other wireless stations, which may include the first set of wireless stations, on the one or more wireless channels during at least a portion of one or more of the reserved access windows 802.

As described above, in some implementations, the first wireless station receives a wireless packet such as the first wireless packet periodically. For example, each of the first wireless packet and the other periodic wireless packets may include a beacon frame such as one of the beacon frames 806. In some such implementations, each of the beacon frames includes one or more TWT IEs. As described with reference to the process 700 of FIG. 7, in some implementations, at least one of the TWT IEs includes the indication of the periodic reserved access windows 802. For example, the indication of the periodic reserved access windows 802 may include an indication that each of the wake periods in the respective schedule of wake periods is a reserved access window 802.

In some implementations, the TWT IE indicating the periodic reserved access windows 802 includes one or more other parameters for the periodic reserved access windows 802. As described above, in some implementations, the one or more other parameters include a time slot schedule defining a series of time slots in the periodic reserved access windows 802. In some such implementations, the process 900 further includes receiving an indication that at least one of the time slots is allocated to the first wireless station, or a group of wireless stations in the first set of wireless stations that includes the first wireless station.

In some implementations, the one or more other parameters identified in the indication of the periodic reserved access window 802 may further include a frame type for direct wireless communication permitted to be transmitted during the periodic reserved access windows 802 or any other control information for controlling direct wireless communication during the reserved access windows 802.

In some implementations, the process 900 further includes receiving a trigger frame from the first wireless access point at a beginning of a reserved access window 802 that triggers or initiates the first wireless station to transmit the second wireless packet in block 904. For example, the trigger frame may indicate to the first wireless station that it is permitted to contend for access during one or more slots within the reserved access window 802. In some other implementations, the process 900 further includes receiving an RDG frame from the first wireless access point that triggers or initiates the first wireless station to transmit the second wireless packet in block 904.

In some implementations, the first set of wireless stations may be enabled for NAN operation and the direct wireless communications may include NAN communications. In some such implementations, only wireless stations in the NAN network are permitted to access the one or more wireless channels in the periodic reserved access windows 802. For example, the indication received in block 902 of the periodic reserved access windows 802 may include an indication of a NAN cluster ID identifying the wireless stations that are allocated access to the one or more wireless channels during the reserved access windows 802. In some implementations, the first set of wireless stations may not be permitted to transmit direct wireless communications to other wireless stations outside of the periodic reserved access windows 802 except for direct wireless communications in NAN discovery windows (that is, direct wireless data communications are not permitted outside of the periodic reserved access windows 802). The first set of wireless stations may operate a NAN network alone or in combination with other NAN-enabled wireless stations, which may be associated with other BSSs controlled by other wireless access points.

In some implementations, the first wireless station may form or join a NAN network that includes the first set of wireless stations before the performance of the process 900. In some such implementations, the first wireless station transmits a wireless packet including an action frame to the first wireless access point that indicates one or more parameters associated with the NAN network including a timing of a NAN discovery window. In some other implementations, the first wireless station may periodically broadcast wireless packets including action frames that indicate the one or more parameters associated with the NAN network including the timing of the NAN discovery window.

In some implementations, the first wireless station transmits a wireless packet to one or more wireless stations in the NAN network in each of one or more of the NAN discovery windows that includes an indication of the periodic reserved access windows 802. In some implementations, the first wireless station exchanges one or more wireless packets with at least one other wireless station in the NAN network to set up a NAN data link (NDL) during at least one access window of the periodic reserved access windows 802. In such implementations, the first wireless station transmits the second wireless packet in block 904 directly to the other wireless station via the NDL.

In some other implementations, the first wireless station may establish a tunneled direct link setup (TDLS) link with each of one or more other wireless stations in the first set of wireless stations. In such implementations, the first wireless station may transmit the second wireless packet directly to the other wireless station via the TDLS link.

Various other aspects relate generally to sharing time or frequency resources of a wireless medium. Particular implementations relate more specifically to coordinated AP (CAP) time-division-multiple-access (TDMA) or CAP orthogonal-frequency-division-multiple-access (OFDMA) techniques for sharing the time and frequency resources of a transmission opportunity. According to such techniques, a wireless access point that wins contention and gains access to the wireless medium for the duration of a TXOP may share its time and frequency resources with other coordinated access points. To share its time resources, the winning access point may partition the TXOP into multiple TXOP segments or bandwidth segments. For example, the winning access point may assign, grant or allocate (hereinafter used interchangeably) itself one or more of the time segments and bandwidth segments and also allocate each of one or more remaining time or frequency segments to one or more other ones of the coordinated access points. In some implementations, the wireless access points may further allocate at least some of the time and frequency resources in their respective time and bandwidth segments specifically for D2D communications.

Figure 10:
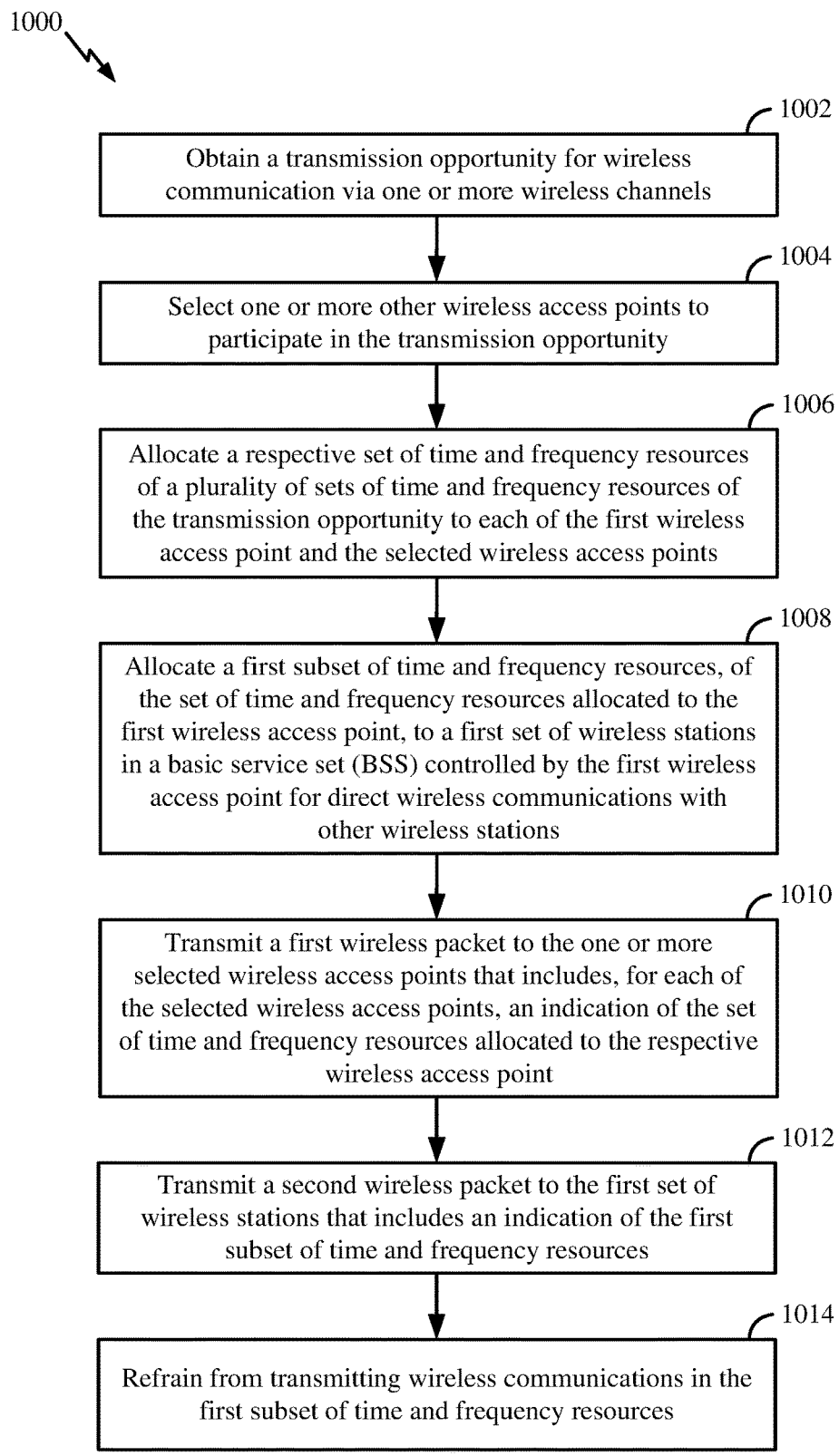
FIG. 10 shows a flowchart illustrating an example process for wireless communication that supports coordinated D2D communications according to some implementations.

FIG. 10 shows a flowchart illustrating an example process 1000 for wireless communication that supports coordinated D2D communications according to some implementations. The operations of the process 1000 may be implemented by a wireless access point or its components as described herein. For example, the process 1000 may be performed by a wireless communication device such as the wireless communication device 500 described above with reference to FIG. 5. In some implementations, the process 1000 may be performed by a wireless access point, such as one of the APs 102 and 602 described above with reference to FIGS. 1 and 6A, respectively.

In block 1002, the wireless communication device (hereinafter referred to as the first wireless access point or TXOP owner with respect to FIG. 10) obtains a TXOP for wireless communication via one or more wireless channels. In block 1004, the first wireless access point selects one or more other wireless access points to participate in the TXOP. In block 1006, the first wireless access point allocates a respective set of time and frequency resources of multiple sets of time and frequency resources of the TXOP to each of itself and the selected wireless access points. In block 1008, the first wireless access point allocates a first subset of time and frequency resources, of the set of time and frequency resources allocated to the first wireless access point, to a first set of wireless stations in a first BSS controlled by the first wireless access point for direct (D2D) wireless communications with other wireless stations. In block 1010, the first wireless access point transmits a first wireless packet to the one or more selected wireless access points that includes, for each of the selected wireless access points, an indication of the set of time and frequency resources allocated to the respective wireless access point. In block 1012, the first wireless access point transmits a second wireless packet to the first set of wireless stations that includes an indication of the first subset of time and frequency resources. In block 1014, the first wireless access point refrains from transmitting wireless communications in the first subset of time and frequency resources.

Figure 11:
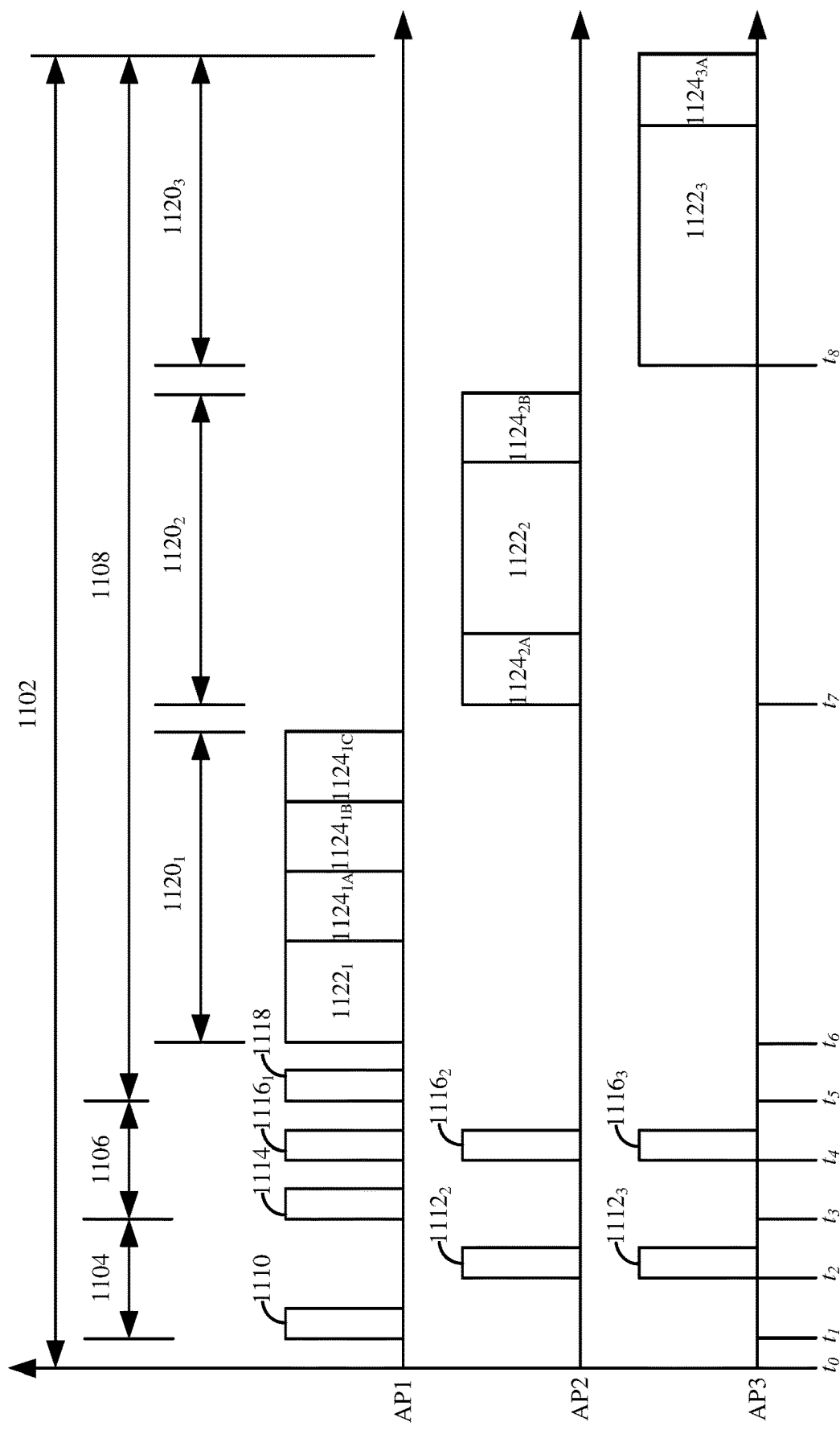
FIG. 11 shows a timing diagram illustrating example reserved time resources that support coordinated D2D communications according to some implementations.

FIG. 11 shows a timing diagram illustrating example reserved time resources that support coordinated D2D communications according to some implementations. For example, the first wireless access point and neighboring access points may be configured for coordinated access point (CAP) TDMA. The first wireless access point (AP1) obtains a TXOP 1102 in block 1002 and shares it with one or multiple other coordinated access points (for example, AP2 and AP3) using TDMA. As illustrated in FIG. 11, in some implementations, the TXOP 1102 includes multiple phase or stages including a first TXOP indication phase 1104, a second schedule allocation phase 1106, and a third data transmission phase 1108.

In some implementations, to obtain the TXOP 1102 in block 1002, the first wireless access point contends for access to the wireless medium on one or more channels including a primary operating channel (for example, a primary 20 MHz channel and one or more secondary 20 MHz, 40 MHz, 80 MHz or 160 MHz channels) using, for example, CSMA/CA and enhanced distributed channel access (EDCA) techniques. The TXOP 1102 may be obtained at time to for a wideband wireless channel, such as a bonded channel formed by the primary channel and the one or more secondary channels. For example, the wideband wireless channel may be a 40 MHz, 80 MHz, 160 MHz or 320 MHz channel.

In some implementations, after obtaining the TXOP 1102, and to ensure interference-free communications during the TXOP 1102, the first wireless access point may further reserve the wireless channel by transmitting a request-to-send (RTS) frame (not shown) to one or more of its associated wireless stations. The RTS frame is configured to cause at least one of the stations to transmit a clear-to-send (CTS) frame. Any other wireless communication devices, including the wireless access points AP2 and AP3, and their associated wireless stations, that receive either or both of the RTS or CTS frames may set their respective NAVs for a duration of time indicated in the RTS or CTS frames.

In some implementations, to select the one or more other coordinated wireless access points to participate in the TXOP 1102 in block 1004, the first wireless access point performs a TXOP availability indication process during the TXOP indication phase 1104 during which the first wireless access point learns of the other access points' desires or intents to participate in the TXOP 1102. For example, the process 1000 may further include, during the TXOP indication phase 1104, advertising an availability of time resources in the TXOP 1102. Specifically, at time $t_1$, the first wireless access point transmits a CAP TXOP indication (CTI) frame 1110 to other wireless access points, for example, other access points in its extended service set (ESS), that indicates that the time resources of the TXOP 1102 can be shared by the first wireless access point. For example, the first wireless access point may have previously become aware of the other neighboring access points in its vicinity based on information in beacons or other management frames received from the other access points.

After transmitting the CTI frame 1110, the first wireless access point may receive, at time $t_2$, a CAP TXOP request (CTR) frame 1112 from each of one or more candidate APs that indicates a desire by the respective access point to participate in the TXOP 1102. In the example illustrated in FIGS. 11, AP2 and AP3 are among the candidate APs that transmit respective CTR frames $1112_2$ and $1112_3$ to the first wireless access point. Based on the receipt of the CTR frames 1112, the first wireless access point may then select one or more of the candidate APs to participate in the TXOP 1102.

In some implementations, the CTI frame 1110 includes at least one trigger frame configured to trigger the one or more candidate access points to transmit the respective CTR frames 1112. To transmit the CTI frame 1110, the first wireless access point may transmit a PPDU that includes a same CTI trigger frame in each of multiple subchannels of the wireless channel (for example, in each of multiple 20 MHz channels). For example, the CTI frame 1110 may include a non-high-throughput (non-HT) duplicate trigger frame in each 20 MHz channel. In this way, the other access points do not need to be operating on the same primary 20 MHz channel to receive and process the CTI frame 1110. In some implementations, a source address field and a BSSID field (for example, in a MAC header) associated with the CTI frame 1110 are set to the MAC address of the first wireless access point and a destination address field (for example, in the MAC header) associated with the CTI frame 1110 is set to a broadcast address.

Each duplicate trigger frame of the CTI frame 1110 may include, for each of the multiple access points that may participate in the TXOP 1102, an indication of one or both of frequency resources or spatial resources usable by the respective access point to transmit its respective CTR frame 1112. For example, each trigger frame of the CTI frame 1110 may include a user information field for each of the access points that includes the respective indication of the frequency resources or the spatial resources the access point is to use to transmit its CTR frame 1112. Each user information field may include a respective AP identifier (APID) of the respective access point. For example, the APID may be a MAC address of the access point, a BSSID associated with the access point or a BSS color associated with the access point. In some other implementations in which the first wireless access point may not be aware of some or all of the neighboring access points, the CTI frame 1110 may include an indication of random access resources usable by the access points to transmit their respective CTR frames 1112.

The CTR frames 1112 may be received from the candidate access points in respective trigger-based PPDUs in response to the CTI frame 1110 using the frequency or spatial resources allocated by the CTI frame 1110. For example, the CTR frames 1112 may be transmitted via MU OFDMA or MU MIMO techniques and may be received at time $t_4$ a SIFS duration after the CTI frame 1110. Notably, for the access points capable of CAP TDMA, the CTI frame 1110 is configured to cause the access points to respond with respective CTR frames 1112 regardless of their respective NAVs.

In some implementations, the first wireless access point may transmit multiple CTI frames 1110, each to a respective one of the access points, on an AP-by-AP sequential basis. An access point desiring to participate in the TXOP 1102 may transmit, in response to receiving a respective one of the CTI frames 1110, a CTR frame 1112 before the transmission of a next CTI frame 1110 to a next one of the APs. For example, each CTI frame 1110 may be a poll frame and each CTR frame 1112 may be a poll response frame. Such CTI frames 1110 and CTR frames 1112 may be transmitted as single-user (SU) transmissions. In some other implementations, the first wireless access point may transmit a single CTI frame 1110, and subsequently, transmit a polling frame (poll) to each of the access points, on an AP-by-AP sequential basis, that solicits a response CTR frame 1112 from the respective access point before the transmission of a poll to a next one of the access points.

In some implementations, each of the CTR frames 1112 may include an indication of a buffer status of the respective AP or a duration of time resources requested by the respective AP. In some such implementations, the first wireless access point may select the candidate access points to participate in the TXOP 1102 in block 1004 based on the indications of the buffer statuses or the desired durations of time resources received in the CTR frames 1112.

As described above, in block 1006, the first wireless access point may allocate a respective set of time and frequency resources of the TXOP 1102 to itself and to each of the selected access points. In some implementations, the frequency resources in each set of time and frequency resources overlap entirely throughout the bandwidth while the time resources do not overlap at all for the duration of the TXOP 1202. In some other implementations or instances, the frequency resources may also not overlap in at least some portions of the bandwidth. As such, in some implementations, the first wireless access point may further allocate different frequency resources in addition to different time resources.

For example, the first wireless access point may divide the available time resources of the TXOP 1102 into multiple time segments 1120, each comprising one or more time resources for itself or one of the selected access points, and each not overlapping with any of the other time segments 1120. For example, each of the time segments may include one or more symbols or time slots or other time units. In some implementations, the first wireless access point divides the TXOP 1102 into equal time segments 1120, where the number of equal time segments 1120 is equal to the number of access points sharing the TXOP 1102. For example, as illustrated in FIG. 11, the first wireless access point may partition the TXOP 1102 into three equal time segments 1120, one time segment $1120_1$ for the first wireless access point, one time segment $1120_2$ for the selected access point AP2, and one time segment $1120_3$ for the third access point AP3. In some other implementations or instances, the first wireless access point may partition the time resources into unequal time segments 1120. For example, the first wireless access point may select for itself a longer time segment $1120_1$ of the TXOP 1102 including more time resources than that in the other time segments 1120 allocated to the other selected access points. In some implementations in which the CTR frames 1112 include indications of buffer statuses or desired durations of time resources, the first wireless access point may base the allocations of the time resources to the selected access points based on their respective buffer statuses or requested time resources.

As described above, in block 1008, the first wireless access point may allocate a subset of time and frequency resources of the TXOP 1102 to at least a first set of wireless stations in the BSS controlled by the first wireless access point for direct wireless communications. For example, in some implementations, the first wireless access point partitions the available time resources of the time segment $1120_1$ into multiple portions including a portion $1122_1$ it reserves for regular infrastructure BSS traffic from itself to the first set of wireless stations or from the first set of wireless stations to itself. The time segment $1120_1$ further includes a portion, including the subset of time resources, that may be reserved for direct wireless communications between the first set of wireless stations or other wireless stations associated with other BSSs. In some implementations, the first set of wireless stations are not permitted to transmit direct wireless data communications to other wireless stations outside of the subset of time and frequency resources reserved for direct wireless communications.

In some implementations, the first wireless access point divides the portion reserved for the direct wireless communications into one or multiple time slots $1124_1$, each comprising one or more time resources. For example, each of the time slots may represent one symbol, multiple symbols, or other time units. In some implementations, each of the time slots $1124_1$ may be separated from each other time slot $1124_1$ by an IFS, for example, a SIFS. In some implementations, the first wireless access point divides the portion reserved for the direct wireless communications into equal length time slots $1124_1$. In some other implementations or instances, the first wireless access point may partition the time resources into unequal time slots 1124. In the illustrated example, the time segment $1120_1$ includes three time slots $1124_{1A}$, $1124_{2B}$ and $1124_{3C}$, although the number of time slots may be more or less than three, and may be adjusted or distributed differently in different time segments 1120 within the same TXOP 1102 or subsequent TXOPs 1102.

In some such implementations, block 1008 of the process 1000 may further include allocating each of one or more of the time slots $1124_1$ to a respective subset of the first set of wireless stations (for example, two or more wireless stations) for the direct wireless communications. For example, each subset of wireless stations in the first set of wireless stations may not be permitted to transmit direct wireless communications in another one of the time slots $1124_1$ allocated to a different subset of wireless stations in the first set of wireless stations. In some implementations, during at least one of the time slots $1124_1$, for example, a last time slot $1124_{1C}$, at least some (or all) of the first set of wireless stations may be permitted to transmit or receive direct wireless communications to or from other wireless stations associated with other BSSs controlled by other access points including AP2 and AP3. In some such implementations, the first wireless access point and other wireless access points may not restrict direct wireless communications to any individual BSS in the time slot $1124_{1C}$.

Additionally or alternatively, the first wireless access point and the selected wireless access points including AP2 and AP3 may exchange one or more wireless packets to further coordinate a time slot schedule for the time slots 1124 in the time segments 1120. For example, the exchange may include transmitting, to at least one of the selected access points, identifiers of one or more wireless stations in the first set of wireless stations. For example, each of the wireless stations may be uniquely identified by a combination of BSS color and associated identifier (AID). The exchange may further include receiving, from the wireless access points, identifiers of one or more wireless stations associated with the wireless access point that are configured for direct wireless communications with other wireless stations. The first wireless access point and the other wireless access points may coordinate which wireless stations of the first set of wireless stations are permitted to transmit direct wireless communications to wireless stations associated with the other wireless access point during one or more time slots, for example, time slots $1124_2$ and $1124_3$ allocated to the other wireless access points AP2 and AP3, respectively. Similarly, the coordination may include determining which wireless stations of the set of wireless stations associated with the other wireless access points are permitted to transmit direct wireless communications to wireless stations in the first set of wireless stations during one or more time slots of the time slots $1124_1$ allocated to the first set of wireless stations.

Similarly, each of the selected access points AP2 and AP3 may partition its allocated time segment $1120_2$ or $1120_3$, respectively, into a portion $1122_2$ or $1122_3$, respectively, it reserves for regular infrastructure BSS traffic with associated wireless stations in its BSS. As described above, each of the time segments $1120_2$ and $1120_3$ further includes a portion, including a subset of time resources, that may be reserved for direct wireless communications between the respective wireless stations or other wireless stations associated with other BSSs including the first set of wireless stations. As further described above, each of the access points AP2 and AP3 may divide the portion reserved for the direct wireless communications into one or multiple time slots $1124_2$ or $1124_3$, respectively, each comprising one or more time resources. In some implementations, as described further below, the first wireless access point and the selected access points AP2 and AP3 may be configured to synchronize the timing of at least overlapping ones of the time slots $1124_1$, $1124_2$ and $1124_3$.

Each of the access points AP2 and AP3 may allocate each of one or more of the time slots $1124_2$ and $1124_3$, respectively, to a respective subset of the wireless stations associated with the respective access point for the direct wireless communications. In some implementations, at least some of the time slots 1124 may be coordinated or correspond with each other. For example, during at least one of the time slots $1124_1$, $1124_2$ and $1124_3$, for example, corresponding common time slots $1124_{1C}$, $1124_{2B}$ and $1124_{3A}$, respectively, in each of the time segments $1120_1$, $1120_2$ and $1120_3$, respectively, at least some (or all) of the wireless stations associated with the respective access points may be permitted to transmit or receive direct wireless communications to or from other wireless stations associated with the other BSSs controlled by the other access points. In some such implementations, the first wireless access point and the selected access points AP2 and AP3 may not restrict direct wireless communications to any individual BSS in the common time slot.

After selecting the access points to participate in the TXOP 1102 in block 1004 and allocating the sets of time (and in some implementations, frequency) resources in blocks 1004 and 1006, the first wireless access point then grants, schedules or otherwise actually allocates (for example, indicates the allocations of) the respective time resources to the selected access points in the schedule allocation phase 1106. For example, the first wireless access point may transmit, at time $t_3$, a CAP TXOP AP schedule (CTAS) frame 1114 that includes, for each of the selected access points, the indication of the time (and in some implementations, frequency) resources allocated to the respective access point and usable by the respective access point and its BSS to transmit data to, or receive data from, one or more respective associated wireless stations during the TXOP 1102. For example, the CTAS frame 1114 may be transmitted at time $t_3$ a SIFS duration after the CTR frames 1112. In such implementations, the first wireless packet transmitted by the first wireless access point in block 1010 of the process 1000 includes the CTAS frame 1114.

To transmit the CTAS frame 1114, the first wireless access point may transmit a PPDU that includes a same CTAS trigger frame in each of multiple subchannels of the wireless channel (for example, in each of multiple 20 MHz channels). For example, the CTAS frame 1114 may include a non-HT duplicate trigger frame in each 20 MHz channel. In this way, the other access points do not need to be operating on the same primary 20 MHz channel to receive and process the CTAS frame 1114. In some implementations, a source address field and a BSSID field (for example, in a MAC header) associated with the CTAS frame 1114 are set to the MAC address of the first wireless access point and a destination address field (for example, in the MAC header) associated with the CTAS frame 1114 is set to a broadcast address.

Each duplicate trigger frame of the CTAS frame 1114 may include, for each of the selected access points, an indication of the time resources allocated to the respective access point and its BSS. For example, each trigger frame of the CTAS frame 1114 may include a user information field for each of the selected access points. Each user information field may include a respective APID of a respective access point. For example, the APID may be a MAC address of the access point, a BSSID associated with the access point or a BSS color associated with the access point. Each user information field includes, for the respective access point, an indication of a starting time of the respective allocated time resources. For example, the user information field may include an indication of a symbol, a time slot or an absolute or relative time at which the allocated time resources begin. The user information field may also include a duration of the respective allocated time resources, for example, in units of symbols, time slots or milliseconds (ms). In some implementations, the CTAS frame 1114 further includes, for example, in one or more user information fields, an indication of a time slot schedule, and in some instances, identifiers of the wireless stations allocated use of the respective time slots. Each user information field may further include, for the respective selected access point, an indication of frequency resources available for use by the respective access point while using the respective allocated time resources. For example, the user information field may indicate one or more channels or subchannels (for example, one or more 20 MHz channels) or one or more resource units (RUs) usable by the respective access point and its BSS while using the allocated time resources. As described elsewhere herein, in some implementations or instances, the first wireless access point and one or more of AP2 and AP3 may be configured for communication via CAP TDMA as well as CAP OFDMA simultaneously. As described above, in other implementations or instances, the CTAS frame 1114 may allocate all of the available frequency resources to each of the selected access points for use while using their respective allocated time resources.

After transmitting the CTAS frame 1114, the first wireless access point, at time $t_4$, transmits a CAP TXOP Local Schedule (CTLS) frame $\mathbf{1116_1}$ to the first set of wireless stations in its BSS. Similarly, each of the selected access points AP2 and AP3 may also transmit respective CTLS frames $\mathbf{1116_2}$ and $\mathbf{1116_3}$, respectively, to the associated wireless stations in their respective BSSs at time $t_4$. In some implementations, the CTAS frame 1114 includes at least one trigger frame configured to trigger the selected access points AP2 and AP3 to transmit the respective CTLS frames $\mathbf{1116_2}$ and $\mathbf{1116_3}$ to their associated BSSs simultaneously with the first wireless access point transmitting the CTLS frame $\mathbf{1116_1}$ to its associated BSS at time $t_4$, for example, a SIFS duration after the CTAS frame 1114. Each of the CTLS frames 1116 may identify the time (and frequency) resources allocated to the respective access point and its associated BSS, and may indicate that the identified time resources are reserved for use by, or otherwise allocated to, the respective BSS. Notably, for the access points capable of CAP TDMA, the CTAS frame 1114 is configured to cause the selected access points to transmit the respective CTLS frames 1116 regardless of their respective NAVs.

In some implementations, the second wireless packet transmitted by the first wireless access point in block 1012 of the process 1000 includes the CTLS frame $\mathbf{1116_1}$. In such implementations, the CTLS frame $\mathbf{1116_1}$ includes an indication of the subset of time and frequency resources allocated to the first set of wireless stations, or other wireless stations associated with other BSSs, for direct wireless communications. As described above, the indication may include, for each of one or more stations of the first set of wireless stations, an indication of one or more particular time slots $\mathbf{1124_1}$ allocated to the respective wireless station for direct wireless communications. For example, in some implementations, the CTLS frame $\mathbf{1116_1}$ includes a time slot schedule that defines the time slots as well as identifiers (for example, based on BSS color and AID) of the associated wireless stations allocated use of the respective time slots $\mathbf{1124_1}$. In some other implementations, the second wireless packet may include the indication of the subset of time and frequency resources allocated for the direct wireless communications in another frame, and may be transmitted, for example, after transmitting a wireless packet including the CTLS frame $\mathbf{1216_1}$. In some implementations, the CTLS frame $\mathbf{1116_1}$ or other frame may include one or more other parameters for the time slots $\mathbf{1124_1}$ such as, for example, a frame type for direct wireless communication permitted to be transmitted during the time slots $\mathbf{1124_1}$ or any other control information for controlling direct wireless communication during the time slots.

In some implementations, the CTLS frames 1116 transmitted by the first wireless access point and the selected access points AP2 and AP3 are non-HT duplicate frames. That is, in some implementations, each of the CTLS frames 1116 is identical to the others. Additionally, each of the CTLS frames 1116 transmitted by the first wireless access point and the selected access points may be transmitted simultaneously via all of the available frequency resources of the wireless channel. In this way, the CTLS frames 1116 will not destructively interfere with each other and the stations receiving the CTLS frames 1116 may properly decode them. In some implementations, a source address field (for example, in a MAC header) associated with each of the CTLS frames 1116 is set to the same multicast address or other predefined address associated with CAP TDMA transmissions. Wireless stations supporting CAP TDMA may be configured such that when they receive frames having the multicast address, they decode and parse the respective frames. In some implementations, a BSSID field (for example, in the MAC header) associated with each of the CTLS frames 1116 is set to the BSSID of the first wireless access point. In some such implementations, a destination address field (for example, in the MAC header) associated with each of the CTLS frames 1116 is set to the same broadcast address.

In some implementations, each of the CTLS frames 1116 transmitted by the first wireless access point and the selected access points AP2 and AP3 includes an information element (IE) for each of the access points AP1, AP2 and AP3 that includes, for the respective access point, an indication of the starting time of the respective allocated time resources. For example, each IE may include an indication of a symbol, a time slot or an absolute or relative time at which the allocated time resources begin. The IE may also include a duration of the respective allocated time resources, for example, in units of symbols, time slots or ms. In some implementations, each of the CTLS frames 1116 further includes, for example, in one or more IEs, an indication of the subset of time and frequency resources allocated for direct wireless communications. For example, an IE may include a time slot schedule and identifiers of the wireless stations allocated use of the respective time slots. As described elsewhere herein, each IE may further include an indication of frequency resources (for example, one or more channels, subchannels or RUs) available for use while using the respective allocated time resources. Because the stations associated with the selected access points may not be in range of, or otherwise be able to receive and process the CTAS frame 1114, the use of the CTLS frames 1116 ensures that the stations become aware of the allocated time (and frequency) resources.

After the access point and local scheduling during the schedule allocation phase 1106, the data transmission phase 1108 may begin. During the data transmission phase 1108, the BSSs controlled by the first wireless access point and the selected access points AP2 and AP3 may share the time and frequency resources of the TXOP 1102 as described above. For example, in the first portion $\mathbf{1122_1}$ of the first time segment $\mathbf{1120_1}$, the first wireless access point may transmit downlink (DL) communications to, or receive uplink (UL) communications from, the first set of wireless stations using any of the single-user (SU) or multi-user (MU) techniques (for example, MU MIMO or MU OFDMA) described above during the first portion $\mathbf{1122_1}$.

During the time slots $\mathbf{1124_1}$, the first set of wireless stations may transmit or receive direct wireless communications to or from other wireless stations within the BSS controlled by the first wireless access point, and in some implementations or instances, to or from other wireless stations associated with other BSSs, for example, controlled by access points AP2 and AP3. In some implementations, the first wireless access point refrains from transmitting on the one or more wireless channels associated with the TXOP 1102 during the time slots $\mathbf{1124_1}$. However, as one exception, in some such implementations, the first wireless access point may transmit a trigger frame at a beginning of one or more of the time slots $1124_1$ that initiates the direct wireless communication by the wireless stations allocated use of the respective time slots $1124_1$. For example, the trigger frame may indicate to the first set of wireless stations that they are permitted to contend for access during the respective slots $1124_1$. In some other such implementations, the first wireless access point may transmit an RDG frame at a beginning of one or more of the time slots $1124_1$ that initiates the direct wireless communication by the wireless stations allocated use of the respective time slots $1124_1$.

In some implementations, there may be a guard (or "non-transmission") interval (for example, for a SIFS duration) between the time segments 1120 allocated to the respective access points to buffer and guard against interference that may result from overlapping communications that may result from timing errors.

To ensure that the first wireless access point and the selected access points AP2 and AP3, or their respective wireless stations, transmit or receive their respective data communications during only their allocated time resources (such that they don't interfere with one another), the first wireless access point may synchronize the selected access points, and in some instances, their respective wireless stations, in time. For example, in some implementations, in a beginning portion of the data transmission phase 1108, the first wireless access point transmits a trigger frame (referred to herein as a CAP TXOP trigger (CTTRIG) frame) at time $t_5$ after the CTLS frames 1116 are transmitted to synchronize in time the selected access points with the first wireless access point. In some implementations, data communications may begin a SIFS duration after the CTTRIG frame. Notably, the access points capable of CAP TDMA are configured to transmit and receive data communications, acknowledgment (ACK) frames, and trigger frames regardless of their respective NAVs during their allocated time resources. Additionally, the wireless stations compatible with CAP TDMA may be configured to be in an active listening mode at least during the respective allocated time resources and such that they may transmit and receive data communications, ACK frames, and trigger frames regardless of their respective NAVs.

As described above, in some implementations, for example, simplex implementations, wireless stations that receive direct wireless communications from other wireless stations in a respective time slot are permitted to transmit an acknowledgment during a next time slot that acknowledges a direct wireless communication transmitted in the respective time slot.

Figure 12:
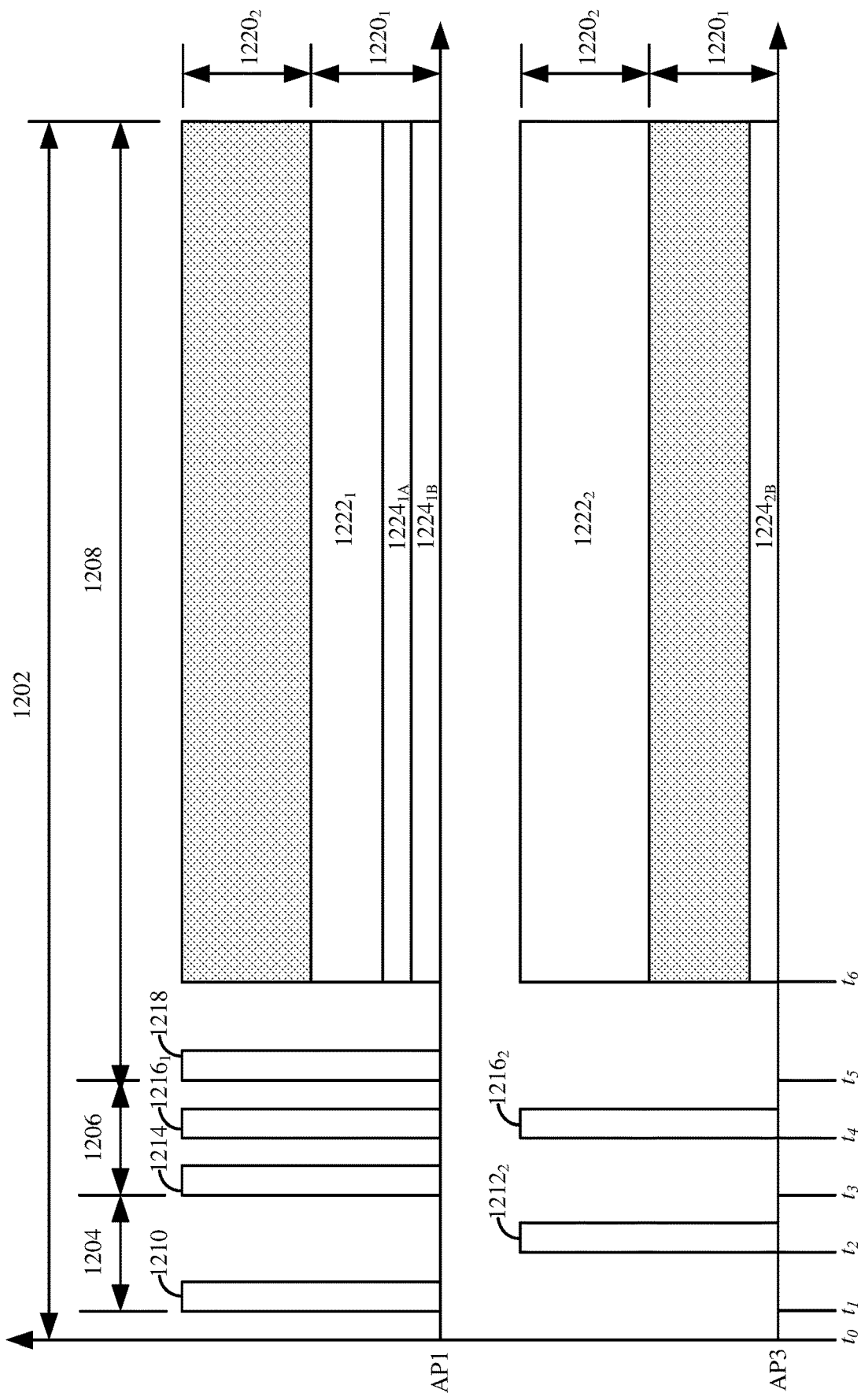
FIG. 12 shows a timing diagram illustrating example reserved frequency resources that support coordinated D2D communications according to some implementations.

FIG. 12 shows a timing diagram illustrating example reserved frequency resources that support coordinated D2D communications according to some implementations. For example, the first wireless access point and neighboring access points may be configured for coordinated access point (CAP) OFDMA. Still referring back to the process 1000 described with reference to FIG. 10, the first wireless access point (AP1) obtains a TXOP 1202 in block 1002 and shares it with one or multiple other coordinated access points (for example, AP2) using OFDMA. As illustrated in FIG. 12, in some implementations, the TXOP 1202 includes multiple phase or stages including a first TXOP indication phase 1204, a second schedule allocation phase 1206, and a third data transmission phase 1208.

As described above with reference to FIG. 11, to obtain the TXOP 1202 in block 1002, the first wireless access point contends for access to the wireless medium on one or more channels using, for example, CSMA/CA and EDCA techniques. The TXOP 1202 may be obtained at time $t_0$ for a wideband wireless channel, such as a bonded channel formed by the primary channel and the one or more secondary channels. For example, the wideband wireless channel may be a 40 MHz, 80 MHz, 160 MHz or 320 MHz channel. After obtaining the TXOP 1202, and to ensure interference-free communications during the TXOP 1202, the first wireless access point may further reserve the wireless channel by transmitting a RTS frame (not shown) to one or more of its associated wireless stations. The RTS frame is configured to cause at least one of the stations to transmit a CTS frame.

As described above with reference to FIG. 11, in some implementations, to select the one or more other coordinated wireless access points to participate in the TXOP 1202 in block 1004, the first wireless access point performs a TXOP availability indication process in the TXOP indication phase 1204 during which the first wireless access point learns of the other access points' desires or intents to participate in the TXOP 1202. For example, the process 1000 may further include, during the TXOP indication phase 1204, advertising an availability of frequency resources in the TXOP 1202. Specifically, at time $t_1$, the first wireless access point transmits a CTI frame 1210 to other wireless access points, for example, other access points in its ESS, that indicates that the frequency resources of the TXOP 1202 can be shared by the first wireless access point. For example, the first wireless access point may have previously become aware of the other neighboring access points in its vicinity based on information in beacons or other management frames received from the other access points.

As further described above, after transmitting the CTI frame 1210, the first wireless access point may receive, at time $t_2$, a CTR frame 1212 from each of one or more candidate APs that indicates a desire by the respective access point to participate in the TXOP 1202. In the example illustrated in FIGS. 12, AP2 and AP3 are among the candidate APs that transmit respective CTR frames $1212_2$ and $1212_3$ to the first wireless access point. Based on the receipt of the CTR frames 1212, the first wireless access point may then select one or more of the candidate APs to participate in the TXOP 1202.

As described above, in block 1006 of the process 1000 described with reference to FIG. 10, the first wireless access point may allocate a respective set of time and frequency resources of the TXOP 1202 to itself and to each of the selected access points. In some implementations, the time resources in each set of time and frequency resources overlap entirely throughout the duration of the TXOP 1202 while the frequency resources do not overlap over at least a portion of the bandwidth. In some other implementations or instances, the time resources may also not overlap for at least some portions of the duration. As such, in some implementations, the first wireless access point may further allocate different time resources in addition to different frequency resources.

For example, the first wireless access point may divide the available frequency resources of the TXOP 1202 into multiple bandwidth segments 1220, each comprising one or more frequency resources for itself or one of the selected access points, and each not overlapping with any of the other bandwidth segments 1220. For example, each of the bandwidth segments 1220 may include one or more channels (for example, 20 MHz subchannels) or resource units (RUs) within a bonded wireless channel. In some implementations, the first wireless access point divides the TXOP 1202 into equal bandwidth segments 1220, where the number of equal bandwidth segments 1220 is equal to the number of access points sharing the TXOP 1202. For example, as illustrated in FIG. 12, the first wireless access point may partition the TXOP 1202 into two equal bandwidth segments 1220, one bandwidth segment 1220$_1$ for the first wireless access point and one bandwidth segment 1220$_2$ for the selected access point AP2. In some other implementations or instances, the first wireless access point may partition the frequency resources into unequal bandwidth segments 1220. For example, the first wireless access point may select for itself a wider bandwidth segment 1220$_1$ of the TXOP 1202 including more frequency resources than that in the other bandwidth segments 1220 allocated to the other selected access points. In some implementations in which the CTR frames 1212 include indications of buffer statuses or desired amounts of frequency resources, the first wireless access point may base the allocations of the frequency resources to the selected access points based on their respective buffer statuses or requested frequency resources.

As described above, in block 1008, the first wireless access point may allocate a subset of time and frequency resources of the TXOP 1202 to at least a first set of wireless stations in the BSS controlled by the first wireless access point for direct wireless communications. For example, in some implementations, the first wireless access point partitions the available frequency resources of the bandwidth segment 1220$_1$ into multiple portions including a portion 1222$_1$ it reserves for regular infrastructure BSS traffic from itself to the first set of wireless stations or from the first set of wireless stations to itself. The bandwidth segment 1220$_1$ further includes a portion, including the subset of frequency resources, that may be reserved for direct wireless communications between the first set of wireless stations or other wireless stations associated with other BSSs. In some implementations, the first set of wireless stations are not permitted to transmit direct wireless data communications to other wireless stations outside of the subset of time and frequency resources reserved for direct wireless communications.

In some implementations, the first wireless access point divides the portion reserved for the direct wireless communications into one or multiple frequency slots 1224$_1$, each comprising one or more frequency resources. For example, each of the frequency slots may represent a set of subcarriers (or tones), an RU, or other frequency unit. In some implementations, each of the frequency slots 1224$_1$ may be separated from each other frequency slot 1224$_1$ by a guard band. In some implementations, the first wireless access point divides the portion reserved for the direct wireless communications into equal width frequency slots 1224$_1$. In some other implementations or instances, the first wireless access point may partition the frequency resources into unequal frequency slots 1224. In the illustrated example, the frequency segment 1220$_1$ includes two frequency slots 1224$_{1A}$ and 1224$_{2B}$, although the number of frequency slots 1224$_1$ may be more or less than two, and may be adjusted or distributed differently in different bandwidth segments 1220 within the same TXOP 1202 or subsequent TXOPs 1202.

In some such implementations, block 1008 of the process 1000 may further include allocating each of one or more of the frequency slots 1224$_1$ to a respective subset of the first set of wireless stations (for example, two or more wireless stations) for the direct wireless communications. For example, each subset of wireless stations in the first set of wireless stations may not be permitted to transmit direct wireless communications in another one of the frequency slots 1224$_1$ allocated to a different subset of wireless stations in the first set of wireless stations. In some implementations, during at least one of the frequency slots 1224$_1$, for example, frequency slot 1224$_{1B}$, at least some (or all) of the first set of wireless stations may be permitted to transmit or receive direct wireless communications to or from other wireless stations associated with other BSSs controlled by other access points including AP2 and AP3. In some such implementations, the first wireless access point and other wireless access points may not restrict direct wireless communications to any individual BSS in the frequency slot 1224$_{1B}$.

As similarly described above with respect to FIG. 11, the first wireless access point and the selected access points including AP2 may exchange one or more wireless packets to further coordinate a frequency slot schedule for the frequency slots 1224 in the frequency segments 1220. For example, the exchange may include transmitting, to the selected access points, identifiers of one or more wireless stations in the first set of wireless stations. The exchange may further include receiving, from the wireless access point AP2, identifiers of one or more wireless stations associated with the wireless access point that are configured for direct wireless communications with other wireless stations. The first wireless access point and the selected wireless access points may coordinate which wireless stations of the first set of wireless stations are permitted to transmit direct wireless communications to wireless stations associated with the other wireless access point during one or more frequency slots, for example, frequency slots 1224$_2$, allocated to the selected access point AP2. Similarly, the coordination may include determining which wireless stations of the set of wireless stations associated with access point AP2 are permitted to transmit direct wireless communications to wireless stations in the first set of wireless stations during one or more time slots of the frequency slots 1224$_1$ allocated to the first set of wireless stations.

Similarly, the selected access point AP2 may partition its allocated frequency segment 1220$_2$ into a portion 1222$_2$ it reserves for regular infrastructure BSS traffic with associated wireless stations in its BSS. As described above, the bandwidth segment 1220$_2$ further includes a portion, including a subset of frequency resources, that may be reserved for direct wireless communications between the respective wireless stations or other wireless stations associated with other BSSs including the first set of wireless stations. As further described above, the selected access point AP2 may divide the portion reserved for the direct wireless communications into one or multiple frequency slots 1224$_2$ each comprising one or more frequency resources.

As described above, the selected access point AP2 may allocate each of one or more frequency slots 1224$_2$ to a respective subset of the wireless stations associated with the respective access point for the direct wireless communications. In some implementations, at least some of the frequency slots 1224 may be coordinated or correspond with each other. For example, in corresponding common frequency slots 1224$_{1B}$ and 1224$_{2B}$ in the bandwidth segment 1220$_1$, at least some (or all) of the wireless stations associated with the respective access points may be permitted to transmit or receive direct wireless communications to or from other wireless stations associated with the other BSSs controlled by the other access point. In some such implementations, the first wireless access point and the selected access points may not restrict direct wireless communications to any individual BSS in the common frequency slot.

As described above with reference to FIG. 11, after selecting the access points to participate in the TXOP 1202 in block 1004 and allocating the sets of frequency (and in some implementations, time) resources in blocks 1004 and 1006, the first wireless access point then grants, schedules or otherwise actually allocates (for example, indicates the allocations of) the respective frequency resources to the selected access points in the schedule allocation phase 1206. For example, the first wireless access point may transmit, at time $t_3$, a CTAS frame 1214 that includes, for each of the selected access points, the indication of the frequency (and in some implementations, time) resources allocated to the respective access point and usable by the respective access point and its BSS to transmit data to, or receive data from, one or more respective associated wireless stations during the TXOP 1202. In such implementations, the first wireless packet transmitted by the first wireless access point in block 1010 of the process 1000 includes the CTAS frame 1214.

As similarly described above, the CTAS frame 1214 may include, for each of the selected access points, an indication of the frequency resources allocated to the respective access point and its BSS. For example, each trigger frame of the CTAS frame 1214 may include a user information field for each of the selected access points. Each user information field includes, for a respective access point, an indication of the allocated frequency resources. For example, the user information field may include an indication of a set of subcarriers, RUs or channels allocated to the respective access point. In some implementations, the CTAS frame 1214 further includes, for example, in one or more user information fields, an indication of a frequency slot schedule, and in some instances, identifiers of the wireless stations allocated use of the respective frequency slots. As indicated above, each user information field may further include, for the respective selected access point, an indication of time resources available for use by the respective access point while using the respective allocated frequency resources. In other implementations or instances, the CTAS frame 1214 may allocate all of the available time resources to each of the selected access points for use while using their respective allocated frequency resources.

After transmitting the CTAS frame 1214, the first wireless access point, at time $t_4$, transmits a CTLS frame $1216_1$ to the first set of wireless stations in its BSS. Similarly, the selected access point AP2 may also transmit a respective CTLS frame $1216_2$ to the associated wireless stations in its respective BSSs at time $t_4$. Each of the CTLS frames 1216 may identify the frequency (and time) resources allocated to the respective access point and its associated BSS, and may indicate that the identified frequency resources are reserved for use by, or otherwise allocated to, the respective BSS.

In some implementations, the second wireless packet transmitted by the first wireless access point in block 1012 of the process 1000 includes the CTLS frame $1216_1$. In such implementations, the CTLS frame $1216_1$ includes an indication of the subset of time and frequency resources allocated to the first set of wireless stations, or other wireless stations associated with other BSSs, for direct wireless communications. As described above, the indication may include, for each of one or more stations of the first set of wireless stations, an indication of one or more particular frequency slots $1224_1$ allocated to the respective wireless station for direct wireless communications. For example, in some implementations, the CTLS frame $1216_1$ includes a frequency slot schedule that defines the frequency slots as well as identifiers (for example, based on BSS color and AID) of the associated wireless stations allocated use of the respective frequency slots $1224_1$. In some other implementations, the second wireless packet may include the indication of the subset of time and frequency resources allocated for the direct wireless communications in another frame, and may be transmitted, for example, after transmitting a wireless packet including the CTLS frame $1216_1$. In some implementations, the CTLS frame $1216_1$ or other frame may include one or more other parameters for the frequency slots $1224_1$ such as, for example, a frame type for direct wireless communication permitted to be transmitted in the frequency slots $1224_1$ or any other control information for controlling direct wireless communication in the frequency slots.

In some implementations, each of the CTLS frames 1216 transmitted by the first wireless access point and the selected access point AP2 includes an IE for each of the access points that includes, for the respective access point, an indication of the subcarriers, RUs or channels in its allocated frequency resources. In some implementations, each of the CTLS frames 1216 further includes, for example, in one or more IEs, an indication of the subset of time and frequency resources allocated for direct wireless communications. For example, an IE may include a frequency slot schedule and identifiers of the wireless stations allocated use of the respective time slots. As described elsewhere herein, each IE may further include an indication of time resources (for example, one or more symbols or time slots) available for use while using the respective allocated frequency resources.

After the access point and local scheduling during the schedule allocation phase 1206, the data transmission phase 1208 may begin. During the data transmission phase 1208, the BSSs controlled by the first wireless access point and the selected access points AP2 and AP3 may share the time and frequency resources of the TXOP 1202 as described above. For example, in the first portion $1222_1$ of the first bandwidth segment $1220_1$, the first wireless access point may transmit DL communications to, or receive UL communications from, the first set of wireless stations using any of the SU or MU techniques (for example, MU MIMO or MU OFDMA) described above in the first portion $1222_1$.

Within the frequency slots $1224_1$, the first set of wireless stations may transmit or receive direct wireless communications to or from other wireless stations within the BSS controlled by the first wireless access point, and in some implementations or instances, to or from other wireless stations associated with other BSSs, for example, controlled by the selected access point AP2 or other selected or non-selected access points. In some implementations, the first wireless access point refrains from transmitting in the one or more frequency slots $1224_1$.

As described above, the first wireless access point may synchronize the selected access points, and in some instances, their respective wireless stations, in time. For example, in some implementations, in a beginning portion of the data transmission phase 1208, the first wireless access point transmits a CTTRIG frame at time is after the CTLS frames 1216 are transmitted to synchronize in time the selected access points with the first wireless access point. In some implementations, data communications may begin a SIFS duration after the CTTRIG frame.

In some implementations, the first set of wireless stations may be enabled for NAN operation and the direct wireless communications may include NAN communications. In some such implementations, the first wireless access point may permit only the wireless stations in the NAN network to access the one or more wireless channels in the time slots 1124 or frequency slots 1224 allocated for direct wireless communications. For example, the indication of the subset of time and frequency resources transmitted in block 1012 may include an indication of a NAN cluster ID identifying the wireless stations that are allocated access to the one or more wireless channels in the time slots 1124 or frequency slots 1224. In some implementations, the first set of wireless stations may not be permitted to transmit direct wireless communications to other wireless stations outside of the time slots 1124 or frequency slots 1224. The first set of wireless stations may operate a NAN network alone or in combination with other NAN-enabled wireless stations, which may be associated with other BSSs controlled by other wireless access points.

In some such implementations, the process 1000 may further include receiving, from at least one wireless station in the first set of wireless stations, a wireless packet including an action frame that indicates one or more parameters associated with the NAN network including a timing of a periodic NAN discovery window. In some other implementations, the process 1000 may further include scanning one or more NAN discovery channels and determining that the first set of wireless stations is operating a NAN network. The first wireless access point may then identify one or more parameters associated with the NAN network including a timing of a NAN discovery window. In some such implementations, the first wireless access point may transmit a wireless packet to each of one or more other wireless access points that includes an indication of the one or more parameters associated with the NAN network. The first wireless access point and the other wireless access points may then synchronize or schedule the time slots 1124 or frequency slots 1224 based on the one or more parameters associated with the NAN network including the timing of the NAN discovery window.

Figure 13:
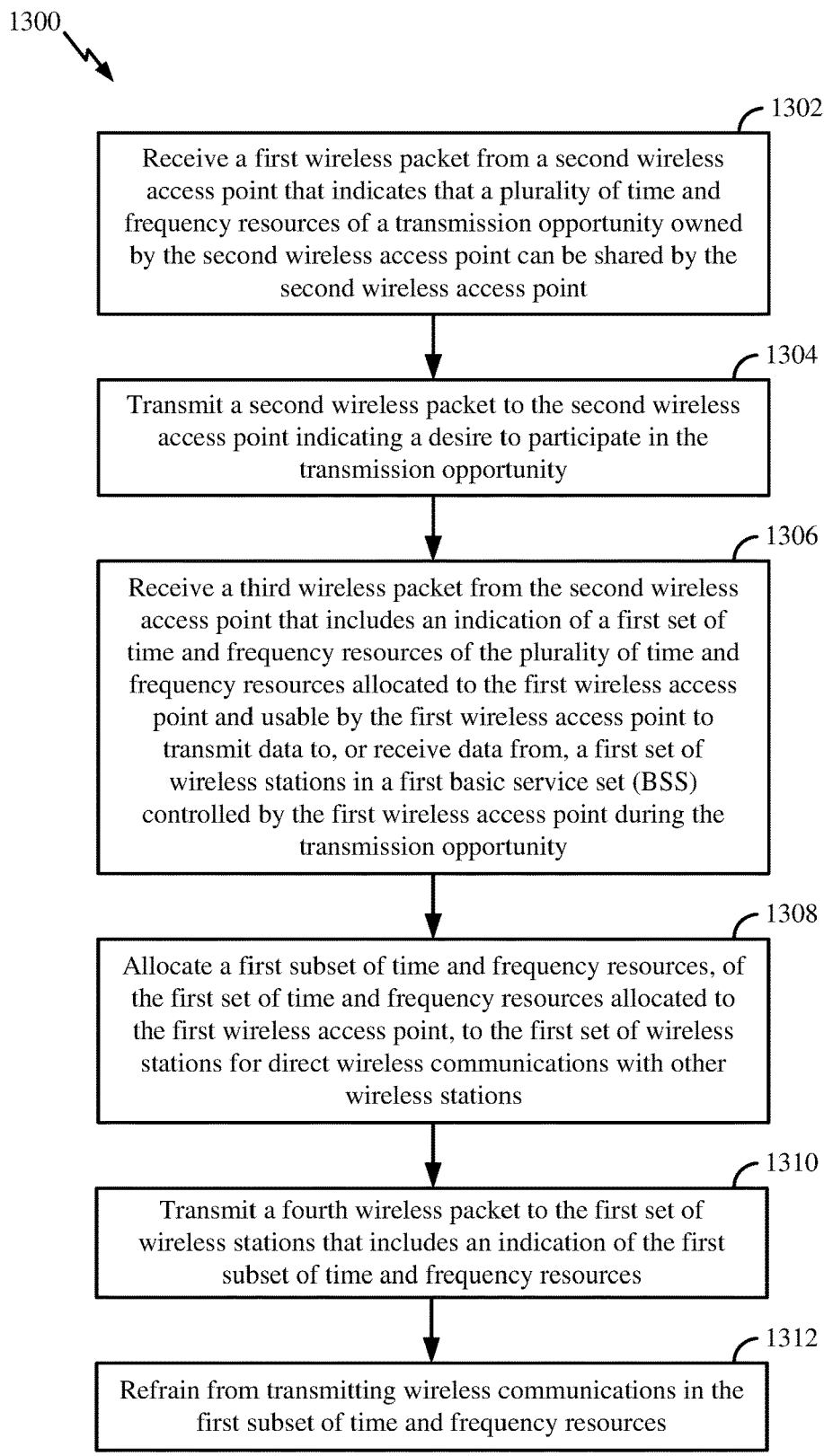
FIG. 13 shows a flowchart illustrating an example process for wireless communication that supports coordinated D2D communications according to some implementations.

FIG. 13 shows a flowchart illustrating an example process 1300 for wireless communication that supports coordinated D2D communications according to some implementations. The operations of the process 1300 may be implemented by a wireless access point or its components as described herein. For example, the process 1300 may be performed by a wireless communication device such as the wireless communication device 500 described above with reference to FIG. 5. In some implementations, the process 1300 may be performed by a wireless access point, such as one of the APs 102 and 602 described above with reference to FIGS. 1 and 6A, respectively.

In some implementations, in block 1302, the wireless communication device (hereinafter referred to as the first wireless access point with respect to FIG. 13) receives a first wireless packet from a second wireless access point that has obtained a TXOP (the TXOP owner). The first wireless packet indicates that multiple time resources and frequency resources of the TXOP can be shared by the TXOP owner. In block 1304, the first wireless access point may transmit a second wireless packet to the TXOP owner indicating a desire to participate in the TXOP. In block 1306, the first wireless access point may receive a third wireless packet from the TXOP owner that includes an indication of a first set of time and frequency resources of the TXOP that have been allocated to the first wireless access point and its BSS and usable by the first wireless access point to transmit data to, or receive data from, a first set of wireless stations associated with the first wireless access point during the TXOP. In block 1308, the first wireless access point allocates a first subset of time and frequency resources, of the first set of time and frequency resources allocated to the first wireless access point, to the first set of wireless stations for direct wireless communications with other wireless stations. In block 1310, the first wireless access point transmits a fourth wireless packet to the first set of wireless stations that includes an indication of the first subset of time and frequency resources. Subsequently, the first wireless access point may refrain from transmitting wireless communications in the first subset of time and frequency resources in block 1312.

As described above with reference to FIGS. 11 and 12, in block 1302, in a TXOP availability indication process in a TXOP indication phase of the TXOP, the first wireless access point may receive the first wireless packet from the second wireless access point. The first wireless packet may advertise an availability of time and frequency resources in the TXOP. For example, the first wireless packet may include a CTI frame as described above. After receiving the CTI frame, the first wireless access point may transmit the second wireless packet in 1304 indicating the desire to participate in the TXOP. For example, the second wireless packet may include a CTR frame as described above. In block 1306, the first wireless access point receives the third wireless packet including the indication of the first set of time and frequency resources allocated by the second wireless access point to the first wireless access point. For example, the third wireless packet may include a CTAS frame as described above.

As described above, in block 1308, the first wireless access point may allocate a subset of time and frequency resources of the first set of time and frequency resources to at least a first set of wireless stations in the BSS controlled by the first wireless access point for direct wireless communications. For example, in some implementations, the first wireless access point partitions one or both of the available time resources and the available frequency resources allocated to it into multiple portions including a portion it reserves for regular infrastructure BSS traffic and a portion, including the subset of time and frequency resources, that is reserved for direct wireless communications between the first set of wireless stations or other wireless stations associated with other BSSs. As described above with reference to FIGS. 11 and 12, in some implementations, the first wireless access point divides the portion reserved for the direct wireless communications into one or multiple time slots or frequency slots.

As further described above, after transmitting the CTAS frame, the first wireless access point may transmit a CTLS frame to the first set of wireless stations in its BSS. The CTLS frame identifies the time and frequency resources allocated to the respective access point and its associated BSS, and may indicate that the identified time and frequency resources are reserved for use by, or otherwise allocated to, the respective BSS. In some implementations, the fourth wireless packet transmitted by the first wireless access point in block 1310 includes the CTLS frame. In such implementations, the CTLS frame includes an indication of the subset of time and frequency resources allocated to the first set of wireless stations, or other wireless stations associated with other BSSs, for direct wireless communications. As described above, the indication may include, for each of one or more stations of the first set of wireless stations, an indication of one or more particular time slots or frequency slots allocated to the respective wireless station for direct wireless communications. The first wireless access points, and other wireless access points, may refrain from transmitting in the indicated time and frequency slots.

As described above, the first set of wireless stations may be enabled for NAN operation and the direct wireless communications may include NAN communications. In some such implementations, the first wireless access point may permit only the wireless stations in the NAN network to access the one or more wireless channels in the time slots or frequency slots allocated for direct wireless communications. In some such implementations, the process 1300 may further include receiving a wireless packet from the second wireless access point that includes an indication of one or more parameters associated with the NAN network. The first wireless access point and the second wireless access point may then synchronize or schedule the time slots or frequency slots based on the one or more parameters associated with the NAN network including the timing of the NAN discovery window.

Figure 14:
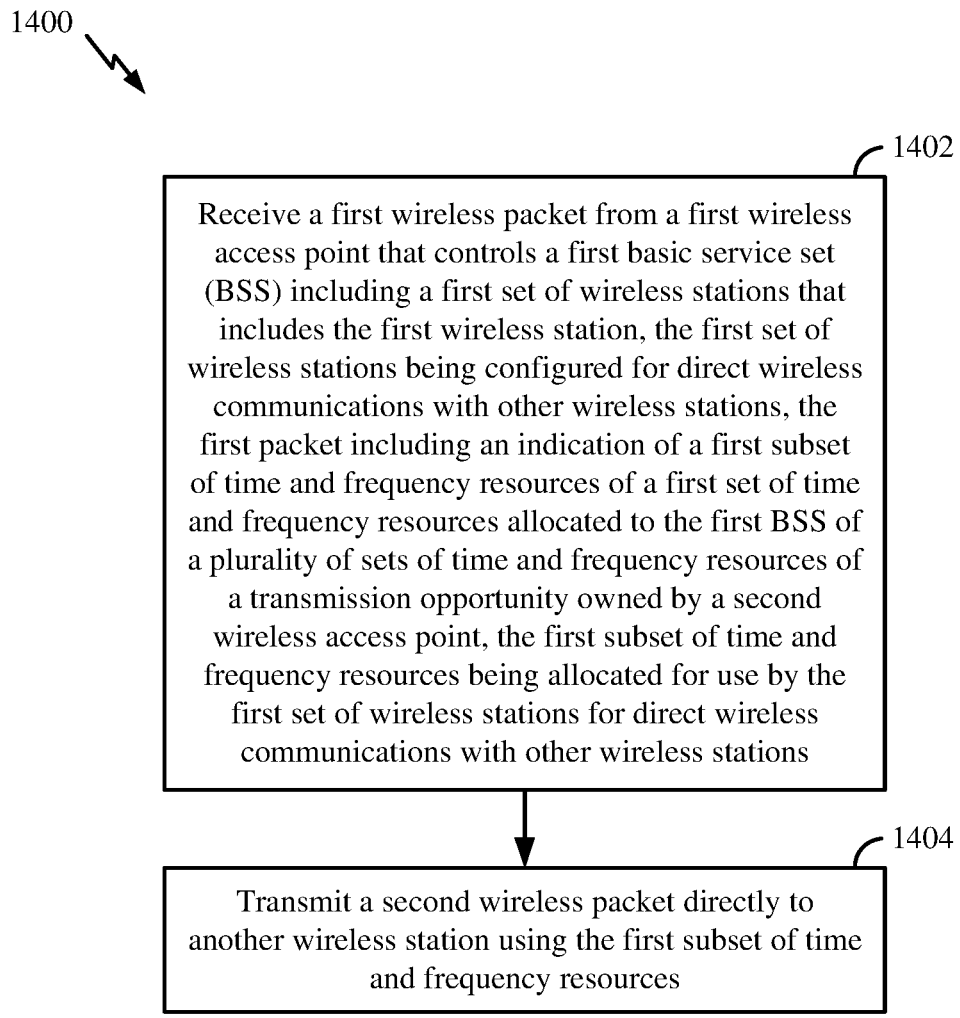
FIG. 14 shows a flowchart illustrating an example process for wireless communication that supports coordinated D2D communications according to some implementations.

FIG. 14 shows a flowchart illustrating an example process 1400 for wireless communication that supports coordinated D2D communications according to some implementations. The operations of the process 1400 may be implemented by a wireless station or its components as described herein. For example, the process 1400 may be performed by a wireless communication device such as the wireless communication device 500 described above with reference to FIG. 5. In some implementations, the process 1400 may be performed by a wireless station, such as one of the STAs 104 and 604 described above with reference to FIGS. 1 and 6B, respectively.

In some implementations, in block 1402, the wireless communication device (hereinafter referred to as the first wireless station with respect to FIG. 14) receives a first wireless packet from a first wireless access point that controls a first BSS including a first set of wireless stations that includes the first wireless station. The first set of wireless stations are configured for direct wireless communications with other wireless stations. The first wireless packet includes an indication of a first subset of time and frequency resources of a first set of time and frequency resources allocated to the first BSS. As described above with reference to FIGS. 11 and 12, the first set of time and frequency resources may be one of multiple sets of a plurality of sets of time and frequency resources of a TXOP owned by the first wireless access point or by a second wireless access point that controls a second BSS. As further described above, the first wireless access point may allocate the subset of time and frequency resources to the first set of wireless stations for direct wireless communications with other wireless stations. In block 1402, the first wireless stations transmits a second wireless packet directly to another wireless station using one or more of the time and frequency resources in the first subset of time and frequency resources allocated to the first wireless station. For example, the second wireless packet may be a SU PPDU that may be transmitted according to the 802.11be or later amendments to the IEEE 802.11 specification.

As described above with reference to FIGS. 11 and 12, in some implementations, the first wireless access point partitions one or both of the first set of available time resources and available frequency resources allocated to the first BSS into multiple portions including a portion it reserves for regular infrastructure BSS traffic and a portion, including the subset of time and frequency resources, that is reserved for direct wireless communications between the first set of wireless stations or other wireless stations associated with other BSSs. As further described above, in some implementations, the first wireless access point divides the portion reserved for the direct wireless communications into one or multiple time slots or frequency slots.

In some implementations, the first wireless packet may be the wireless packet carrying the CTLS frame to the first set of wireless stations. As described above, the CTLS frame may include a first identification of the first set of time and frequency resources allocated to the respective BSS and a second indication of the subset of time and frequency resources allocated to the first set of wireless stations, or other wireless stations associated with other BSSs, for direct wireless communications. As described above, the indication may include, for the first wireless station, an indication of one or more particular time slots or frequency slots allocated to the first wireless station and other wireless stations inside or outside of the first BSS for direct wireless communications. The first wireless station may then contend for access to the wireless medium during the respective slots.

As described above, the first set of wireless stations may be enabled for NAN operation and the direct wireless communications may include NAN communications. In some such implementations, the first wireless access point may permit only the wireless stations in the NAN network to access the one or more wireless channels in the time slots or frequency slots allocated for direct wireless communications. The first wireless station may form or join a NAN network prior to or after association with the first wireless access point. In some implementations, the first wireless station is configured to transmit a wireless packet including an action frame to the first wireless access point that indicates one or more parameters associated with the NAN network including a timing of a NAN discovery window. In some other implementations, the first wireless station may periodically broadcast wireless packets that indicate one or more parameters associated with the NAN network including a timing of a NAN discovery window. In some implementations, the first set of wireless stations are not permitted to transmit direct wireless communications to other wireless stations outside of the first subset of time and frequency resources allocated to the first set of wireless stations except for direct wireless communications in NAN discovery windows. In other words, the first set of wireless stations are not permitted to transmit direct wireless data communications outside of the allocated time and frequency slots.

In some implementations, in one or more of the allocated time and frequency slots, the first wireless station may exchange one or more wireless packets with at least one other wireless station in the NAN network to set up a NAN data link (NDL) in the allocated time and frequency slots. In such implementations, the first wireless station may transmit the second wireless packet directly to the other wireless station via the NDL.

Some wireless communication protocols, including those supporting IEEE 802.11 standards, support the use of quiet periods. Each quiet period refers to a duration of time during which no wireless communication devices, including APs and STAs, are generally permitted to access an indicated wireless channel or channels of the shared frequency band. One initial motivation for the support of quiet periods was to permit an AP to perform measurements without interference, for example, measurements for dynamic frequency selection (DFS) purposes. In some implementations, quiet periods may be recurring, for example, based on a given beacon interval. Additionally, more than one quiet period may be defined for each beacon interval.

Various other aspects relate generally to synchronized channel access techniques. Each synchronized coordinated access window may include a scheduled contention period, during which multiple synchronized access points contend for access, followed by a communication period during which the successful AP holds a TXOP. In some implementations, synchronized access points may schedule periodically recurring, synchronized coordinated access windows by periodically transmitting quiet elements. The quiet elements establish recurring quiet periods during which legacy devices are not permitted to transmit. The wireless access points may also transmit one or more quiet override elements associated with respective quiet elements. A quiet override element indicates to the synchronized access points, and in some instance, their associated wireless stations, that the quiet period established by the respective quiet element is to be used for synchronized channel access, and as such, that the synchronized APs are permitted to contend for access during the respective contention period 1604. In some implementations, the wireless access points may schedule reserved access windows within the coordinated access windows during which D2D-enabled wireless devices are permitted to transmit direct wireless communications to other D2D-enabled wireless devices.

Figure 15:
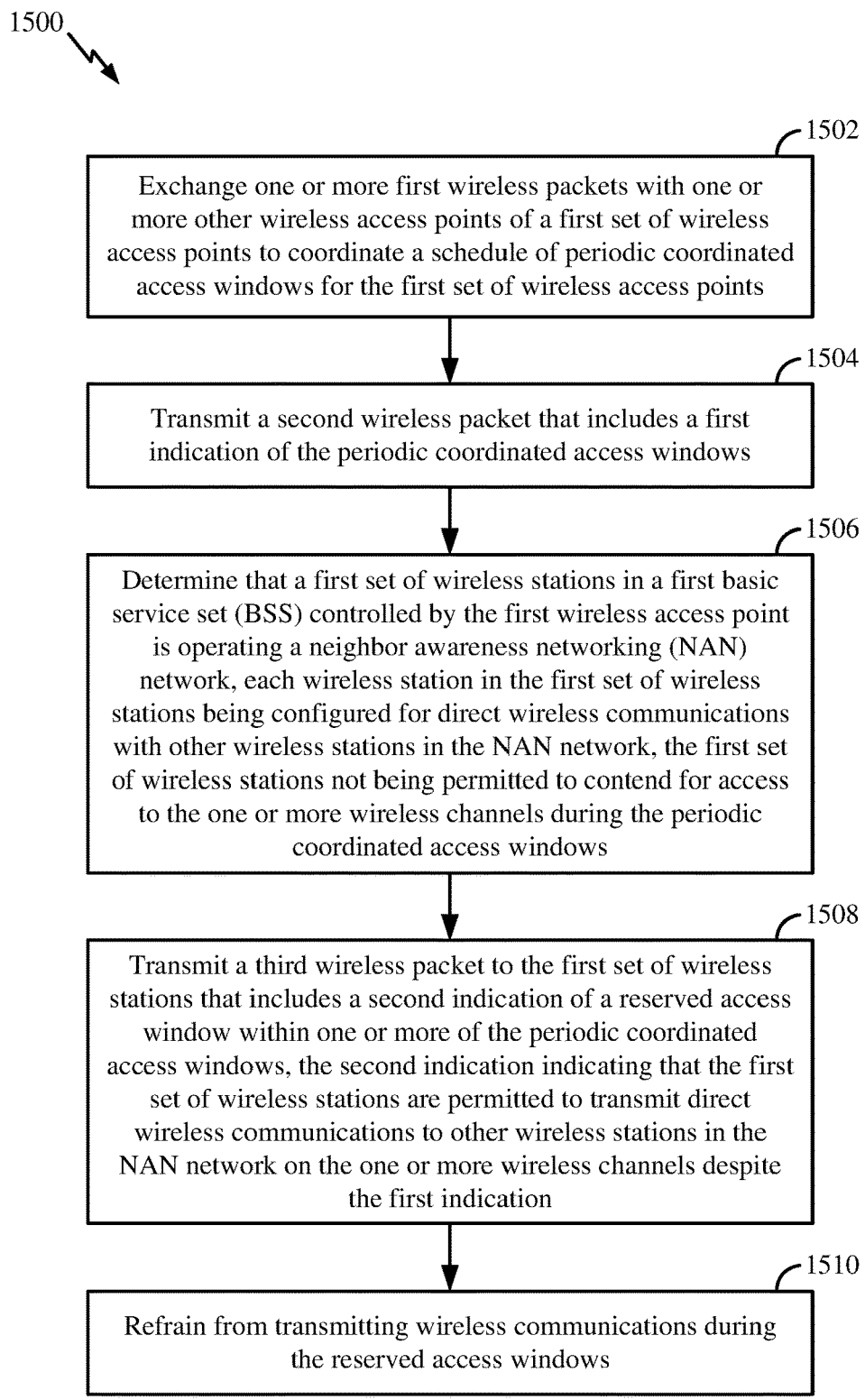
FIG. 15 shows a flowchart illustrating an example process for wireless communication that supports coordinated D2D communications according to some implementations.

FIG. 15 shows a flowchart illustrating an example process 1500 for wireless communication that supports coordinated D2D communications according to some implementations. The operations of the process 1500 may be implemented by a wireless access point or its components as described herein. For example, the process 1500 may be performed by a wireless communication device such as the wireless communication device 500 described above with reference to FIG. 5. In some implementations, the process 1500 may be performed by a wireless access point, such as one of the APs 102 and 602 described above with reference to FIGS. 1 and 6A, respectively.

In block 1502, the wireless communication device (hereinafter referred to as the first wireless access point with respect to FIG. 15) exchanges one or more first wireless packets with a first set of wireless access points that includes the first wireless access point to coordinate a schedule of periodic coordinated access windows during which the first set of wireless access points are scheduled to contend for access to one or more wireless channels. In block 1504, the first wireless access point transmits a second wireless packet that includes a first indication of the periodic coordinated access windows. In block 1506, the first wireless access point determines that a first set of wireless stations in a first BSS controlled by the first wireless access point is operating a NAN network, each wireless station in the first set of wireless stations being configured for direct wireless communications with other wireless stations in the NAN network. In some implementations, the first set of wireless stations not being permitted to contend for access to the one or more wireless channels during the periodic coordinated access windows. In block 1508, the first wireless access point transmits a third wireless packet to the first set of wireless stations that includes a second indication of a reserved access window within one or more of the periodic coordinated access windows. The second indication indicates that the first set of wireless stations are permitted to transmit direct wireless communications to other wireless stations in the NAN network on the one or more wireless channels despite the first indication. The first wireless access point may then refrain from transmitting wireless communications during the reserved access windows in block 1510.

Figure 16:
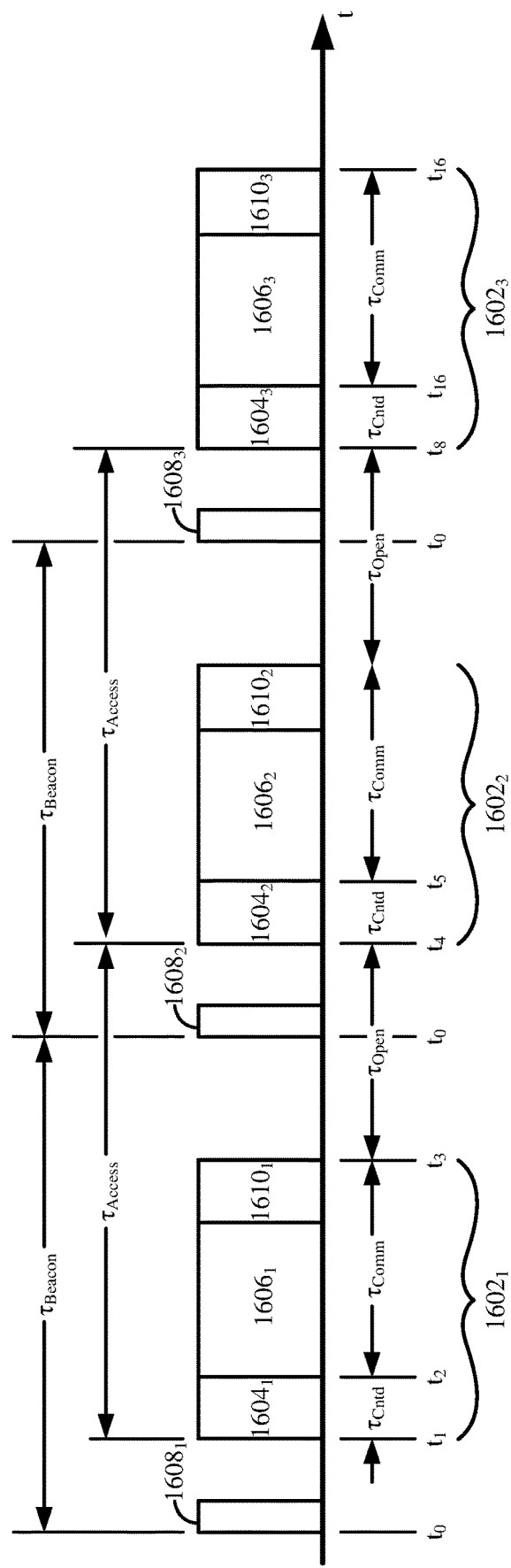
FIG. 16 shows a timing diagram illustrating example reserved access windows that support coordinated D2D communications according to some implementations.

FIG. 16 shows a timing diagram illustrating example reserved access windows that support coordinated D2D communications according to some implementations. For example, FIG. 16 shows synchronized, recurring coordinated access windows 1602 (for example, including a first coordinated access window $1602_1$, a second coordinated access window $1602_2$ and a third coordinated access window $1602_3$). The coordinated access windows 1602 recur according to a periodicity indicated by a time interval $\tau_{Access}$. Each coordinated access window 1602 includes a respective contention period 1604 (for example, contention periods $1604_1$, $1604_2$ and $1604_3$) at the start of the coordinated access window having a duration $\tau_{Cntd}$. Each coordinated access window 1602 also includes a respective communication period 1606 (for example, communication periods $1606_1$, $1606_2$ and $1606_3$) having a duration $\tau_{Comm}$. In some implementations, only during the contention periods 1604, at the start of the scheduled coordinated access windows 1602, do the first set of wireless access points enabled for synchronized channel access, and desiring to communicate over the wireless medium, contend for access. The first set of wireless stations are not permitted to contend for access to the one or more wireless channels during any portion of the periodic coordinated access windows 1602. In some implementations, between adjacent coordinated access windows 1602, there may be open periods having duration $\tau_{Open}$ during which the wireless medium is open for regular contention-based access by other wireless communication devices (and optionally also by the synchronized APs) as governed by, for example, the CSMA/CA and EDCA techniques.

The second wireless packet transmitted in block 1504 includes channel access information establishing one or more recurring synchronized coordinated access windows 1602. In some implementations, the channel access information is conveyed by one or more quiet elements and one or more quiet override elements included within the first wireless packets. Each quiet element indicates to a second set of wireless communication devices (that may include the first set of wireless access points and the first set of wireless stations) that they are not permitted to transmit on a wireless channel during a quiet period defined by the quiet element. In some implementations, a quiet override element indicates to the first set of wireless access points, for each of one or more of the quiet elements, whether they are permitted to contend for access to the wireless channel during a contention period of the quiet period defined by the respective quiet element. In this way, the first set of wireless access points may schedule periodically recurring, synchronized coordinated access windows, such as synchronized coordinated access windows 1602 described with reference to FIG. 16, by establishing periodic quiet periods.

If a quiet override element indicates that the first set of wireless access points is permitted to contend for access during respective contention periods 1604 of each of one or more upcoming quiet periods, then each of the first set of wireless access points may contend for access to the wireless channel during one or more of the contention periods 1604 indicated by the respective quiet elements and the quiet override element. If the first wireless access point wins the contention during one of the contention periods 1604, it is then the owner of a TXOP on the wireless channel during the respective communication period 1606 of the respective coordinated access window 1602. The first wireless access point may then exchange one or more wireless data packets on the wireless channel during the TXOP.

As described above, the quiet elements establish recurring quiet periods during which compatible devices receiving the quiet elements are generally not permitted to transmit. In such a manner, synchronized channel access may be protected. For example, the compatible devices may include the first set of wireless access points and the first set of wireless stations. The first set of wireless access points are access points that support synchronized channel access (synchronized access points). However, while no devices are generally permitted to contend for access during quiet periods, a quiet override element indicates to the first set of wireless access points (and to the first set of wireless stations) that a quiet period established by a respective quiet element is to be used for synchronized channel access, and as such, that the first set of wireless access points is permitted to contend for access during the respective contention period 1604. Additionally, the first set of wireless stations that support synchronized channel access may also understand the quiet override element, and as such, may be configured to receive DL communications from the first wireless access point during a quiet period and, in response to receiving a trigger frame from the first wireless access point, transmit UL communications to the first wireless access point during the quiet period.

The second set of wireless communication devices may also include legacy devices, which may be devices configured to operate according to the IEEE 802.11ax or earlier amendments or versions of the IEEE 802.11 family of standards but not configured to operate according to the IEEE 802.11be or later amendments or versions of the IEEE 802.11 family of standards. The second set of wireless communication devices may also include devices that do not otherwise support, or which have disabled or not implemented, synchronized channel access. The second set of wireless communication devices may be configured to interpret the quiet elements but may not be configured to interpret the quiet override elements.

For example, exchanging the one or more first wireless packets including the channel access information in block 1502 may include broadcasting, multicasting, otherwise transmitting, or receiving frames, such as management frames, that include or indicate the quiet elements and quiet override element. For example, the channel access information including the quiet elements and quiet override element may be shared in beacons 1608 (including beacons $1608_1$, $1608_2$ and $1608_3$) or in probe response frames. For example, the beacon $1608_1$ may include a first quiet element and quiet override element that identifies a first quiet period to be used by the first set of wireless access points as the coordinated access window $1602_1$.

In some implementations or instances in which the first wireless access point may or may not be (or configured to operate within) a master (or controlling) access point, the first wireless access point may transmit a first wireless packet including the channel access information to the other synchronized access points in the first set of wireless access points in block 1502. Alternatively, in some other implementations or instances, again, in which the first wireless access point may or may not be (or configured to operate within) a master (or controlling) access point, the first wireless access point may receive a first wireless packet including the channel access information from at least one other synchronized access point in the first set of wireless access points in block 1502.

The channel access information exchanged in block 1502 may include various channel access parameters associated with the recurring coordinated access windows 1602 such as, for example, one or more of the relevant wireless channel or channels for which the scheduled channel access is defined, a start time of the next coordinated access window 1602, the time interval $\tau_{Access}$ between the starts of consecutive coordinated access windows 1602, the duration $\tau_{Cntd}$ of each contention period 1604, the duration $\tau_{Comm}$ of each communication period 1606, or the total duration of each coordinated access window 1602. As described above, each of the quiet periods, and thus the coordinated access windows 1602, may recur according to a TBTT or other time interval.

As described above, while devices are generally not permitted to contend for access during quiet periods, a quiet override element indicates to the first set of wireless access points (and in some instances the first set of wireless stations) that a quiet period established by a respective quiet element is to be used for synchronized channel access, and as such, that the first set of wireless access points is permitted to contend for access during a respective contention period 1604 of a respective synchronized coordinated access window 1602. The quiet override element may include multiple fields including an element ID, a length, and a quiet override map, as well as, in some implementations, a duration field or a reserved field. The quiet override map may include a bitmap in which each bit is associated with a respective quiet element. A value of each bit in the bitmap may indicate whether the quiet period defined by a respective quiet element is to be used as a synchronized coordinated access window 1602, and as such, whether the first set of wireless access points is permitted to contend for access during a contention period 1604 of the respective coordinated access window 1602 defined by the quiet element associated with the bit. The duration field may indicate a duration of each contention period 1604. For example, the duration field may include a 4-bit value indicating a duration to be used for all contention periods (in some other implementations, the duration field may include multiple sub-fields each indicating a duration of a respective contention period for a respective quiet period). In some other examples, another field in a beacon or other management frame shared by the synchronized access points may be used to signal the durations of the contention periods.

As described above, if the first wireless access point wins the contention during one of the contention periods 1604, it is then the owner of a TXOP on the wireless channel during the respective communication period 1606 of the respective coordinated access window 1602. The first wireless access point may then exchange one or more wireless data packets to the first set of wireless stations on the wireless channel during the TXOP. For example, the first wireless access point may transmit DL data to one or more of the first set of wireless stations. Additionally or alternatively, the first wireless access point may receive UL data from one or more of the first set of wireless stations.

In some implementations, the first set of wireless access points may signal their support for synchronized channel access to other ones of the first wet of wireless access points (as well as to associated wireless stations) in management frames, such as beacon frames and probe response frames, or other frames transmitted between the synchronized access points. For example, the first set of wireless access points may signal their support for synchronized channel access in an operation element included within the beacon, probe response or other frames. The first set of wireless access points may also receive management frames, such as probe requests, from associated wireless stations including the first set of wireless stations indicating that the stations support synchronized channel access. For example, the wireless stations may signal their support for synchronized channel access in a capability element included within probe request frames.

In some implementations, the first set of wireless access points may receive one or more explicit synchronization signals from either a dedicated controller or another access point operating as a master (or controlling) access point. The first set of wireless access points may synchronize their respective clocks based on the synchronization signals to facilitate the implementation of the recurring coordinated access windows. In some other implementations, the first set of wireless access points may synchronize their clocks based on the receipt of various frames (for example, beacons or other management frames, control frames or data frames) from other ones of the first set of wireless access points participating in the recurring coordinated access windows.

As described above, each wireless station in the first set of wireless stations is also configured for D2D communications (also referred to generally herein as direct wireless communications) with other wireless stations. In particular implementations, the first set of wireless stations operate a NAN network alone or in combination with other NAN-enabled wireless stations associated with other wireless access points. As further described above, in block 1506, the first wireless access point determines that the first set of wireless stations is operating the NAN network. For example, in some implementations the determination in block 1506 includes scanning one or more NAN discovery channels to determine whether the first set of wireless stations is operating a NAN network. Additionally or alternatively, the determination in block 1506 may be based on receiving a wireless packet including an action frame from one or more of the first set of wireless stations that indicates one or more parameters associated with the NAN network including a timing of a NAN discovery window.

In some implementations, responsive to determining that the first set of wireless stations is operating the NAN network, the first wireless access point transmits the third wireless packet in block 1508 to the first set of wireless stations that includes the second indication of a reserved access window 1610 that is within one or more of the periodic coordinated access windows 1602, for example, during a portion of the respective communication period 1606 (such as an ending portion of the communication period 1606 as shown). In some implementations, the second packet and the third wireless packet may be the same packet; that is, a single wireless packet may include both the first indication of the coordinated access windows 1602 and the second indication of the reserved access windows 1610. The second indication indicates that the first set of wireless stations are permitted to transmit direct wireless communications to other wireless stations in the NAN network on the one or more wireless channels despite the first indication. The first set of wireless stations may then contend for access to the wireless medium during one or more portions of the reserved access windows 1610. The first wireless access point may refrain from transmitting wireless communications during the reserved access windows 1610.

In some implementations, the first set of wireless stations are not permitted to transmit direct wireless data communications to other wireless stations outside of reserved access windows 1610 (but they may be able to transmit other direct non-data wireless communications in, for example, discovery windows outside of the coordinated access windows 1602). In some implementations, the indication of the periodic reserved access windows 1610 indicates to the first set of wireless stations that they are permitted to transmit direct wireless communications to other wireless stations outside of the first set of wireless stations (for example, in other BSSs managed by other wireless access points) during at least a portion of one or more of the reserved access windows 1610. In some implementations, the indication of the reserved access windows 1610 indicates to other wireless stations in other BSSs that they are permitted to transmit direct wireless communications to other wireless stations, which may include the first set of wireless stations, on the one or more wireless channels during at least a portion of one or more of the reserved access windows 1610.

In some implementations, the process 1600 further includes exchanging one or more wireless packets with one or more other access points in the first set of wireless access points to coordinate a schedule of periodic reserved access windows 1610. For example, the exchange of the one or more wireless packets may include transmitting beacons and receiving beacons from the other wireless access points that each include timing information for coordinating the schedule of the periodic reserved access windows 1610.

In some implementations, the indication of the reserved access windows 1610 includes one or more other parameters for the reserved access windows 1610. In some implementations, the one or more other parameters include a time slot schedule defining a series of time slots in the reserved access windows 1610. In some implementations, each of the time slots may be separated from each other time slot by an IFS (for example, a SIFS). The number of time slots may vary, and may be adjusted or distributed differently in different reserved access windows 1610 in different coordinated access windows 1602. In some such implementations, the process 1500 further includes allocating each of one or more of the time slots to a respective subset of the first set of wireless stations (for example, two or more wireless stations) for the direct wireless communications. For example, each subset of wireless stations in the first set of wireless stations may not be permitted to transmit direct wireless communications in another time slot allocated to a different subset of wireless stations in the first set of wireless stations.

In some implementations, during at least one of the time slots, at least some of the first set of wireless stations may be permitted to transmit or receive direct wireless communications to or from other wireless stations in the NAN network associated with other BSSs controlled by other access points. In some such implementations, the first wireless access point and other wireless access points may not restrict direct wireless communications to any individual BSS in at least one of the time slots. Additionally or alternatively, the first wireless access point and the other wireless access points may exchange one or more wireless packets to further coordinate a time slot schedule for the time slots within at least one of the reserved access windows. In some such implementations, the exchange includes transmitting, to at least one of the wireless access points, identifiers of one or more wireless stations in the first set of wireless stations. The exchange further includes receiving, from the wireless access point, identifiers of one or more wireless stations associated with the wireless access point that are configured for direct wireless communications with other wireless stations. The two wireless access points may coordinate which wireless stations of the first set of wireless stations are permitted to transmit direct wireless communications to wireless stations associated with the other wireless access point during one or more time slots allocated to the other wireless access point. Similarly, the coordination may include determining which wireless stations of the set of wireless stations associated with the other wireless access point are permitted to transmit direct wireless communications to wireless stations in the first set of wireless stations during one or more time slots allocated to the first set of wireless stations.

In some implementations, the one or more other parameters identified in the indication of the reserved access window 1610 may further include a frame type for direct wireless communication permitted to be transmitted during the reserved access window 1610 or any other control information for controlling direct wireless communication during the reserved access window 1610.

In some implementations, the process 1500 further includes transmitting a trigger frame to the first set of wireless stations at a beginning of a reserved access window 1610 that triggers or initiates direct wireless communications by the wireless stations in the first set of wireless stations. For example, the trigger frame may indicate to the first set of wireless stations that they are permitted to contend for access during the respective slots within the reserved access window 1610. In some other implementations, the process 1500 may further include transmitting an RDG frame to one or more of the wireless stations in the first set of wireless stations to initiate the direct wireless communications with other wireless stations.

Figure 17:
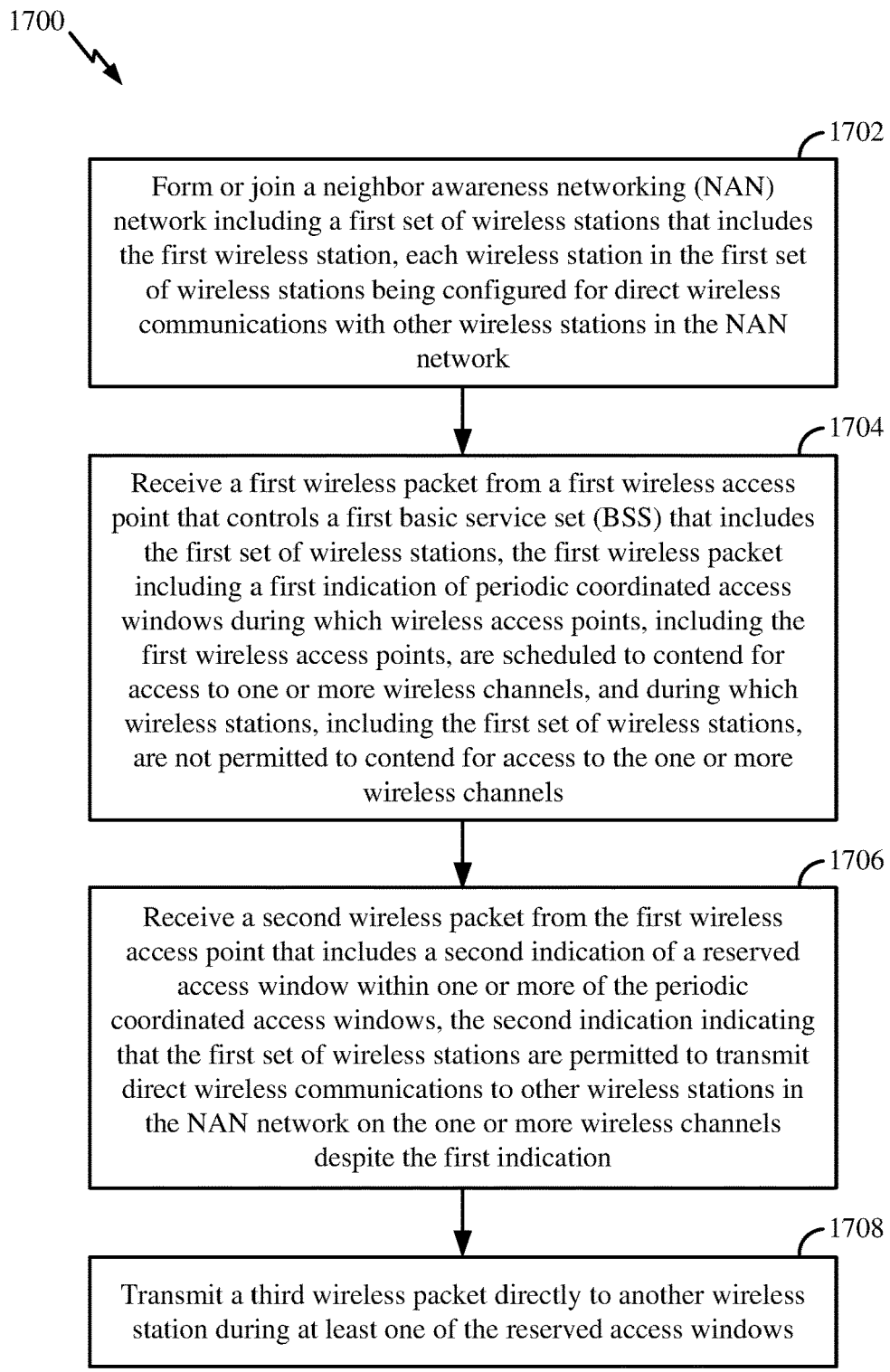
FIG. 17 shows a flowchart illustrating an example process for wireless communication that supports coordinated D2D communications according to some implementations.

FIG. 17 shows a flowchart illustrating an example process 1700 for wireless communication that supports coordinated D2D communications according to some implementations. The operations of the process 1700 may be implemented by a wireless station or its components as described herein. For example, the process 1700 may be performed by a wireless communication device such as the wireless communication device 500 described above with reference to FIG. 5. In some implementations, the process 1700 may be performed by a wireless station, such as one of the STAs 104 and 604 described above with reference to FIGS. 1 and 6B, respectively.

In block 1702, the wireless communication device (hereinafter referred to as the first wireless station with respect to FIG. 17) forms or joins a NAN network including a first set of wireless stations that includes the first wireless station. Each wireless station in the first set of wireless stations is configured for direct wireless communications with other wireless stations in the NAN network. In block 1704, the first wireless station receives a first wireless packet from a first wireless access point that controls a first BSS that includes the first set of wireless stations. The first wireless packet includes a first indication of periodic coordinated access windows during which wireless access points, including the first wireless access point, are scheduled to contend for access to one or more wireless channels, and during which wireless stations, including the first set of wireless stations, are not permitted to contend for access to the one or more wireless channels. In block 1706, the first wireless station receives a second wireless packet from the first wireless access point that includes a second indication of a reserved access window within one or more of the periodic coordinated access windows, the second indication indicating that the first set of wireless stations are permitted to transmit direct wireless communications to other wireless stations in the NAN network on the one or more wireless channels despite the first indication. In block 1708, the first wireless station transmits a third wireless packet directly to another wireless station during at least one of the reserved access windows.

The first wireless packet received in block 1704 includes channel access information establishing one or more recurring synchronized coordinated access windows 1602 as described above with respect to FIG. 16. The first set of wireless stations are not permitted to contend for access to the one or more wireless channels during any portion of the periodic coordinated access windows 1602. As described above, in some implementations, the channel access information is conveyed by one or more quiet elements and one or more quiet override elements included within the first wireless packets. Each quiet element indicates to a set of wireless communication devices, that may include a first set of wireless access points and the first set of wireless stations, that they are not permitted to transmit on a wireless channel during a quiet period defined by the quiet element. In some implementations, a quiet override element indicates to the first set of wireless access points, for each of one or more of the quiet elements, whether they are permitted to contend for access to the wireless channel during a contention period of the quiet period defined by the respective quiet element. In this way, the first set of wireless access points may schedule periodically recurring, synchronized coordinated access windows, such as synchronized coordinated access windows 1602 described with reference to FIG. 16, by establishing periodic quiet periods.

As described above, the quiet elements establish recurring quiet periods during which compatible devices receiving the quiet elements are generally not permitted to transmit. In such a manner, synchronized channel access may be protected. For example, the compatible devices may include the first set of wireless access points and the first set of wireless stations. The first set of wireless access points are access points that support synchronized channel access (synchronized access points). However, while no devices are generally permitted to contend for access during quiet periods, a quiet override element indicates to the first set of wireless access points (and to the first set of wireless stations) that a quiet period established by a respective quiet element is to be used for synchronized channel access, and as such, that the first set of wireless access points is permitted to contend for access during the respective contention period 1604. Additionally, the first set of wireless stations that support synchronized channel access may also understand the quiet override element, and as such, may be configured to receive DL communications from the first wireless access point during a quiet period and, in response to receiving a trigger frame from the first wireless access point, transmit UL communications to the first wireless access point during the quiet period.

As described above, each wireless station in the first set of wireless stations is also configured for D2D communications with other wireless stations. In particular implementations, the first set of wireless stations operate a NAN network alone or in combination with other NAN-enabled wireless stations associated with other wireless access points. In some implementations, the first wireless station transmits a wireless packet to the first wireless access point that includes one or more parameters for the NAN network including a timing of a NAN discovery window. In some other implementations, the first wireless station may schedule the NAN discovery window for the NAN network to periodically begin at a fixed duration of time after each periodic coordinated access window 1602. In some implementations, the first wireless station may also transmit, in the NAN discovery windows, an indication of the periodic coordinated access windows 1602 to other wireless stations in the NAN network.

As described above, in block 1706, the first wireless station receives the second wireless packet from the first wireless access point that includes the second indication of the reserved access window 1610 within one or more of the periodic coordinated access windows 1602. As further described above, the second indication indicating that the first set of wireless stations are permitted to transmit direct wireless communications to other wireless stations in the NAN network on the one or more wireless channels despite the first indication. In some implementations, the second packet and the third wireless packet may be the same packet; that is, a single wireless packet may include both the first indication of the coordinated access windows 1602 and the second indication of the reserved access windows 1610.

In some implementations, the first set of wireless stations are not permitted to transmit direct wireless data communications to other wireless stations outside of reserved access windows 1610 (but they may be able to transmit other direct non-data wireless communications in, for example, discovery windows outside of the coordinated access windows 1602). In some implementations, the second indication of the reserved access windows 1610 received in block 1706 indicates to the first set of wireless stations that they are permitted to transmit direct wireless communications to other wireless stations outside of the first set of wireless stations (for example, in other BSSs managed by other wireless access points) during at least a portion of one or more of the reserved access windows 1610. In some implementations, the indication of the reserved access windows 1610 received in block 1706 indicates to other wireless stations in other BSSs that they are permitted to transmit direct wireless communications to other wireless stations, which may include the first set of wireless stations, on the one or more wireless channels during at least a portion of one or more of the reserved access windows 1610.

In some implementations, the indication of the reserved access windows 1610 received in block 1706 includes one or more other parameters for the reserved access windows 1610. In some implementations, the one or more other parameters include a time slot schedule defining a series of time slots in the reserved access windows 1610. In some implementations, each of the time slots may be separated from each other time slot by an IFS (for example, a SIFS). The number of time slots may vary, and may be adjusted or distributed differently in different reserved access windows 1610 in different coordinated access windows 1602. In some such implementations, each of one or more of the time slots may be allocated to a respective subset of the first set of wireless stations (for example, two or more wireless stations) for the direct wireless communications. For example, each subset of wireless stations in the first set of wireless stations may not be permitted to transmit direct wireless communications in another time slot allocated to a different subset of wireless stations in the first set of wireless stations. In some implementations, during at least one of the time slots, at least some of the first set of wireless stations may be permitted to transmit or receive direct wireless communications to or from other wireless stations in the NAN network associated with other BSSs controlled by other access points. In some such implementations, the first wireless access point and other wireless access points may not restrict direct wireless communications to any individual BSS in at least one of the time slots.

In some implementations, the one or more other parameters identified in the indication of the reserved access window 1610 may further include a frame type for direct wireless communication permitted to be transmitted during the reserved access window 1610 or any other control information for controlling direct wireless communication during the reserved access window 1610.

In some implementations, the process 1700 further includes receiving a trigger frame from the first wireless access point at a beginning of a reserved access window 1610 that triggers or initiates direct wireless communications by the first wireless station. For example, the first wireless station may contend for access during the respective slots within the reserved access window 1610 based on the receipt of the trigger frame. In some other implementations, the process 1700 may further include receiving an RDG frame from the first wireless access point to initiate the direct wireless communications with other wireless stations.

Figure 18:
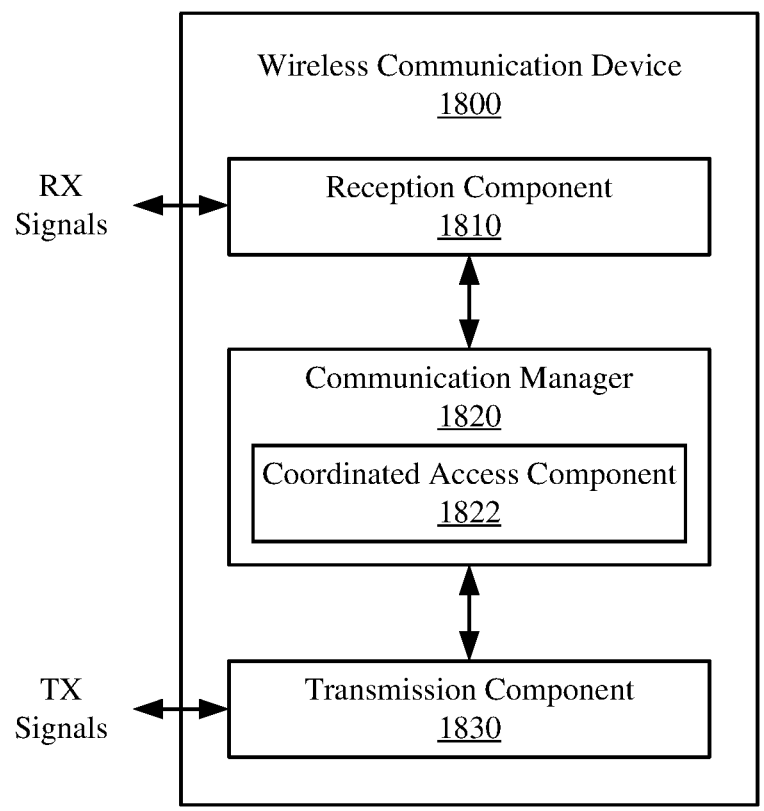
FIG. 18 shows a block diagram of an example wireless communication device that supports coordinated D2D communications according to some implementations.

FIG. 18 shows a block diagram of an example wireless communication device 1800 that supports coordinated D2D communications according to some implementations. In some implementations, the wireless communication device 1800 is configured to perform the process 1100 described above with reference to FIG. 11. The wireless communication device 1800 may be an example implementation of the wireless communication device 500 described above with reference to FIG. 5. For example, the wireless communication device 1800 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 1800 may further include at least one radio (such as the radio 506). In some implementations, the wireless communication device 1800 can be a device for use in an AP, such as one of the APs 102 and 602 described above with reference to FIGS. 1 and 6A, respectively. In some other implementations, the wireless communication device 1800 can be an AP that includes such a chip, SoC, chipset, package or device as well as at least one antenna (such as the antennas 620).

The wireless communication device 1800 includes a reception component 1810, a communication manager 1820, and a transmission component 1830. The communication manager 1820 further includes a coordinated access component 1822. Portions of the coordinated access component 1822 may be implemented at least in part in hardware or firmware. In some implementations, the coordinated access component 1822 is implemented at least in part as software stored in the memory. For example, portions of the coordinated access component 1822 can be implemented as non-transitory instructions (or "code") executable by the processor to perform the functions or operations of the respective component.

The reception component 1810 is configured to receive RX signals representing uplink communications from wireless stations or communications from other APs. The transmission component 1830 is configured to transmit TX signals representing downlink communications to the wireless stations or communications to other APs. In some implementations, the coordinated access component 1822 is configured to generate and cause the transmission component 1830 to transmit a first wireless packet to at least a first set of wireless stations in a first BSS controlled by the first wireless access point, each wireless station in the first set of wireless stations being configured for direct wireless communications with other wireless stations. The first wireless packet may include an indication of periodic reserved access windows indicating to the first set of wireless stations that they are permitted to transmit direct wireless communications to other wireless stations in the first set of wireless stations on one or more wireless channels during the periodic reserved access windows. The coordinated access component 1822 is further configured to refrain from causing the transmission component 1830 to transmit wireless communications during the periodic reserved access windows.

Figure 19:
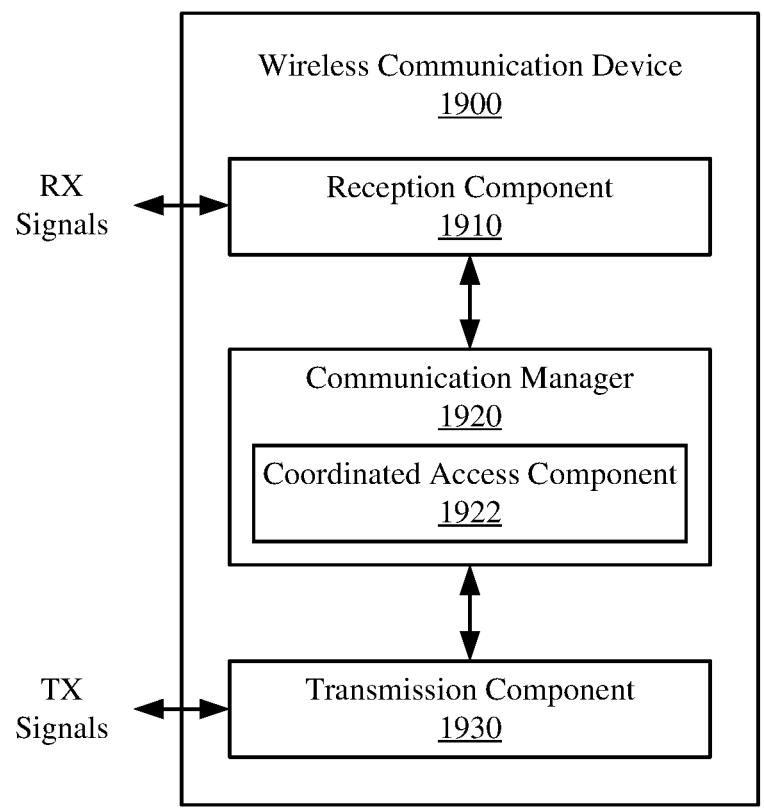
FIG. 19 shows a block diagram of an example wireless communication device that supports coordinated D2D communications according to some implementations.

FIG. 19 shows a block diagram of an example wireless communication device 1900 that supports coordinated D2D communications according to some implementations. In some implementations, the wireless communication device 1900 is configured to perform the process 1200 described above with reference to FIG. 12. The wireless communication device 1900 may be an example implementation of the wireless communication device 500 described above with reference to FIG. 5. For example, the wireless communication device 1900 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 1900 may further include at least one radio (such as the radio 506). In some implementations, the wireless communication device 1900 can be a device for use in a STA, such as one of the STAs 104 and 604 described above with reference to FIGS. 1 and 6A, respectively. In some other implementations, the wireless communication device 1900 can be a STA that includes such a chip, SoC, chipset, package or device as well as at least one antenna (such as the antennas 625).

The wireless communication device 1900 includes a reception component 1910, a communication manager 1920, and a transmission component 1930. The communication manager 1920 further includes a coordinated access component 1922. Portions of the coordinated access component 1922 may be implemented at least in part in hardware or firmware. In some implementations, the coordinated access component 1922 is implemented at least in part as software stored in the memory. For example, portions of the coordinated access component 1922 can be implemented as non-transitory instructions (or "code") executable by the processor to perform the functions or operations of the respective component.

The reception component 1910 is configured to receive RX signals representing downlink communications from a wireless access point or communications directly from other wireless stations. The transmission component 1930 is configured to transmit TX signals representing uplink communications to the wireless access point or communications directly to other wireless stations. In some implementations, the coordinated access component 1922 is configured to receive, via the reception component 1910, a first wireless packet from a first wireless access point that controls a first BSS including a first set of wireless stations that includes the first wireless station, the first wireless station being configured for direct wireless communications with other wireless stations. The first wireless packet may include an indication of periodic reserved access windows indicating to the first wireless station that it is permitted to transmit direct wireless communications to one or more other wireless stations in the first set of wireless stations on one or more wireless channels during the periodic reserved access windows. The coordinated access component is further configured to generated and cause the transmission component 1930 to transmit a second wireless packet directly to another wireless station during at least one of the periodic reserved access windows.

Figure 20:
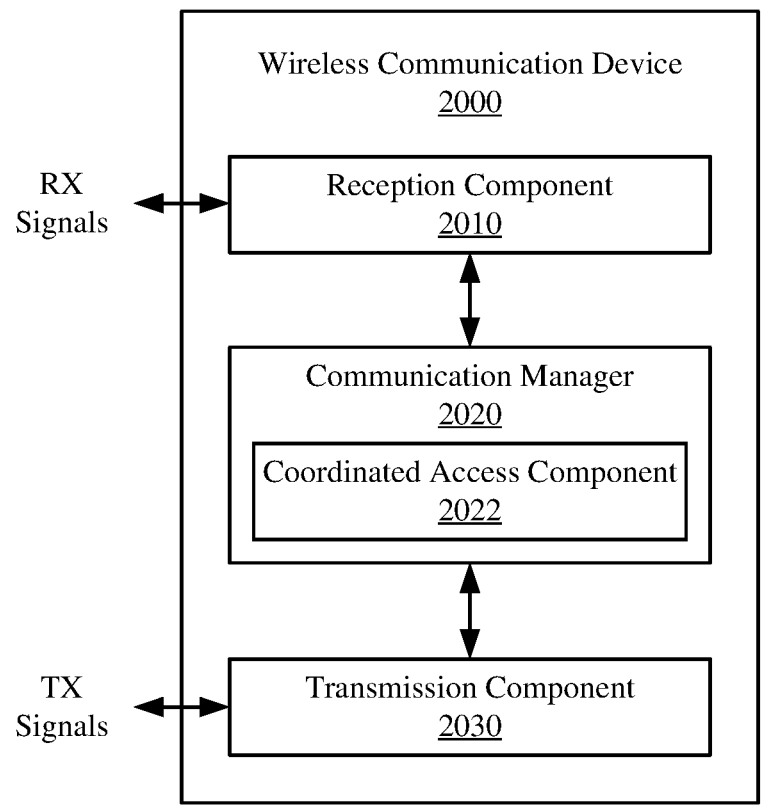
FIG. 20 shows a block diagram of an example wireless communication device that supports coordinated D2D communications according to some implementations.

FIG. 20 shows a block diagram of an example wireless communication device 2000 that supports coordinated D2D communications according to some implementations. In some implementations, the wireless communication device 2000 is configured to perform the process 1300 described above with reference to FIG. 13. The wireless communication device 2000 may be an example implementation of the wireless communication device 500 described above with reference to FIG. 5. For example, the wireless communication device 2000 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 2000 may further include at least one radio (such as the radio 506). In some implementations, the wireless communication device 2000 can be a device for use in an AP, such as one of the APs 102 and 602 described above with reference to FIGS. 1 and 6A, respectively. In some other implementations, the wireless communication device 2000 can be an AP that includes such a chip, SoC, chipset, package or device as well as at least one antenna (such as the antennas 620).

The wireless communication device 2000 includes a reception component 2010, a communication manager 2020, and a transmission component 2030. The communication manager 2020 further includes a coordinated access component 2022. Portions of the coordinated access component 2022 may be implemented at least in part in hardware or firmware. In some implementations, the coordinated access component 2022 is implemented at least in part as software stored in the memory. For example, portions of the coordinated access component 2022 can be implemented as non-transitory instructions (or "code") executable by the processor to perform the functions or operations of the respective component.

The reception component 2010 is configured to receive RX signals representing uplink communications from wireless stations or communications from other APs. The transmission component 2030 is configured to transmit TX signals representing downlink communications to the wireless stations or communications to other APs. In some implementations, the coordinated access component 2022 is configured to contend for access to the medium to obtain a transmission opportunity for wireless communication via one or more wireless channels. The coordinated access component 2022 also is configured to select one or more other wireless access points to participate in the transmission opportunity. The coordinated access component 2022 also is configured to allocate a respective set of time and frequency resources of a plurality of sets of time and frequency resources of the transmission opportunity to each of the first wireless access point and the selected wireless access points. The coordinated access component 2022 also is configured to allocate a first subset of time and frequency resources, of the set of time and frequency resources allocated to the first wireless access point, to a first set of wireless stations in a BSS controlled by the first wireless access point for direct wireless communications with other wireless stations. The coordinated access component 2022 also is configured to generate and cause the transmission component 2030 to transmit a first wireless packet to the one or more selected wireless access points that includes, for each of the selected wireless access points, an indication of the set of time and frequency resources allocated to the respective wireless access point. The coordinated access component 2022 is additionally configured to generate and cause the transmission component 2030 to transmit a second wireless packet to the first set of wireless stations that includes an indication of the first subset of time and frequency resources. The coordinated access component 2022 is further configured to refrain from causing the transmission component 1030 to transmit wireless communications in the first subset of time and frequency resources.

Figure 21:
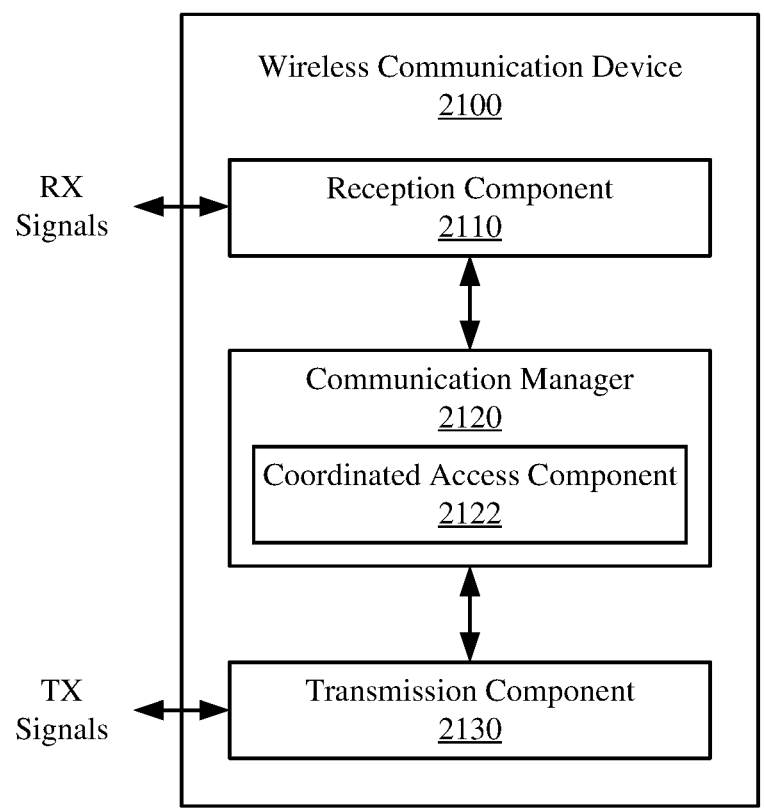
FIG. 21 shows a block diagram of an example wireless communication device that supports coordinated D2D communications according to some implementations.

FIG. 21 shows a block diagram of an example wireless communication device 2100 that supports coordinated D2D communications according to some implementations. In some implementations, the wireless communication device 2100 is configured to perform the process 1400 described above with reference to FIG. 14. The wireless communication device 2100 may be an example implementation of the wireless communication device 500 described above with reference to FIG. 5. For example, the wireless communication device 2100 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 2100 may further include at least one radio (such as the radio 506). In some implementations, the wireless communication device 2100 can be a device for use in a AP, such as one of the APs 102 and 602 described above with reference to FIGS. 1 and 6A, respectively. In some other implementations, the wireless communication device 2100 can be an AP that includes such a chip, SoC, chipset, package or device as well as at least one antenna (such as the antennas 620).

The wireless communication device 2100 includes a reception component 2110, a communication manager 2120, and a transmission component 2130. The communication manager 2120 further includes a coordinated access component 2122. Portions of the coordinated access component 2122 may be implemented at least in part in hardware or firmware. In some implementations, the coordinated access component 2122 is implemented at least in part as software stored in the memory. For example, portions of the coordinated access component 2122 can be implemented as non-transitory instructions (or "code") executable by the processor to perform the functions or operations of the respective component.

The reception component 2110 is configured to receive RX signals representing uplink communications from wireless stations or communications from other APs. The transmission component 2130 is configured to transmit TX signals representing downlink communications to the wireless stations or communications to other APs. In some implementations, the coordinated access component 2122 is configured to receive, via the reception component 2110, a first wireless packet from a second wireless access point that indicates that a plurality of time and frequency resources of a transmission opportunity owned by the second wireless access point can be shared by the second wireless access point. The coordinated access component 2122 also is configured to generate and cause the transmission component 2130 to transmit a second wireless packet to the second wireless access point indicating a desire to participate in the transmission opportunity. The coordinated access component 2122 also is configured to receive, via the reception component 2110, a third wireless packet from the second wireless access point that includes an indication of a first set of time and frequency resources of the plurality of time and frequency resources allocated to the first wireless access point and usable by the first wireless access point to transmit data to, or receive data from, a first set of wireless stations in a first BSS controlled by the first wireless access point during the transmission opportunity. The coordinated access component 2122 also is configured to allocate a first subset of time and frequency resources, of the first set of time and frequency resources allocated to the first wireless access point, to the first set of wireless stations for direct wireless communications with other wireless stations. The coordinated access component 2122 is additionally configured to generate and cause the transmission component 2130 to transmit a fourth wireless packet to the first set of wireless stations that includes an indication of the first subset of time and frequency resources. The coordinated access component 2122 is further configured to refrain from causing the transmission component 2130 to transmit wireless communications in the first subset of time and frequency resources.

Figure 22:
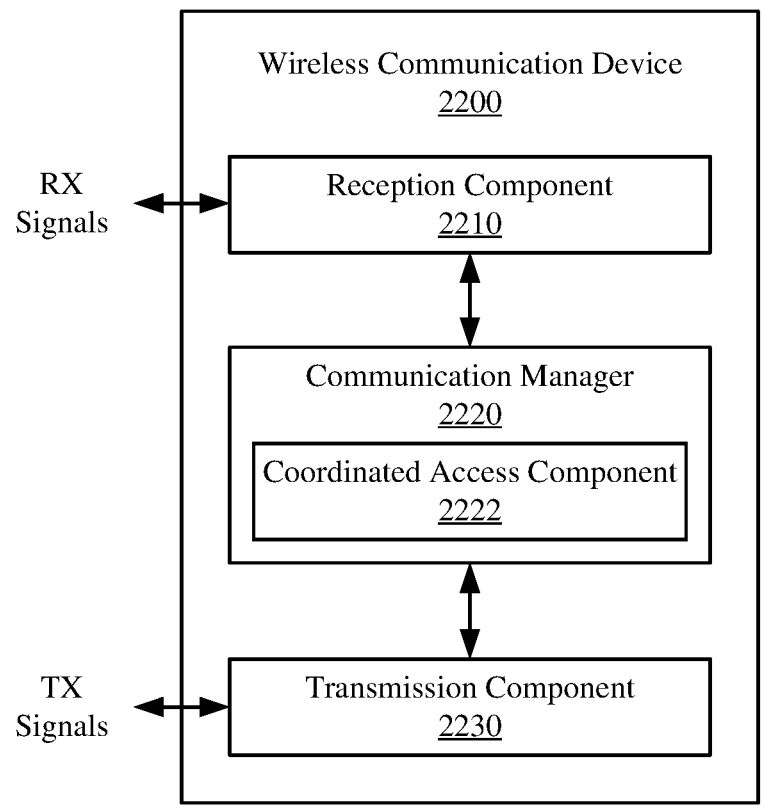
FIG. 22 shows a block diagram of an example wireless communication device that supports coordinated D2D communications according to some implementations.

FIG. 22 shows a block diagram of an example wireless communication device 2200 that supports coordinated D2D communications according to some implementations. In some implementations, the wireless communication device 2200 is configured to perform the process 1500 described above with reference to FIG. 15. The wireless communication device 2200 may be an example implementation of the wireless communication device 500 described above with reference to FIG. 5. For example, the wireless communication device 2200 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 2200 may further include at least one radio (such as the radio 506). In some implementations, the wireless communication device 2200 can be a device for use in a STA, such as one of the STAs 104 and 604 described above with reference to FIGS. 1 and 6A, respectively. In some other implementations, the wireless communication device 2200 can be a STA that includes such a chip, SoC, chipset, package or device as well as at least one antenna (such as the antennas 625).

The wireless communication device 2200 includes a reception component 2210, a communication manager 2220, and a transmission component 2230. The communication manager 2220 further includes a coordinated access component 2222. Portions of the coordinated access component 2222 may be implemented at least in part in hardware or firmware. In some implementations, the coordinated access component 2222 is implemented at least in part as software stored in the memory. For example, portions of the coordinated access component 2222 can be implemented as non-transitory instructions (or "code") executable by the processor to perform the functions or operations of the respective component.

The reception component 2210 is configured to receive RX signals representing downlink communications from a wireless access point or communications directly from other wireless stations. The transmission component 1930 is configured to transmit TX signals representing uplink communications to the wireless access point or communications directly to other wireless stations. In some implementations, the coordinated access component 2222 is configured to receive, via the reception component 2210, a first wireless packet from a first wireless access point that controls a first BSS including a first set of wireless stations that includes the first wireless station, the first set of wireless stations being configured for direct wireless communications with other wireless stations. The first wireless packet may include an indication of a first subset of time and frequency resources of a first set of time and frequency resources allocated to the first BSS of a plurality of sets of time and frequency resources of a transmission opportunity owned by the first wireless access point or a second wireless access point, the first subset of time and frequency resources being allocated for use by the first set of wireless stations for direct wireless communications with other wireless stations. The coordinated access component 2222 is further configured to generate and cause the transmission component 2230 to transmit a second wireless packet directly to another wireless station using the first subset of time and frequency resources.

Figure 23:
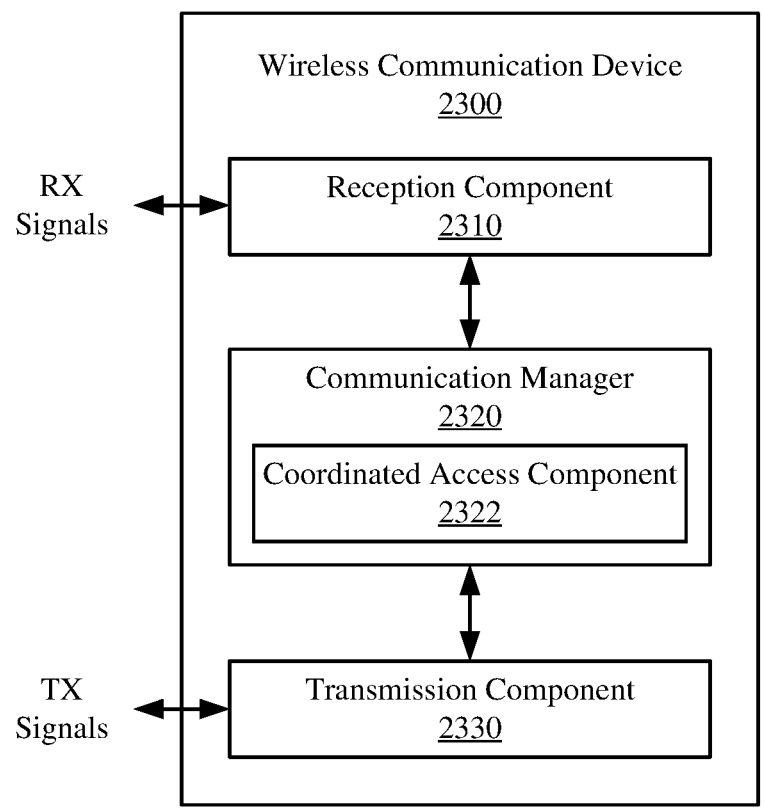
FIG. 23 shows a block diagram of an example wireless communication device that supports coordinated D2D communications according to some implementations.

FIG. 23 shows a block diagram of an example wireless communication device 2300 that supports coordinated D2D communications according to some implementations. In some implementations, the wireless communication device 2300 is configured to perform the process 1600 described above with reference to FIG. 16. The wireless communication device 2300 may be an example implementation of the wireless communication device 500 described above with reference to FIG. 5. For example, the wireless communication device 2300 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 2300 may further include at least one radio (such as the radio 506). In some implementations, the wireless communication device 2300 can be a device for use in an AP, such as one of the APs 102 and 602 described above with reference to FIGS. 1 and 6A, respectively. In some other implementations, the wireless communication device 2300 can be an AP that includes such a chip, SoC, chipset, package or device as well as at least one antenna (such as the antennas 620).

The wireless communication device 2300 includes a reception component 2310, a communication manager 2320, and a transmission component 2330. The communication manager 2320 further includes a coordinated access component 2322. Portions of the coordinated access component 2322 may be implemented at least in part in hardware or firmware. In some implementations, the coordinated access component 2322 is implemented at least in part as software stored in the memory. For example, portions of the coordinated access component 2322 can be implemented as non-transitory instructions (or "code") executable by the processor to perform the functions or operations of the respective component.

The reception component 2310 is configured to receive RX signals representing uplink communications from wireless stations or communications from other APs. The transmission component 2330 is configured to transmit TX signals representing downlink communications to the wireless stations or communications to other APs. In some implementations, the coordinated access component 2322 is configured to, via the reception component 2310 and the transmission component 2330, exchange one or more first wireless packets with a first set of wireless access points that includes the first wireless access point to coordinate a schedule of periodic coordinated access windows during which the first set of wireless access points are scheduled to contend for access to one or more wireless channels. The coordinated access component 2322 also is configured to generate and cause the transmission component 2330 to transmit a second wireless packet that includes a first indication of the periodic coordinated access windows. The coordinated access component 2322 also is configured to determine that a first set of wireless stations in a first BSS controlled by the first wireless access point is operating a NAN network, each wireless station in the first set of wireless stations being configured for direct wireless communications with other wireless stations in the NAN network. In some implementations, the first set of wireless stations are not permitted to contend for access to the one or more wireless channels during the periodic coordinated access windows. The coordinated access component 2322 is additionally configured to generate and cause the transmission component 2330 to transmit a third wireless packet to the first set of wireless stations that includes a second indication of a reserved access window within one or more of the periodic coordinated access windows, the second indication indicating that the first set of wireless stations are permitted to transmit direct wireless communications to other wireless stations in the NAN network on the one or more wireless channels despite the first indication. The coordinated access component 2322 is further configured to refrain from causing the transmission component 2330 to transmit wireless communications during the reserved access windows.

Figure 24:
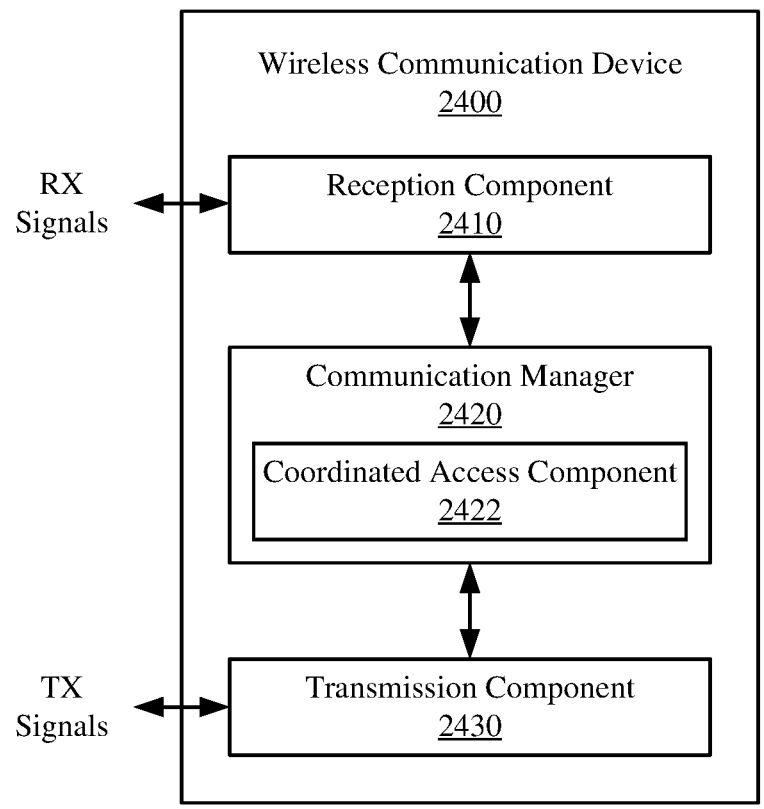
FIG. 24 shows a block diagram of an example wireless communication device that supports coordinated D2D communications according to some implementations.

FIG. 24 shows a block diagram of an example wireless communication device 2400 that supports coordinated D2D communications according to some implementations. In some implementations, the wireless communication device 2400 is configured to perform the process 1700 described above with reference to FIG. 17. The wireless communication device 2400 may be an example implementation of the wireless communication device 500 described above with reference to FIG. 5. For example, the wireless communication device 2400 can be a chip, SoC, chipset, package or device that includes at least one modem (for example, a Wi-Fi (IEEE 802.11) modem or a cellular modem such as the modem 502), at least one processor (such as the processor 504) and at least one memory (such as the memory 508). The wireless communication device 2400 may further include at least one radio (such as the radio 506). In some implementations, the wireless communication device 2400 can be a device for use in a STA, such as one of the STAs 104 and 604 described above with reference to FIGS. 1 and 6A, respectively. In some other implementations, the wireless communication device 2400 can be a STA that includes such a chip, SoC, chipset, package or device as well as at least one antenna (such as the antennas 625).

The wireless communication device 2400 includes a reception component 2410, a communication manager 2420, and a transmission component 2430. The communication manager 2420 further includes a coordinated access component 2422. Portions of the coordinated access component 2422 may be implemented at least in part in hardware or firmware. In some implementations, the coordinated access component 2422 is implemented at least in part as software stored in the memory. For example, portions of the coordinated access component 2422 can be implemented as non-transitory instructions (or "code") executable by the processor to perform the functions or operations of the respective component.

The reception component 2410 is configured to receive RX signals representing downlink communications from a wireless access point or communications directly from other wireless stations. The transmission component 2430 is configured to transmit TX signals representing uplink communications to the wireless access point or communications directly to other wireless stations. In some implementations, the coordinated access component 2422 is configured to form or join a NAN network including a first set of wireless stations that includes the first wireless station, each wireless station in the first set of wireless stations being configured for direct wireless communications with other wireless stations in the NAN network. The coordinated access component 2422 also is configured to receive, via the reception component 2410, a first wireless packet from a first wireless access point that controls a first BSS that includes the first set of wireless stations. The first wireless packet may include a first indication of periodic coordinated access windows during which wireless access points, including the first wireless access point, are scheduled to contend for access to one or more wireless channels, and during which wireless stations, including the first set of wireless stations, are not permitted to contend for access to the one or more wireless channels. The coordinated access component 2422 is additionally configured to receive, via the reception component 2410, a second wireless packet from the first wireless access point that includes a second indication of a reserved access window within one or more of the periodic coordinated access windows, the second indication indicating that the first set of wireless stations are permitted to transmit direct wireless communications to other wireless stations in the NAN network on the one or more wireless channels despite the first indication. The coordinated access component 2422 is further configured to generate and cause the transmission component 2430 to transmit a third wireless packet directly to another wireless station during at least one of the reserved access windows.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless access point, the method comprising:
    obtaining a transmission opportunity for wireless communication via one or more wireless channels;
    allocating a respective set of time and frequency resources of a plurality of sets of time and frequency resources of the transmission opportunity to each of the first wireless access point and one or more other wireless access points;
    allocating a first subset of time and frequency resources, of the set of time and frequency resources allocated to the first wireless access point, to a first set of wireless stations in a basic service set (BSS) controlled by the first wireless access point for direct wireless communications with other wireless stations;
    transmitting a first wireless packet to the one or more other wireless access points that includes, for each of the other wireless access points, an indication of the respective set of time and frequency resources allocated to the respective wireless access point; and
    transmitting a second wireless packet to the first set of wireless stations that includes an indication of the first subset of time and frequency resources.

2. The method of claim 1, wherein:
    the frequency resources in each set of time and frequency resources of the plurality of sets of time and frequency resources overlap with the frequency resources in the other sets of time and frequency resources;
    the time resources in each set of time and frequency resources of the plurality of sets of time and frequency resources do not overlap with any of the time resources in the other sets of time and frequency resources;
    the time resources in the set of time and frequency resources allocated to the first wireless access point include a plurality of time slots and the first subset of time and frequency resources includes one or more of the plurality of time slots; and
    the indication of the first subset of time and frequency resources includes an indication of a time slot schedule for the plurality of time slots.

3. The method of claim 2, wherein, during at least one time slot of the one or more time slots included in the first subset of time and frequency resources, one or more wireless stations in the first set of wireless stations are permitted to transmit or receive direct wireless communications to or from other wireless stations associated with one or more of the other wireless access points.

4. The method of claim 2, further comprising:
    transmitting, to at least one of the other wireless access points, identifiers of one or more wireless stations in the first set of wireless stations;
    receiving, from the at least one other wireless access point, identifiers of one or more wireless stations associated with the at least one other wireless access point that are configured for direct wireless communications with other wireless stations; and coordinating, with the at least one other wireless access point, one or both of:

which wireless stations of the first set of wireless stations are permitted to transmit direct wireless communications to wireless stations associated with the at least one other wireless access point during one or more time slots in the set of time and frequency resources allocated to the at least one other wireless access point; and which wireless stations of the set of wireless stations associated with the at least one other wireless access point are permitted to transmit direct wireless communications to wireless stations in the first set of wireless stations during one or more of the time slots in the first subset of time and frequency resources allocated to the first set of wireless stations.

5. The method of claim 2, wherein at least one time slot of the one or more time slots associated with the first subset of time and frequency resources corresponds to a respective time slot in each of one or more other sets of time and frequency resources of the plurality of sets of time and frequency resources allocated to the other wireless access points, and wherein each wireless station in the first set of wireless stations and each wireless station in other sets of wireless stations associated with the other wireless access points is permitted to transmit direct wireless communications to each of the other wireless stations during the at least one time slot and the corresponding time slots.

6. The method of claim 2, wherein the second wireless packet includes a trigger frame that indicates the time slot schedule and that initiates direct wireless communications by wireless stations in the first set of wireless stations.

7. The method of claim 1, wherein:

the time resources in each set of time and frequency resources of the plurality of sets of time and frequency resources overlap with the time resources in the other sets of time and frequency resources;

the frequency resources in each set of time and frequency resources of the plurality of sets of time and frequency resources do not overlap with any of the frequency resources in the other sets of time and frequency resources;

the frequency resources in each set of time and frequency resources of the plurality of sets of time and frequency resources of the transmission opportunity include a plurality of frequency slots and the first subset of time and frequency resources includes one or more of the plurality of frequency slots; and the respective indication of the set of time and frequency resources includes an indication of a bandwidth schedule for the plurality of frequency slots.

8. The method of claim 7, wherein, in at least one frequency slot of the one or more frequency slots included in the first subset of time and frequency resources, one or more wireless stations in the first set of wireless stations are permitted to transmit or receive direct wireless communications to or from other wireless stations associated with one or more of the other wireless access points.

9. The method of claim 7, further comprising:

transmitting, to at least one of the other wireless access points, identifiers of one or more wireless stations in the first set of wireless stations;

receiving, from the at least one other wireless access point, identifiers of one or more wireless stations associated with the at least one other wireless access point that are configured for direct wireless communications with other wireless stations; and coordinating, with the at least one other wireless access point, one or both of:

which wireless stations of the first set of wireless stations are permitted to transmit direct wireless communications to wireless stations associated with the at least one other wireless access point in one or more frequency slots in the set of time and frequency resources allocated to the at least one other wireless access point; and which wireless stations of the set of wireless stations associated with the at least one other wireless access point are permitted to transmit direct wireless communications to wireless stations in the first set of wireless stations in one or more of the frequency slots in the first subset of time and frequency resources allocated to the first set of wireless stations.

10. The method of claim 7, wherein at least one frequency slot of the one or more frequency slots associated with the first subset of time and frequency resources corresponds to a respective frequency slot in each of one or more other sets of time and frequency resources of the plurality of sets of time and frequency resources allocated to the other wireless access points, and wherein each wireless station in the first set of wireless stations and each wireless station in other sets of wireless stations associated with the other wireless access points is permitted to transmit direct wireless communications to each of the other wireless stations in the at least one frequency slot and the corresponding frequency slots.

11. The method of claim 7, wherein the second wireless packet includes a trigger frame that indicates the bandwidth schedule and that initiates direct wireless communications by wireless stations in the first set of wireless stations.

12. The method of claim 1, further comprising selecting the one or more other wireless access points to participate in the transmission opportunity.

13. The method of claim 1, further comprising refraining from transmitting wireless communications in the first subset of time and frequency resources.

14. A method for wireless communication by a first wireless access point, the method comprising:

receiving a first wireless packet from a second wireless access point that indicates that a plurality of time and frequency resources of a transmission opportunity owned or to be owned by the second wireless access point can be shared by the second wireless access point;

receiving a second wireless packet from the second wireless access point that includes an indication of a first set of time and frequency resources of the plurality of time and frequency resources allocated to the first wireless access point and usable by the first wireless access point to transmit data to, or receive data from, a first set of wireless stations in a first basic service set (BSS) controlled by the first wireless access point during the transmission opportunity;

allocating a first subset of time and frequency resources, of the first set of time and frequency resources allocated to the first wireless access point, to the first set of wireless stations for direct wireless communications with other wireless stations; and transmitting a third wireless packet to the first set of wireless stations that includes an indication of the first subset of time and frequency resources.

15. The method of claim 14, wherein:
the frequency resources in each set of time and frequency resources of the plurality of sets of time and frequency resources overlap with the frequency resources in the other sets of time and frequency resources;
the time resources in each set of time and frequency resources of the plurality of sets of time and frequency resources do not overlap with any of the time resources in the other sets of time and frequency resources;
the time resources in the set of time and frequency resources allocated to the first wireless access point include a plurality of time slots and the first subset of time and frequency resources includes one or more of the plurality of time slots; and
the indication of the first subset of time and frequency resources includes an indication of a time slot schedule for the plurality of time slots.

16. The method of claim 15, wherein, during at least one time slot of the one or more time slots included in the first subset of time and frequency resources, one or more wireless stations in the first set of wireless stations are permitted to transmit or receive direct wireless communications to or from other wireless stations associated with one or more other wireless access points.

17. The method of claim 15, further comprising:
transmitting, to the second wireless access point, identifiers of one or more wireless stations in the first set of wireless stations;
receiving, from the second wireless access point, identifiers of one or more wireless stations associated with the second wireless access point that are configured for direct wireless communications with other wireless stations; and
coordinating, with the second wireless access point, one or both of:
which wireless stations in the first set of wireless stations are permitted to transmit direct wireless communications to wireless stations associated with the second wireless access point during one or more time slots in the set of time and frequency resources allocated to the second wireless access point; and
which wireless stations of the set of wireless stations associated with the second wireless access point are permitted to transmit direct wireless communications to wireless stations in the first set of wireless stations during one or more of the time slots in the first subset of time and frequency resources allocated to the first set of wireless stations.

18. The method of claim 15, wherein at least one time slot of the one or more time slots associated with the first subset of time and frequency resources corresponds to a respective time slot in each of one or more other sets of time and frequency resources of the plurality of sets of time and frequency resources allocated to one or more other wireless access points, and wherein each wireless station in the first set of wireless stations and each wireless station in other sets of wireless stations associated with the other wireless access points is permitted to transmit direct wireless communications to each of the other wireless stations during the at least one time slot and the corresponding time slots.

19. The method of claim 16, wherein the third wireless packet includes a trigger frame that indicates the time slot schedule and that initiates direct wireless communications by wireless stations in the first set of wireless stations.

20. The method of claim 14, wherein:
the time resources in each set of time and frequency resources of the plurality of sets of time and frequency resources overlap with the time resources in the other sets of time and frequency resources;
the frequency resources in each set of time and frequency resources of the plurality of sets of time and frequency resources do not overlap with any of the frequency resources in the other sets of time and frequency resources;
the frequency resources in each set of time and frequency resources of the plurality of sets of time and frequency resources of the transmission opportunity include a plurality of frequency slots and the first subset of time and frequency resources includes one or more of the plurality of frequency slots; and
the respective indication of the set of time and frequency resources includes an indication of a bandwidth schedule for the plurality of frequency slots.

21. The method of claim 20, wherein, in at least one frequency slot of the one or more frequency slots included in the first subset of time and frequency resources, one or more wireless stations in the first set of wireless stations are permitted to transmit or receive direct wireless communications to or from other wireless stations associated with one or more other wireless access points.

22. The method of claim 20, further comprising:
transmitting, to the second wireless access point, identifiers of one or more wireless stations in the first set of wireless stations;
receiving, from the second wireless access point, identifiers of one or more wireless stations associated with the second wireless access point that are configured for direct wireless communications with other wireless stations; and
coordinating, with the second wireless access point, one or both of:
which wireless stations of the first set of wireless stations are permitted to transmit direct wireless communications to wireless stations associated with the second wireless access point in one or more frequency slots in the set of time and frequency resources allocated to the second wireless access point; and
which wireless stations of the set of wireless stations associated with the second wireless access point are permitted to transmit direct wireless communications to wireless stations in the first set of wireless stations in one or more of the frequency slots in the first subset of time and frequency resources allocated to the first set of wireless stations.

23. The method of claim 20, wherein at least one frequency slot of the one or more frequency slots associated with the first subset of time and frequency resources corresponds to a respective frequency slot in each of one or more other sets of time and frequency resources of the plurality of sets of time and frequency resources allocated to one or more other wireless access points, and wherein each wireless station in the first set of wireless stations and each wireless station in other sets of wireless stations associated with the other wireless access points is permitted to transmit direct wireless communications to each of the other wireless stations in the at least one frequency slot and the corresponding frequency slots.

24. The method of claim 20, wherein the third wireless packet includes a trigger frame that indicates the bandwidth schedule and that initiates direct wireless communications by wireless stations in the first set of wireless stations.

25. The method of claim 14, further comprising refraining from transmitting wireless communications in the first subset of time and frequency resources.

\* \* \* \* \*